United States Patent
Chatterjee et al.

(10) Patent No.: US 12,099,830 B2
(45) Date of Patent: *Sep. 24, 2024

(54) NETWORK EFFICIENT AND USER EXPERIENCE OPTIMIZED DIALOGUE SEQUENCE BETWEEN USER DEVICES

(71) Applicant: S3G Technology LLC, Foster City, CA (US)

(72) Inventors: Shuvam Chatterjee, Foster City, CA (US); Sandeep Chatterjee, Foster City, CA (US)

(73) Assignee: S3G TECHNOLOGY LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,855

(22) Filed: Apr. 26, 2023

(65) Prior Publication Data

US 2023/0342136 A1     Oct. 26, 2023

Related U.S. Application Data

(63) Continuation of application No. 17/543,670, filed on Dec. 6, 2021, now Pat. No. 11,662,995, which is a
(Continued)

(51) Int. Cl.
G06F 9/445     (2018.01)
G06F 3/00     (2006.01)
(Continued)

(52) U.S. Cl.
CPC .............. *G06F 8/65* (2013.01); *G06F 9/451* (2018.02); *G06F 11/3664* (2013.01);
(Continued)

(58) Field of Classification Search
CPC ........ G06F 8/65; G06F 9/451; G06F 11/3664; G06F 11/3079; G06F 16/972;
(Continued)

(56) References Cited

U.S. PATENT DOCUMENTS 5,845,263 A     12/1998     Camaisa et al.
6,047,327 A     4/2000     Tso et al.
(Continued)

FOREIGN PATENT DOCUMENTS

EP     1571547 A1     9/2005
EP     1980986 A2     10/2008
(Continued)

OTHER PUBLICATIONS

Defendant Macy's Invalidity Contentions Civil Action No. 2:21-cv-000373 62 pgs. Mar. 17, 2022.
(Continued)

*Primary Examiner* — Thuy Dao
(74) *Attorney, Agent, or Firm* — Morgan, Lewis & Bockius LLP

(57) ABSTRACT

Systems and methods of conducting a dialogue sequence between user devices are disclosed. A method includes receiving, at a user device, authorization signal to enable the user device to conduct at least a portion of a dialogue sequence facilitated by an application included on the user device. The application includes first code includes information that must be translated before it can be executed on a computer processor of the user device. The method further includes determining that the user device satisfies one or more criteria associated with the dialogue sequence, and receiving second code at the user device that allows the application to conduct at least an updated portion of the dialogue sequence. The second code includes information that must be translated before it can be executed on the computer processor of the user device. The application on the user device continues to operate when the second code is received.

20 Claims, 56 Drawing Sheets

Related U.S. Application Data continuation of application No. 17/033,633, filed on Sep. 25, 2020, now Pat. No. 11,210,082, which is a continuation of application No. 16/544,801, filed on Aug. 19, 2019, now Pat. No. 10,831,468, which is a continuation of application No. 16/273,073, filed on Feb. 11, 2019, now Pat. No. 10,387,140, which is a continuation-in-part of application No. 15/947,593, filed on Apr. 6, 2018, now Pat. No. 10,261,774, which is a continuation of application No. 15/065,757, filed on Mar. 9, 2016, now Pat. No. 9,940,124, which is a continuation of application No. 14/788,506, filed on Jun. 30, 2015, now Pat. No. 9,304,758, which is a continuation of application No. 14/060,490, filed on Oct. 22, 2013, now Pat. No. 9,081,897, which is a continuation of application No. 12/841,113, filed on Jul. 21, 2010, now Pat. No. 8,572,571.

(60) Provisional application No. 61/325,212, filed on Apr. 16, 2010, provisional application No. 61/228,140, filed on Jul. 23, 2009.

(51) Int. Cl.
  *G06F 8/65*       (2018.01)
  *G06F 9/451*      (2018.01)
  *G06F 9/455*      (2018.01)
  *G06F 11/36*      (2006.01)
  *H04L 12/58*      (2006.01)
  *H04L 67/00*      (2022.01)
  *H04W 4/50*       (2018.01)
  *H04W 4/60*       (2018.01)

(52) U.S. Cl.
  CPC .............. *H04L 67/34* (2013.01); *H04W 4/50* (2018.02); *H04W 4/60* (2018.02)

(58) Field of Classification Search
  CPC ............. G06F 16/9535; G06F 16/9577; G06F 16/958; G06F 11/3438; H04W 4/60; H04W 4/50; H04L 67/34
  See application file for complete search history.

(56) References Cited

U.S. PATENT DOCUMENTS

| | | | |
|---|---|---|---|
| 6,065,120 | A | 5/2000 | Laursen et al. |
| 6,574,791 | B1 | 6/2003 | Gauthier et al. |
| 6,668,368 | B1 | 12/2003 | Hernandez, III |
| 6,701,514 | B1 | 3/2004 | Haswell et al. |
| 6,980,962 | B1 | 12/2005 | Arganbright et al. |
| 7,080,371 | B1 | 7/2006 | Arnaiz et al. |
| 7,185,334 | B2 | 2/2007 | Bourke-Dunphy et al. |
| 7,200,390 | B1 | 4/2007 | Henager et al. |
| 7,272,212 | B2 | 9/2007 | Eberle et al. |
| 7,305,672 | B2 | 12/2007 | Vincent |
| 7,328,172 | B2 | 2/2008 | Williams, Jr. et al. |
| 7,343,550 | B2 | 3/2008 | Saidenberg et al. |
| 7,367,025 | B1 | 4/2008 | Nikolov et al. |
| 7,376,720 | B2 | 5/2008 | Fujii |
| 7,389,915 | B1 | 6/2008 | Dyor |
| 7,512,098 | B2 | 3/2009 | Jiang et al. |
| 7,536,686 | B2 | 5/2009 | Tan et al. |
| 7,594,219 | B2 | 9/2009 | Ramachandran et al. |
| 7,734,689 | B2 | 6/2010 | Richer et al. |
| 7,769,995 | B2 | 8/2010 | Corbett et al. |
| 7,822,816 | B2 | 10/2010 | Payn |
| 7,827,545 | B2 | 11/2010 | Choe et al. |
| 7,930,182 | B2 | 4/2011 | Sinai et al. |
| 8,056,070 | B2 | 11/2011 | Goller et al. |
| 8,099,085 | B2 | 1/2012 | Lowry |
| 8,099,332 | B2 | 1/2012 | Lemay et al. |
| 8,176,328 | B2 | 5/2012 | Chen et al. |
| 8,194,839 | B2 | 6/2012 | Lopez et al. |
| 8,281,010 | B2 | 10/2012 | Ansari et al. |
| 8,307,294 | B2 | 11/2012 | Lou et al. |
| 8,347,267 | B2 | 1/2013 | Givoni et al. |
| 8,369,326 | B2 | 2/2013 | Ansari et al. |
| 8,370,732 | B2 | 2/2013 | Black et al. |
| 8,447,843 | B2 | 5/2013 | Johnson et al. |
| 8,448,160 | B2 | 5/2013 | Vincent et al. |
| 8,467,766 | B2 | 6/2013 | Rackley, III et al. |
| 8,572,571 | B2 | 10/2013 | Chatterjee |
| 8,577,734 | B2 | 11/2013 | Treysz et al. |
| 8,660,539 | B2 | 2/2014 | Khambete et al. |
| 8,700,096 | B2 | 4/2014 | Little et al. |
| 8,755,372 | B2 | 6/2014 | Fried et al. |
| 8,781,508 | B1 | 7/2014 | Blakely |
| 8,888,597 | B2 | 11/2014 | Kroeckel et al. |
| 8,923,827 | B2 | 12/2014 | Wentker et al. |
| 8,930,949 | B2 | 1/2015 | Chen et al. |
| 8,977,951 | B2 | 3/2015 | Ehier et al. |
| 9,043,488 | B2 | 5/2015 | Chaturvedi et al. |
| 9,106,726 | B2 | 8/2015 | Davis et al. |
| 9,146,732 | B2 | 9/2015 | Aiglstorfer |
| 9,158,508 | B2 | 10/2015 | Eldridge et al. |
| 9,195,525 | B2 | 11/2015 | Ewe et al. |
| 9,696,972 | B2 | 7/2017 | Ewe et al. |
| 9,754,315 | B2 | 9/2017 | Stone et al. |
| 10,372,796 | B2 | 8/2019 | Warila et al. |
| 10,546,283 | B2 | 1/2020 | Desai et al. |
| 10,585,982 | B2 | 3/2020 | Brisebois et al. |
| 10,977,058 | B2 * | 4/2021 | Berg ................... G06F 9/45512 |
| 11,126,443 | B2 | 9/2021 | Valtchev |
| 11,140,110 | B2 * | 10/2021 | Kasireddy ............... H04L 51/04 |
| 11,803,592 | B2 * | 10/2023 | Steinfort ............. G06F 16/3329 |
| 2002/0131404 | A1 | 9/2002 | Mehta et al. |
| 2003/0022677 | A1 | 1/2003 | Piikivi |
| 2003/0060896 | A9 | 3/2003 | Hulai et al. |
| 2003/0130908 | A1 | 7/2003 | Hing |
| 2003/0182230 | A1 | 9/2003 | Pessin |
| 2003/0225622 | A1 | 12/2003 | Doan |
| 2004/0035644 | A1 | 2/2004 | Ford et al. |
| 2004/0181787 | A1 | 9/2004 | Wickham et al. |
| 2004/0203684 | A1 | 10/2004 | Jokinen et al. |
| 2004/0205720 | A1 | 10/2004 | Hundt |
| 2004/0242209 | A1 | 12/2004 | Kruis et al. |
| 2005/0065995 | A1 | 3/2005 | Milstein et al. |
| 2005/0102664 | A1 | 5/2005 | Eyres et al. |
| 2005/0136939 | A1 | 6/2005 | Mountain et al. |
| 2005/0155012 | A1 | 7/2005 | Tayama et al. |
| 2005/0203968 | A1 | 9/2005 | Dehghan et al. |
| 2006/0069568 | A1 | 3/2006 | Passaretti et al. |
| 2006/0073820 | A1 | 4/2006 | Craswell et al. |
| 2006/0080397 | A1 | 4/2006 | Chene et al. |
| 2006/0089938 | A1 | 4/2006 | Leonard et al. |
| 2006/0143080 | A1 | 6/2006 | Garg et al. |
| 2006/0161646 | A1 | 7/2006 | Chene et al. |
| 2006/0174235 | A1 | 8/2006 | Kamada et al. |
| 2006/0200658 | A1 | 9/2006 | Penkethman |
| 2006/0206390 | A1 | 9/2006 | Asano |
| 2006/0218545 | A1 | 9/2006 | Taguchi |
| 2006/0230379 | A1 | 10/2006 | Pintos |
| 2006/0236307 | A1 | 10/2006 | Debruin et al. |
| 2006/0248162 | A1 | 11/2006 | Kawasaki |
| 2006/0265662 | A1 | 11/2006 | Gertzen |
| 2006/0293894 | A1 | 12/2006 | Peyroux |
| 2007/0011658 | A1 | 1/2007 | Stephens |
| 2007/0130156 | A1 | 6/2007 | U. Tenhunen et al. |
| 2007/0198432 | A1 | 8/2007 | Pitroda et al. |
| 2007/0214052 | A1 | 9/2007 | Kao |
| 2007/0239837 | A1 | 10/2007 | Jablokov et al. |
| 2007/0240069 | A1 | 10/2007 | Eldridge et al. |
| 2007/0240079 | A1 | 10/2007 | Flynt et al. |
| 2007/0288909 | A1 | 12/2007 | Cheung et al. |
| 2007/0297395 | A1 | 12/2007 | Chiu |
| 2008/0003991 | A1 | 1/2008 | Sievers et al. |
| 2008/0010215 | A1 | 1/2008 | Rackley III et al. |
| 2008/0052192 | A1 | 2/2008 | Fisher |
| 2008/0077425 | A1 | 3/2008 | Johnson et al. |
| 2008/0119132 | A1 | 5/2008 | Rao |

(56) References Cited

U.S. PATENT DOCUMENTS

| | | | |
|---|---|---|---|
| 2008/0167860 | A1 | 7/2008 | Goller et al. |
| 2008/0178749 | A1 | 7/2008 | Stutman |
| 2008/0267117 | A1 | 10/2008 | Stern |
| 2008/0301669 | A1 | 12/2008 | Rao et al. |
| 2008/0305815 | A1 | 12/2008 | McDonough |
| 2009/0076917 | A1 | 3/2009 | Jablokov et al. |
| 2009/0076920 | A1 | 3/2009 | Feldman et al. |
| 2009/0119168 | A1 | 5/2009 | Otto et al. |
| 2009/0131035 | A1 | 5/2009 | Aiglstorfer |
| 2009/0171669 | A1 | 7/2009 | Engelsma et al. |
| 2009/0265247 | A1 | 10/2009 | Carroll et al. |
| 2010/0159907 | A1 | 6/2010 | Farley et al. |
| 2010/0267345 | A1 | 10/2010 | Berton et al. |
| 2010/0281475 | A1 | 11/2010 | Jain et al. |
| 2013/0219357 | A1 | 8/2013 | Reitan |
| 2018/0262388 | A1 | 9/2018 | Johnson et al. |

FOREIGN PATENT DOCUMENTS

| | | |
|---|---|---|
| WO | WO01/61552 A2 | 8/2001 |
| WO | WO2004013782 A1 | 2/2004 |

OTHER PUBLICATIONS

Exhibit A1—Mar. 17, 2022, '897 Payne Claim Chart U.S. Pat. No. 7,822,816, Payne, 32 pgs.
Exhibit A2—Mar. 17, 2022, '897 Warila Chart U.S. Pat. No. 10,372,796, Warila, 221 pgs.
Exhibit A3—Mar. 17, 2022, '897 Kroeckel et al.Claim Chart U.S. Pat. No. 8,888,597, Kroeckel, 35 pgs.
Exhibit A4—Mar. 17, 2022, '897 Debruin Claim Chart 20060236307 119 pgs.
Exhibit A5—Mar. 17, 2022, '897 Ewe Claim Chart U.S. Pat. No. 9,195,525, Ewe, 71 pgs.
Exhibit A6—Mar. 17, 2022, '897 Ewe Claim Chart U.S. Pat. No. 9,696,972, Ewe, 60 pgs.
Exhibit B1—Mar. 17, 2022, '774 Payne Claim Chart U.S. Pat. No. 7,822,816, Payne, 34 pgs.
Exhibit B2—Mar. 17, 2022, '774 Warila Claim Chart U.S. Pat. No. 10,372,796, Warila, 77 pgs.
Exhibit B3—Mar. 17, 2022, '774 Kroeckel et al Claim Chart U.S. Pat. No. 8,888,597, Kroeckel, 27 pgs.
Exhibit B4—Mar. 17, 2022, '774 Debruin Claim Chart U.S. Pat. No. 20060236307, Debruin, 46 pgs.
Exhibit B5—Mar. 17, 2022, '774 Ewe Claim Chart U.S. Pat. No. 9,195,525, Ewe, 64 pgs.
Exhibit B6—Mar. 17, 2022, '774 Ewe Claim Chart '972 U.S. Pat. No. 9,696,972, Ewe, 41 pgs.
Exhibit C1—Mar. 17, 2022, '124 Payne Claim Chart 7,822,816, Payne, 78 pgs.
Exhibit C2—Mar. 17, 2022, '124 Warila Chart 10,372,796 337 pgs.
Exhibit C3—Mar. 17, 2022, '124 Kroeckel et al Claim Chart 8,888,597 74 pgs.
Exhibit C4—Mar. 17, 2022'124 DeBruin Claim Chart 20060236307 156 pgs.
Exhibit C5—Mar. 17, 2022'124 Ewe Claim Chart 9,195,525 228 pgs.
Exhibit C6—Mar. 17, 2022, '124 Ewe Claim Chart 9,696,972 193 pgs.
NTT Docomo, Mar. 8, 2021, vol. 6, No. 3/About Docomo/NTT Docomo, https://www.nttdocomo.co.jp/english/corporate/technology/rd/technical_journal/bn/vol6_3/, 2 pgs.
Google Operating System, "Google Launches Android, an Open Mobile Platform," Unofficial news and tips about Google, Nov. 5, 2007, googlesystem.blogspot.com/2007/11/google-launches-android-open-mobile.html, 2 pgs.
Google News, Google releases Android SDK, Juan Carlos Perez, Nov. 12, 2007, CFA00000818, 4 pgs.
Griol et al., "Statistical Dialog Management Methodologies for Real Applications," Sep. 2010, 4 pgs.
Lakay, SIP-Based Content Development for Wireless Mobile Devces, © 2005 IEEE, downloaded on Aug. 21, 2020 from IEEE Xplore, CFA00000144, 5 pgs.
Leong, Agent Mediated Peer-to-Peer Mobile Service-Oriented Architecture, 2007 Inaugura IEEE International Conference on Digital Ecosystems and Technologies (IEEE Dest 207), CFA00000138, 6 pgs.
Lohr et al., Mixed-Initiative Dialog Management for Speech-Based Interaction with Graphical User Interfaces, Apr. 2008, 10 pgs.
Mao, et al., Efficient and robust streaming provisioning in VPNs, 10 pgs. (Year: 2003).
Masonta, Light-Wight IP Multimedia Subsustem (IMS) Client for Mobile Devices, CCECE/CCGEI, May 5-7, 2008, Niagara Falls, Canada, © 2008 IEEE, downloaded on Aug. 21, 2002 from IEE E Xplore, 66 pgs.
Paterson, MULTI: Multiple User Interactive Template Installation, Jun. 2007, 1 pg.
Perugini et al., "A Study of Out-of-Turn Interaction in Menu-Based, IVR," voicemail systems, Apr. 2007, 10 pgs.
Siddiqui et al., GLARE: A Grid Activity Registration, Deployment and Provisioning Framework, 12 pages (Year: 2005).
Stewart et al., Transition Relevance Place: A Proposal for Adaptive User Interface in Natural Language Dialog Management Systems, Apr. 2006, 6 pgs.
Sourcetrace Systems Inc., International Preliminary Report on Patentability, PCT/US2010/042775, Feb. 2, 2012, 6 pgs.
Sourcetrace Systems Inc., International Search Report and Written Opinion, PCT/US2010/042775, Sep. 13, 2010, 6 pgs.
S3G Technology, LLC, Examination Report, IN277/DELNP/2012, Jul. 31, 2017, 6 pgs.
Villela et al., Provisioning servers in the application tier for e-commerce systems, 23 pgs. (Year: 2007).
Vuorimaa, A Java Based XML Browser for Consumer Devices, SAC 2002, Madrid Spain, © 2002 ACM, CFA00000160, 6 pgs.
Urgaonkar et al., Agile dynamic provisioning of multi-tier Internet applications, 39 pages (Year: 2008).
Wong, Value Proposition of Mobile Instant Messaging, © 2007 Crown Copyright, downloaded on Aug. 21, 2020 from IEEE Xplore, CFA00000161, 4 pgs.
Zheng, A System Architecture for SIP/IMS-Based Multimedia Serives, Novel Algorithms and Techniques in Telecommunications, Automation and Industrial Electronics, © Springer Science+ Business Media B.V. 2008, CFA00000132, 6 pgs.
Dmitriev, "Towards Flexible and Safe Technology for Runtime Evolution of Java Language Applications," Sun Microsystems Laboraories, Sep. 27, 2001 MACYS000590 to MACYS000596, 7 pgs.
*S3G Technology LLC, Plaintiff, v. Nordstrom, Inc.; S3G Technology LLC, Plaintiff, v. Hennes & Mauritz AB, Defendant*, "Defendants' Invalidity and Subject Mater Elegibility Contentions," Case No. 2:22-cv-00361-JRG-RSP, (Lead Case), Case No. 5:22-cv-00328-JRG-RSP (Member Case), Jan. 10, 2023, 43 pgs.
Appx A—'571 Patent Appendix to SMECs, Jan. 10, 2023, 36 pgs.
Appx B—'897 Patent Appendix to SMECs, Jan. 10, 2023, 36 pgs.
Appx C—'124 Patent Appendix to SMECs, Jan. 10, 2023, 36 pgs.
Appx D—'774 Patent Appendix to SMECs, Jan. 10, 2023, 36 pgs.
Appx E—'082 Patent Appendix to SMECs, Jan. 10, 2023, 36 pgs.
Ex. A-1—Jan. 10. 2023-01-10 '571 Patent (against the OGrady and Keegan References)—Claim Chart, 32 pgs.
Ex. A-2—Jan. 10, 2023 '571 Patent (against the Chopra Reference)—Claim Chart.
Ex. A-3—Jan. 10, 2023 '571Patent (against 382 Patent Reference)—Claim Chart.
Ex. A-4—Jan. 10, 2023 '571 Patent (against the 290 Patent Reference)—Claim Chart.
Ex. B-1—Jan. 10, 2023 '897 patent (O'Grady)—Claim Chart.
Ex. B-2—Jan. 10, 2023 '897 patent (Keegan)—Claim Chart.
Ex. B-3—Jan. 10, 2023 '897 patent (Chopra)—Claim Chart.
Ex. B-4—Jan. 10, 2023 '897 patent (Healey '382)—Claim Chart.
Ex. B-5—Jan. 10, 2023 '897 patent (Ananian '290)—Claim Chart.
Ex. C-1—Jan. 10, 2023 '124 patent (O'Grady)—Claim Chart.
Ex. C-2—Jan. 10, 2023 '124—Jan. 10, 2023patent (Keegan)—Claim Chart.

(56) References Cited

OTHER PUBLICATIONS

Ex. C-3—Jan. 10, 2023 '124—Jan. 10, 2023patent (Chopra)—Claim Chart.
Ex. C-4—Jan. 10, 2023 '124—Jan. 10, 2023patent (Healey)—Claim Chart.
Ex. C-5—Jan. 10, 2023 '124—Jan. 10, 2023patent chart (Ananian)—Claim Chart.
Ex. D-1—Jan. 10, 2023 '774—Jan. 10, 2023patent (O'Grady)—Claim Chart.
Ex. D-2—Jan. 10, 2023 '774 Jan. 10, 2023patent (Keegan)—Claim Chart.
Ex. D-3—Jan. 10, 2023 '774—Jan. 10, 2023patent (Chopra)—Claim Chart.
Ex. D-4—Jan. 10, 2023 '774—Jan. 10, 2023patent (Healey)—Claim Chart.
Ex. D-5—Jan. 10, 2023 '774—Jan. 10, 2023patent (Ananian)—Claim Chart.
Ex. E-1—Jan. 10, 2023 '082—Jan. 10, 2023 Patent (against the OGrady and Keegan References)—Claim Chart.
Ex. E-2—Jan. 10, 2023 '082—Jan. 10, 2023Patent (against the Chopra Reference)—Claim Chart.
Ex. E-3—Jan. 10, 2023 '082—Jan. 10, 2023Patent (against 382 Patent Reference)—Claim Chart.
Ex. E-4—Jan. 10, 2023 '082—Jan. 10, 2023 Patent (against 290 Patent Reference)—Claim Chart.
Academic Press Limited Copyright Publication, Copyright © 1995 by Academic Press, Inc., DEF_INV00001857, 1 pg.
O'Reilly, Applets and Security, Java Network Programming, Second Edition, Release Aug. 2000, Publishers: O'Reilly Media, Inc., ISBN: 9781565928701, 5 pgs.
Mukhar et al., Beginning Java™ M EE 5 Platform, From Novice to Professional, the Expert's Voice® In Java™ M Technology, Mukhar_470-3.book, Oct. 1, 2005, 663 pgs.
Jacquie Barker, Beginning Java Objets, From Concepts to Code, Second Edition, The Expert's Voice® In Java™, Copyright © 2005 by Jacquie Barker, 942 pgs.
Ben Choi et al., Network Traffic Reduction by Hyertext Compression, Conference Paper, Jan. 2002, Computer Science, College of Enginering and Science, Lousiana Tech University, Ruston, LA 71272, USA, 7 pgs.
Chopra et al., Beginning JavaServer Pages™, O'Reilly, Feb. 2005, 2 pgs.
Moeller et al., Implementing a Tivoli Solution for Central Management of Large Distributed Environments, O'Reilly, Jun. 2005, IBM Redbooks, 2 pgs.
O'Reilly, Chapter 15. Instant Messaes and Chat, by J.D. Biersdorfer, David Pogue, Released Jul. 2006, Publisers: O'Reilly Media, Inc., ISBN: 9780596527426, 50 pgs.
O'Grady et al., Interaction Modalities in Mobile Contexts, Studies in Computational Intelligence (SCI), © Springer-Verlag Berlin Heidelberg 2008, 18 pgs.
O'Reilly, Chapter 1. Introduction to ZENworks for Servers 3, Novell® ZENworks, Released Apr. 2003, Publishers: Sams, ISBN: None, 7 pgs.
Farley, Java Distributed Computing, O'Reilly Media, Inc., Jan. 1998.
Phani Vurakarnam, Java Servlets Based E-Commerce Shopping Cart Application, A Thesis, Department of Computer Engineering and Computer Science, University of Louisville, Kentucky, Aug. 2001, 47 pgs.
O'Reilly, Chapter 8. JSP Standard Actions, JSP Standard Actions/ Beginning JavaServer Pages™, Released Feb. 2005, Publishers: Wrox, ISBN: 9780764574856, 30 pgs.
Leach et al., Microsoft Ready to Show 'Zero Administration,' (enhancements slated for Windows NT 4.0, 5.0)(Product Announcement), PC Week (vol. 14, Issue 10), Mar. 10, 1997, 2 pgs.
O'Reilly, Chapter 17. Model View Controller, Model View Controller/ Beginning JavaServer Pages™, Released Feb. 2005, Publishers: Wrox, ISBN: 9780764574856, 20 pgs.

Simon et al., Open Client/Server Computing and Middleware, AP Professional, 1$^{st}$ Edition—Jul. 26, 1995, 1 pg.
Open Systems and Client/Server Computing: An Overview, ISBN: 978-0-12-643860-4, Language: English, Published 1995, 20 pgs.
Self Distiller Params, DEF_INV00001155, Date: Unknown, 3 pgs.
O'Reilly, The ClassLoader, by Jim Farley, Release Jan. 1998, Publishers: O'Reilly Media, Inc., ISBN: 9781565922068, 8 pgs.
A Beginning Programmer's Guide to Java, The Code Code: Source, Object and byte Code, Jul. 8, 2008, beginwithjava.blogspot.com/2008/07/code-code-object-and-byte-code.html, 5 pgs.
O'Reilly, Chapter 18. Web Frameworks, Web Frameworks/ Beginning JavaServer Pages™, Beginning JavaServer Pages™M, by Vivek Chopra, Sing Li, Rupert Jones, John T. Bell, Jon Eaves, Released Feb. 2005, Publishers: Wrox, ISBN; 9780764574856, 67 pgs.
Wu Chou et al., WIPdroid—A Two-way Web Services and Real-time Communications Enabled Mobile Computing Platform for Distributed Services Computing, Conference Paper Aug. 2008, IEEE International Conference on Services Computing, 9 pgs.
XcelleNet Extends Microsoft Systems Management Server 2003 to Provide Comprehensive Frontline Management Solution; Microsoft Sytems Management Server 2003 and XcelleNet's Afaria Combination Provides Broader Platform Coverage and Extends Management Capabilities to Address Unique Challenges in the Field, PR Newswire, Nov. 11, 2003, 6 pgs.
Christina Bonnington, 5 Years on, the App Store Has Forever Changed the Face of Software, Jul. 18, 2013, 11 pgs.
Unified Patents, PATROLL Winning Submission, S3G Technology, U.S. Pat. No. 8,572,571, date of search Jun. 19, 2024, 47 pgs.
Unified Patents, PATROLL Winning Submission, S3G Technology, U.S. Pat. No. 9,940,124, date of search Jun. 19, 2024, 23 pgs.
Unified Patents, PATROLL Winning Submission, S3G Technology, U.S. Pat. No. 10,261,774, date of search Jun. 19, 2024, 8 pgs.
Cardellini et al., Efficient provisioning of service level agreements for service oriented applications, 7 pages (Year: 2007).
Chick-fil-A Inc., Patent Rule 3-3, Invalidity Contentions, Aug. 31, 2020, 15 pgs.
Exhibit A—Aug. 31, 2020, Invalidity in view of US20080119132, Rao, 364 pgs.
Exhibit B—Aug. 31, 2020, Invalidity in view of US 20070240079, Flynt, 370 pgs.
Exhibit C—Aug. 31, 2020, Invalidity in view of U.S. Pat. No. 5,845,263 Camaisa, 292 pgs.
Exhibit D—Aug. 31, 2020, Invalidity in view of US 20060236307, Debruin, 473 pgs.
Exhibit E—Aug. 31, 2020, Invalidity in view of US 20090265247, Carroll, 443 pgs.
Exhibit F—Aug. 31, 2020, Invalidity in view of US 20100281475, Jain, 467 pgs.
Defendant Hobbly Lobby Stores, Inc.'s, Subject Matter Eligibility Contentions, Civil Action No. 2:20-cv-00340-JRG, Mar. 8, 2021, 8 pgs.
Exhibit A—Mar. 8, 2021, Eligibility Exceptions, U.S. Pat. No. 9,940,124, Chatterjee, 86 pgs.
Exhibit B—Mar. 8, 2021, Eligibility Exceptions, U.S. Pat. No. 9,081,897, Chatterjee, 15 pgs.
Exhibit C—Mar. 8, 2021, Eligibility Exceptions, U.S. Pat. No. 10,261,774, Chatterjee, 14 pgs.
Exhibit D—Mar. 8, 2021, Description of Conventionality in Industry, U.S. Pat. No. 9,940,124 Patent, 4338 pgs.
Exhibit E—Mar. 8, 2021, Description of Conventionality in Industry, U.S. Pat. No. 9,081,897 Patent, 847pgs.
Exhibit F—Mar. 8, 2021, Description of Conventionality in Industry, U.S. Pat. No. 10,261,774, Patent, 1373 pgs.
Exhibit G—Mar. 8, 2021, Description of Conventionality for the Ordered Combination, 187 pgs.
Yoshinaga, et al., i-mode FeliCa, Development Reports, NTT DoCoMo Technical Journal vol. 6, No. 3, Dec. 2004, 8 pgs.
Gosling et al., The Java™ Language Specification, Third Edition, ISBN 10-0321-24678-0, first printing May 2005, 684 pgs.
Lindholm et al., The Java™ Virtual Machine Specification, ISBN 0-201-63452-X, first printing Sep. 1996, 491 pgs.

(56) References Cited

OTHER PUBLICATIONS

Defendant Hobby Lobby Stores, Inc.'s P. R. 3-3 Invalidity Contentions, Case No. 2:20-cv-340-JRG, Mar. 17, 2021, 260 pgs.
Defendants Appendix A, Prior Art Index, Mar. 17, 2021.
Exhibit A—Mar. 17, 2021, Invalidity in view of U.S. Pat. No. 9,081,897, Chatterjee, 1042 pgs.
Exhibit B—Mar. 17, 2021, Invalidity in view of U.S. Pat. No. 9,940,124, Chatterjee, 8267 pgs. Part 1.
Exhibit B—Mar. 17, 2021, Invalidity in view of U.S. Pat. No. 9,940,124, Chatterjee, 8267 pgs. Part 2.
Exhibit C—Mar. 17, 2021, Invalidity in view of U.S. Pat. No. 10,261,774, Chatterjee, 2449 pgs.
Source Trace System, Inc., The eServices Everywhwere (ESE) Platform, Dec. 2008, 2 pgs.
Source Trace System, Inc., The eServices Everywhwere (ESE) Platform, Jul. 2009, 10 pgs.
Keegan et al., Easishop: Ambient intelligence assists everyday shopping, Information Sciences vol. 178, issue 3, Feb. 2008, 24 pgs.
Crawford et al., Java Enterprise in a Nutshell, Second Edition, O'Reilly Media, Inc., Apr. 2002, 2 pgs.
Biersdorfer et al., The Internet: The Missing Manual, O'Reilly Media, Inc., Jul. 2006, 3 pgs.
O'Reilly, Chapter 18. Web Frameworks, Web Frameworks/Beginning JavaServer Pages™, DEF-INV00000051, Feb. 2005, 67 pgs.
Apple©, iPhone App Store Downloads Top 10 Million in First Weekend, Newsroom Press Release, Jul. 14, 2008, 3 pgs.
Brewer-Hay, eBay Mobile, ebay, Stories, Jun. 9, 2008, 7 pgs.
Screen captures from YouTube Video clip entitled WWDC 2008 News: eBay shows off auction app for the iPhone, 21 pgs.
Wyatt Webb, Celebrating the 15th Anniversay of eBay's Mobile App, ebay Innovation, Jul. 10, 2023, 5 pgs.

\* cited by examiner

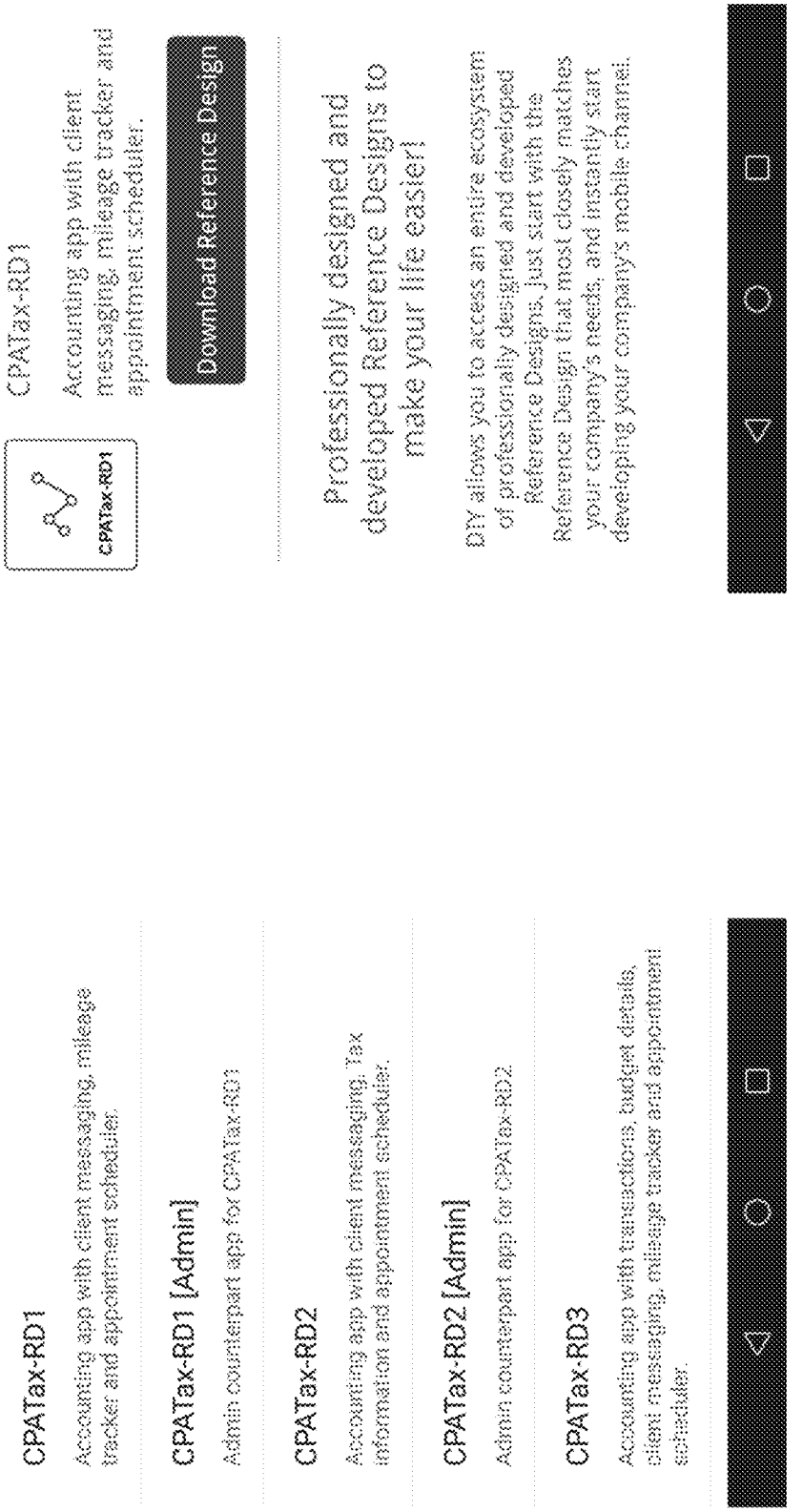
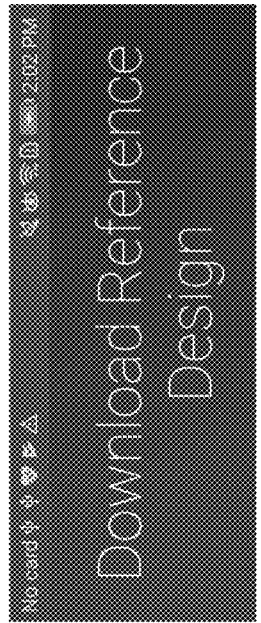
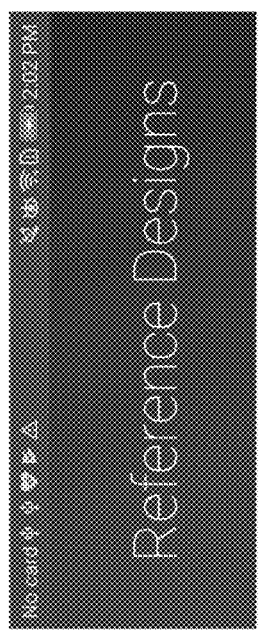
FIGURE 13G
FIGURE 13F

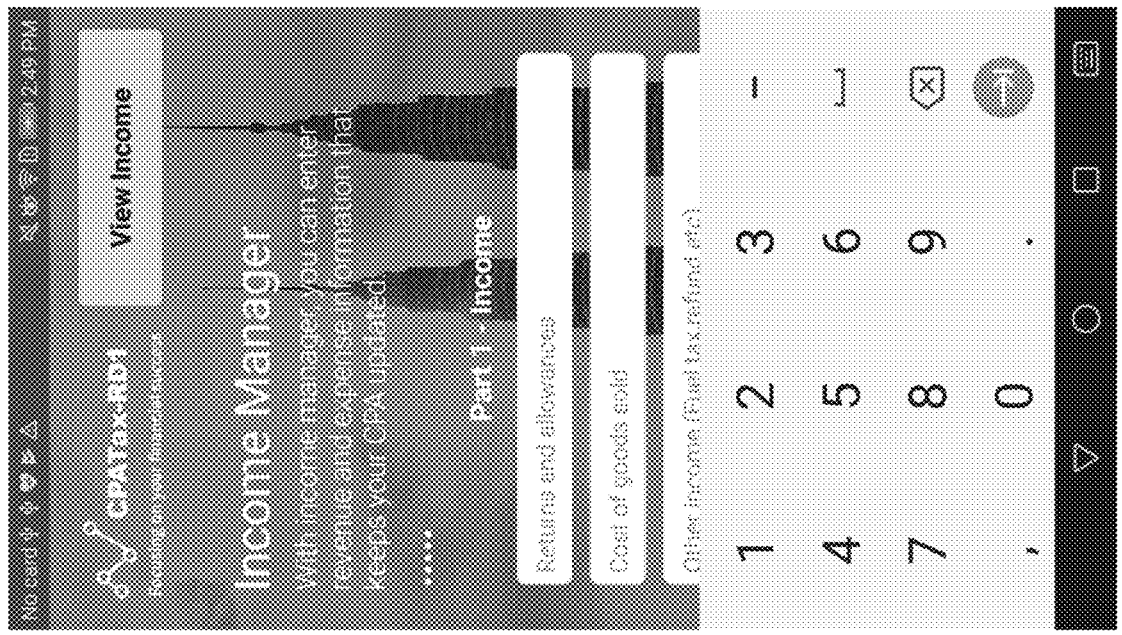
FIGURE 14D(1)
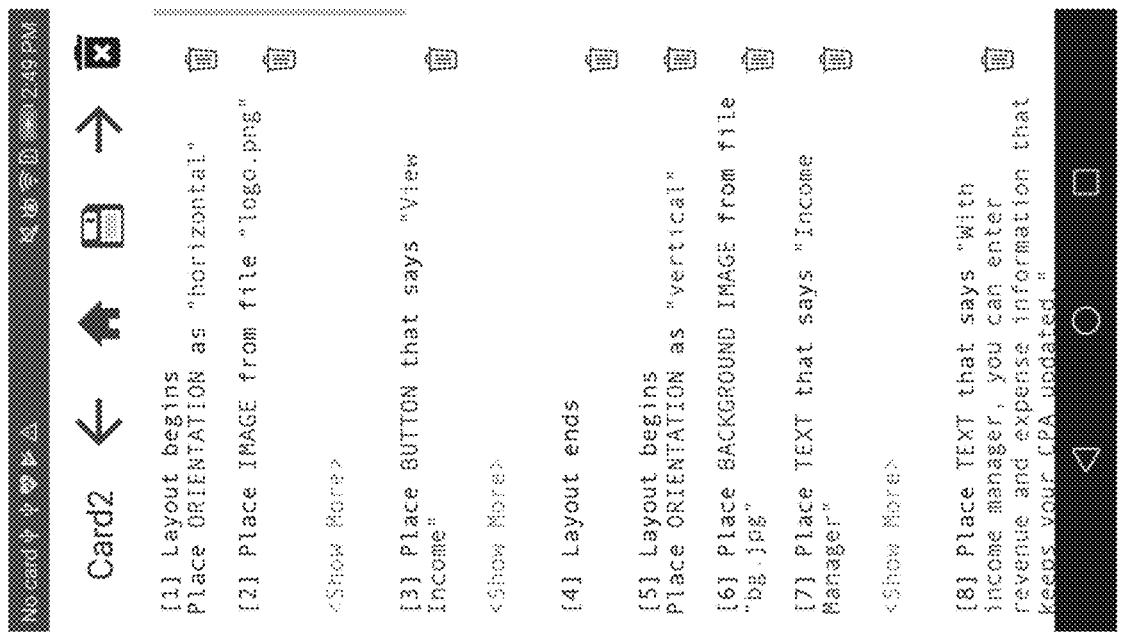
FIGURE 14C(1)

Table name: incomemanager

| sno [int] | returns [varchar] | goodsold | ... |
|---|---|---|---|
| | | | |
| | | | |

FIGURE 17F

Table name: customerinvoice

| Id [int] | First Name [varchar] | Last Name [varchar] | Phone [int] | Invoice Number [int] | Amount [decimal] |
|---|---|---|---|---|---|
| 234 | John | Smith | 1234567890 | 2018542 | 4523.52 |

FIGURE 17G

Table name: customer

| Id [int] | First Name [varchar] | Last Name [varchar] | Phone [int] | ... |
|---|---|---|---|---|
| 234 | John | Smith | 1234567890 | |

Table name: invoice

| Id [int] | Invoice Number [int] | Amount [decimal] |
|---|---|---|
| 234 | 2018542 | 4523.52 |

FIGURE 17H

NETWORK EFFICIENT AND USER EXPERIENCE OPTIMIZED DIALOGUE SEQUENCE BETWEEN USER DEVICES

CROSS REFERENCE TO RELATED APPLICATIONS

This application is a continuation of U.S. patent application Ser. No. 17/543,670, filed Dec. 6, 2021, which is a continuation of U.S. patent application Ser. No. 17/033,633, filed Sep. 25, 2020, now U.S. Pat. No. 11,210,082, issued Dec. 28, 2021, which is a continuation of U.S. patent application Ser. No. 16/544,801, filed Aug. 19, 2019, now U.S. Pat. No. 10,831,468, issued Nov. 10, 2020, which is a continuation of U.S. patent application Ser. No. 16/273,073, filed Feb. 11, 2019, now U.S. Pat. No. 10,387,140, issued Aug. 20, 2019, which is a continuation-in-part of U.S. patent application Ser. No. 15/947,593, filed Apr. 6, 2018, now U.S. Pat. No. 10,261,774, issued Apr. 16, 2019, which is a continuation of U.S. patent application Ser. No. 15/065,757, filed Mar. 9, 2016, now U.S. Pat. No. 9,940,124, issued Apr. 10, 2018, which is a continuation of U.S. patent application Ser. No. 14/788,506, filed Jun. 30, 2015, now U.S. Pat. No. 9,304,758, issued Apr. 5, 2016, which is a continuation of U.S. patent application Ser. No. 14/060,490, filed Oct. 22, 2013, now U.S. Pat. No. 9,081,897, issued Jul. 14, 2015, which is a continuation of U.S. patent application Ser. No. 12/841,113, filed Jul. 21, 2010, now U.S. Pat. No. 8,572,571, issued Oct. 29, 2013, which claims the benefit under 35 U.S.C. § 119(e) of U.S. Provisional Patent Application No. 61/325,212, filed Apr. 16, 2010, and U.S. Provisional Patent Application No. 61/228,140, filed Jul. 23, 2009, the disclosures all of which are hereby incorporated by reference in their entireties.

TECHNICAL FIELD

This application relates generally to a computerized system to provide efficient modification of remote software and, more specifically, to adaptation and customization of a computer transaction dialogue module.

BACKGROUND

It is well known to those of skill in the art that computerized systems can be adapted to perform specific functionality by implementing software code. For example, the software code may be written in languages such as C, C++, or Java.

A computerized system may be constructed, which includes electronic hardware, one or more computer processors, and software, which is able to perform system functionality. Typically, the software is written or created as source code and later compiled or converted into computer-executable instructions able to be read and executed by a computer processor without additional translation or adaptation. For example, the source code may be written in languages such as C, C++, or Java. Computer-executable instructions are sometimes also referred to as executable code or machine code.

For example, the computer-executable instructions may be compiled for and executed on a specific computer processor, such as the Intel Pentium processor from Intel Corporation, or may be used to modify the functionality of a Programmable Gate Array (PGA) or Field Programmable Gate Array (FPGA), such as those provided by Xilinx Corporation. In most cases, computer-executable code is specific to one type of processor or logical device.

Virtual machines can be used to provide a method of executing code on a computer system that is not dependent on a specific processor or hardware configuration. When using a virtual machine, a portion of code (typically in the form of source code) is compiled or translated into intermediary code, such as Java Byte Code. The intermediary code is then able to be further translated using the virtual machine, which itself is run on a computer processor (and perhaps also an operating system). Thus, a virtual machine is able to emulate a standardized computer platform that is independent of the actual computer processor or hardware configuration.

A computerized system, in the context of the embodiments described herein, includes more than one hardware device, each hardware device running a separate software application. Each software application comprises, in part, computer-executable instructions that allow the associated hardware device to interact with a user and communicate with another hardware device over a distributed network. For example, the software application may be adapted to interact directly with a user of the hardware device by accepting user input. The software application may be further adapted to communicate the user input to another hardware device using a network connection.

Oftentimes, after a computerized system has been initially constructed, modifications may be required, either to improve the functionality of the system or to customize the system to meet new requirements. In some cases, these modifications require changes to the software application stored on each system device.

Typically, a software application includes computer-executable instructions that are not able to be edited or modified directly by a developer. Using known methods, the developer may only implement the required changes by creating or editing source code. The updated source code must then be recompiled or translated into an updated set of computer-executable instructions and distributed to the hardware devices in the system as an updated software application. Typically, the updated set of computer-executable instructions that comprises an updated software application includes a relatively large amount of information.

However, in many situations, it may be difficult to distribute a newly compiled version of the updated software application to all of the devices in the system. This is particularly true if the system is distributed over a large geographic area. For example, it may be difficult to locate each system device and transport it to a central location or development center. Because physical access to the devices is not practical, the new software application cannot be uploaded using a traditional wired transmission (e.g., an interface cable).

In some computerized systems, the only practical option may be to upload the updated software application using an existing communication network. However, if the communications network has limited data transmission capabilities, it may be difficult to transmit the large amount of information (e.g., an entire software application). For example, a software application may be initially installed on a wireless mobile device (e.g., a cell phone or PDA). Typically, the device is issued to a user, who may travel or reside far from a software development center. The only method of communicating with the device may be over a wireless telecommunications network. However, due to bandwidth limitations on data transfer over the wireless network, an upload of the entire software application may not be economically feasible. Even if an upload of the application is possible, it may take an unacceptable amount of time due to the slow transfer rate of a wireless network (as compared to a dedicated wired transmission line or cable). These problems are further exacerbated if the computerized system includes a large number of wireless mobile devices, each requiring a separate application upload. Developing and testing separate applications for each mobile device can be time-consuming and economically infeasible. Additionally, if there are different versions of the software application distributed among a large number of mobile devices, a uniform software application update may be difficult to manage and track.

What is needed is a computerized system able to provide efficient modification of software applications that are distributed across a network of remote devices.

SUMMARY

A system including a terminal machine and a service provider machine is modified using a service provider machine. The terminal machine runs a terminal application. The terminal application is able to display a prompt in a first sequence of prompts and accept a user data entry in an associated first sequence of user data entries. The terminal application is comprised of a first set of computer-executable instructions and a first set of code. The service provider machine runs a provider application. The provider application is able to receive the user data entry. The provider application is comprised of a second set of computer-executable instructions and a second set of code.

The update server machine is able to send a dialogue module to the terminal machine and the service provider machine. The dialogue module modifies the first and second set of code to produce a first and second set of updated code, respectively. The dialogue module does not modify the first or second set of computer-executable instructions.

The first set of updated code adapts the terminal application to use a second sequence of prompts and a second sequence of data entries. The second set of updated code adapts the provider application to use the second sequence of prompts and the second sequence of data entries.

DESCRIPTION OF THE FIGURES

FIGS. 8A to 8B illustrate examples of a design tool for modifying a system dialogue protocol.

FIGS. 13A to 13L illustrate additional examples of design tools for creating or modifying a system dialogue protocol.

DETAILED DESCRIPTION

The following embodiments describe a system capable of conducting a transaction between a user at a terminal machine and a service provider at a second, remote machine. In some instances, the system can be used to facilitate a business transaction between a bank or financial institution (using a service provider machine) and a banking customer (using a terminal machine). The structure of the transaction may be custom tailored by adapting a dialogue protocol between at least two machines in the system. The dialogue protocol defines the contours of a transaction and includes various components such as: a sequence of dialogue prompts; a sequence of user data entry fields; and a set of dialogue parameters. Additionally, the dialogue protocol may define aesthetic features including the graphical user interface (GUI), display layout and GUI functionality. The dialogue protocol may be determined by the two software applications running on the two machines engaged in the transaction with the user.

The system described herein allows for the adaptation of a dialogue protocol through the modification of one or more software applications. Specifically, one or more of the software applications may be adapted by including or replacing a dialogue module, which includes a set of code. The code represents at least some information that must be translated by the software application before it can be implemented on the machine processor. In some embodiments, a developer may be able to generate an updated dialogue module as required in accordance with a particular dialogue protocol.

In a preferred embodiment, an updated dialogue module is able to be communicated from an update server machine to individual machine (e.g., devices) in the system, each machine having a software application. In a preferred embodiment, the dialogue module adapts at least one of the software applications to produce a modified dialogue protocol between the system components.

1. Dialogue Updates Using a Three-Node System

Figure 1:
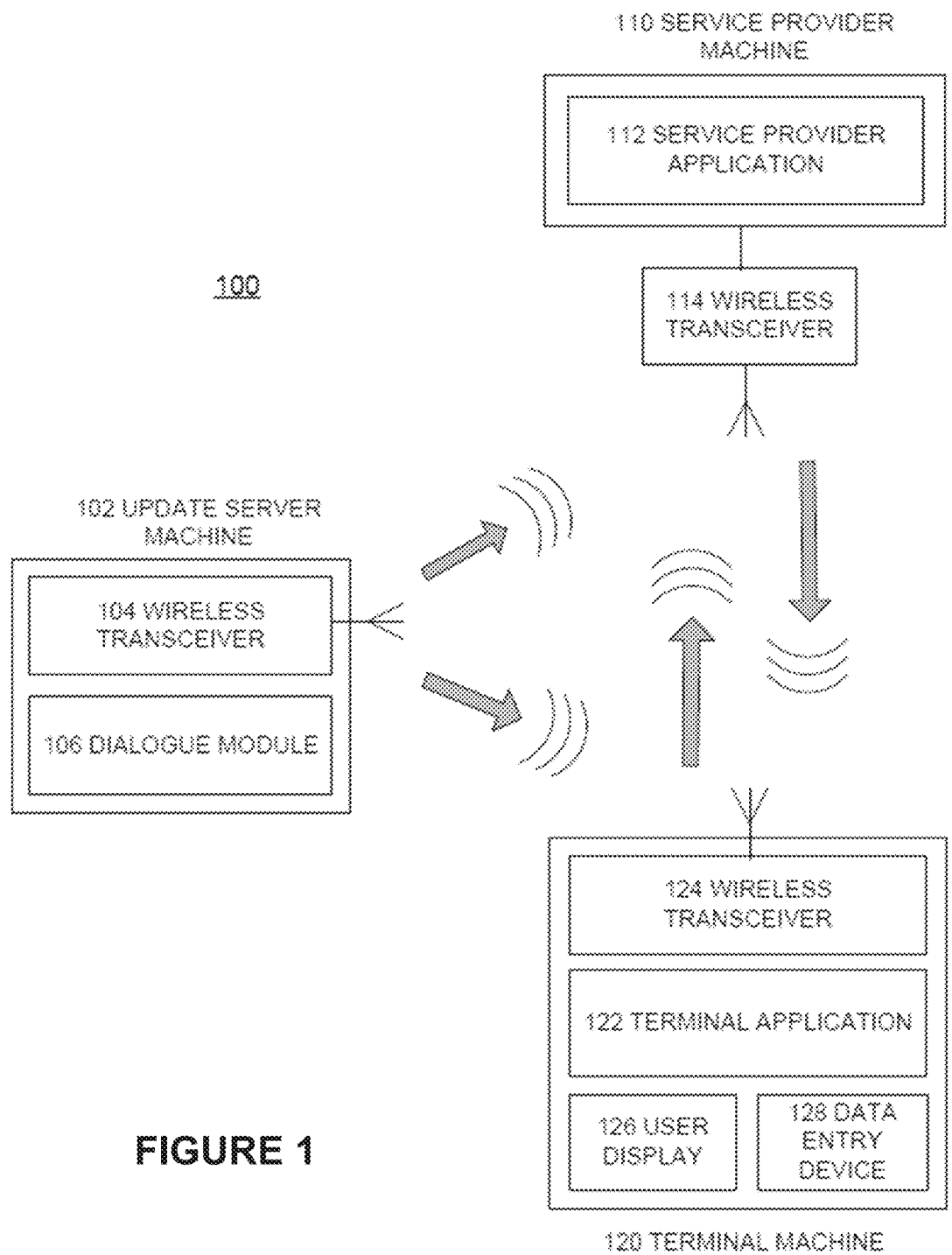
FIG. 1 illustrates a computerized system for updating a dialogue protocol by adapting applications on a terminal machine and a service provider machine.

FIG. 1. depicts an exemplary computerized system for updating a dialogue protocol by adapting applications on a service provider machine 110 and a terminal machine 120. As described above, a transaction may be conducted between a user and the terminal machine 120 and the service provider machine 110. The transaction is conducted according to a dialogue protocol. The dialogue protocol may be changed by communicating a dialogue module 106 from the update server machine 102 to the service provider machine 110 and the terminal machine 120. As described below, the dialogue module 106 may include code that is unique to either the service provider machine 110 or the terminal machine 120. Although they are described separately, the service provider machine 110 and the update server machine 102 may or may not be on the same physical machine. Additionally, in some embodiments, at least one of the service provider machine 110 and the update server machine 102 may be a remote server, where the remote server runs as a virtual machine instance in a cloud-computing network. However, in other embodiments at least one of the service provider machine 110 and the update server machine 102 is a computing device, such as a mobile phone, tablet, laptop computer, desktop computer, etc.

The system embodiment shown in FIG. 1 provides for communication between a service provider machine 110 and a terminal machine 120. As depicted in FIG. 1, the communication can be facilitated using a wireless communications network between the terminal machine wireless transceiver 124 and a wireless transceiver 114 in communication with the service provider machine 110. In some embodiments, the wireless communications network may be a CDMA or GSM telecommunications network capable of transmitting data between network users. Other components of the system such as wireless base stations, network links, network resource controllers and other components of the wireless communications network are not shown in FIG. 1. In alternative embodiments, the communication may also be transmitted over a wireless communications network that includes a wired network connection or a public switched telephone network (PSTN).

As described above, a specialized communication or transaction occurs between a user of the terminal machine 120 and the service provider machine 110. The transaction may be performed in accordance with a dialogue protocol. In one embodiment, the dialogue protocol is determined, at least in part, by the service provider application 112 (residing on the service provider machine 110) and the terminal application 122 (residing on the terminal machine 120). In a preferred embodiment, the dialogue protocol guides a user through a transaction or series of transactions with a service provider.

The system may conduct a transaction in a continuous communications mode, a delayed communications mode, and a mode that alternates between continuous and delayed communication modes. The mode depends on the availability, performance, or cost of the communication network between the terminal machine 120 and the service provider machine 110.

A system operating in a continuous communications mode transmits and receives data between the terminal machine 120 and the service provider machine 110 at the same time or nearly the same time as a transaction is conducted between the user and a service provider. For example, data that is entered at the terminal machine 120 by a terminal user is typically transmitted to the service provider machine 110 before the user is prompted for additional input. The system may operate in a continuous communications mode if the communication network is available and can provide performance adequate to transfer data between prompts, without causing an appreciable delay in the transaction. One advantage to operating in a continuous communications mode is that transactional information sent by the service provider machine 110 is likely to be more current than if the transactional information had been previously stored on the terminal machine 120.

A system operating in a delayed communications mode stores data input at the terminal machine 120 and transmits the data to a service provider machine 110 at a time that is after a transaction is completed between the user and service provider. For example, a series of prompts may be stored on the terminal machine 120 and used to collect a series of user inputs. The user inputs are stored and then transmitted to the service provider machine 110 at a later time. The system may operate in a delayed communications mode if the communication network is not accessible or reliable at the time of the transaction. An intermittent communications mode may also be used if the communication network is available, but it is advantageous to minimize the number of communications between the terminal machine 120 and the service provider machine 110. Typically, the cost of data transmission over a communications network is lower when the number of transmissions is reduced. Operating in a delayed communications mode may also result in an improved system response because there is little or no delay due to data transmission over the communications network.

A system can also alternate between modes by operating a portion of the time in a continuous communications mode and a portion of the time in a delayed communications mode. For example, a series of data entries may be stored on the terminal machine 120 and then transmitted as a group to the service provider machine 110 before the transaction is complete. By alternating between communications modes, the system may reduce communications costs by minimizing the number of data transmissions. Alternating between communication modes also allows the service provider machine 110 to provide the terminal machine 120 with up-to-date transactional information.

With regard to hardware components used communication using the wireless communications network, the service provider machine 110 may be in communication with a wireless transceiver 114, which is able to send and receive data over the wireless communications network. In some embodiments, the wireless transceiver 114 is separate from the service provider machine 110, and is in communication with the service provider machine 110 using a computer network connection. For example, in some embodiments, the wireless transceiver 114 may be part of a base station in a wireless communications network. In alternative embodiment, the wireless transceiver 114 is dedicated to the service provider machine 110 and/or is connected directly to the service provider machine 110.

The service provider machine 110 also includes a service provider application 112 that is able to direct the service provider machine's portion of the dialogue protocol. Details regarding the service provider application are described in more detail in FIG. 2 below.

The terminal machine 120 may also include a wireless transceiver 124 able to send and receive data over the wireless communications network. The terminal machine 120 also includes a terminal application 122 that is able to direct the terminal machine's portion of the dialogue protocol. Additionally, the terminal machine 120 includes a user display 126 and a data entry device 128 for interacting with a system user. For example, the user display 126 may include a monitor or screen and the data entry device 128 may include a keypad or keyboard. See FIG. 9 for a more detailed description of the components of a terminal machine 120.

Also depicted in FIG. 1, the update server machine 102 communicates with the service provider machine 110 and the terminal machine 120 using the wireless communications network described above. The update server machine 102 may include a wireless transceiver 104 adapted for communication over the wireless communications network. In some embodiments, the wireless transceiver 104 is separate from the update server machine 102, and is in communication with the update server machine 102 using a computer network connection.

The update server machine 102 also includes at least one dialogue module 106. As discussed in more detail below, the dialogue module 106 may include portions of code and/or instructions that are able to modify the dialogue protocol between the terminal machine 120 and the service provider machine 110. In a preferred embodiment, the dialogue module is less than 1 Mb to facilitate communication over a network with limited data transfer capacity.

Figure 2:
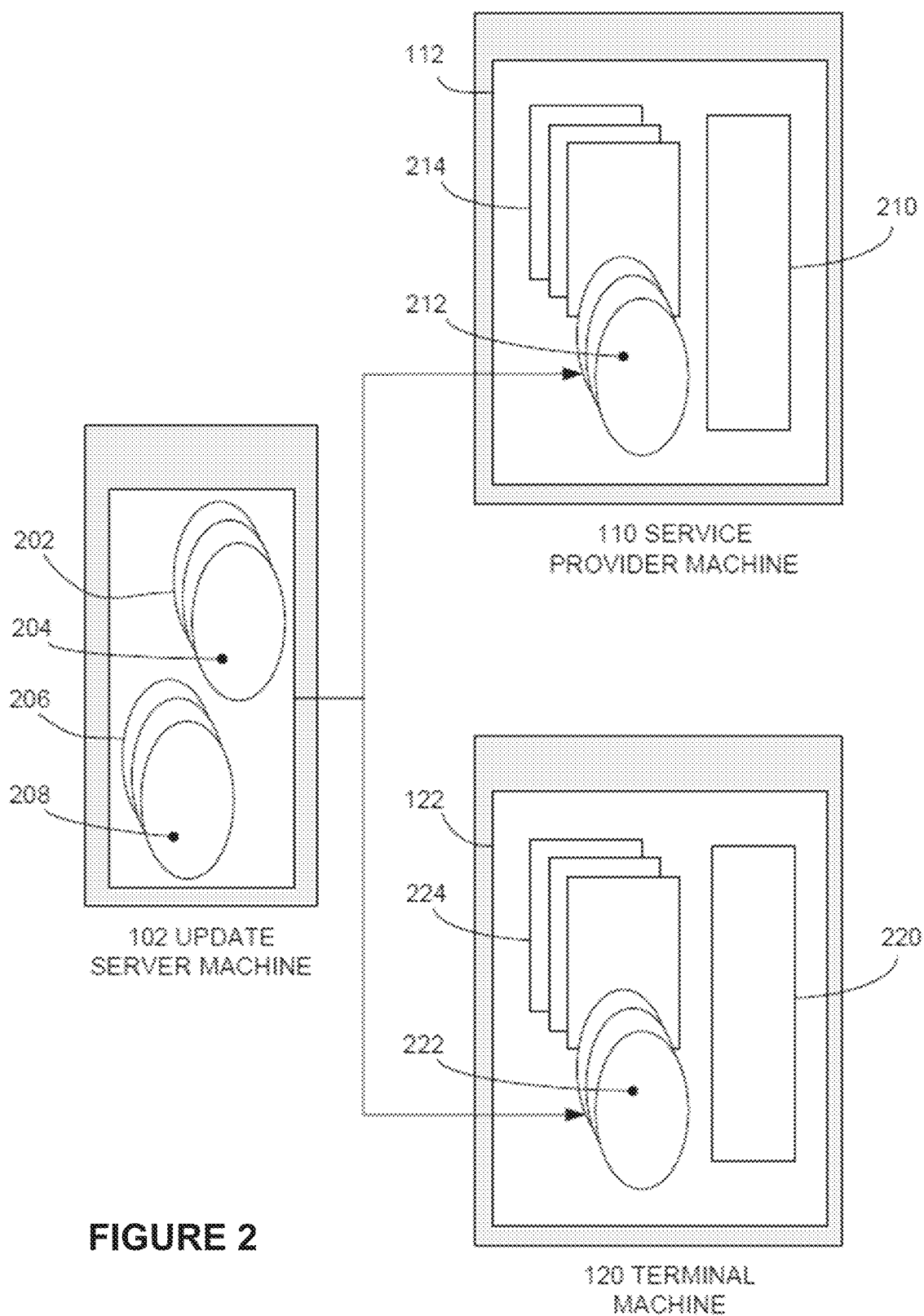
FIG. 2 illustrates the use of a dialogue module in a computerized system.

FIG. 2 illustrates components of a computerized system used to update a dialogue protocol. In one embodiment, an update server machine 102 includes a terminal dialogue module 202 and a service provider dialogue module 206. Each dialogue module 202, 206 may include one or more portions of code or instructions. In this exemplary embodiment, the terminal dialogue module 202 includes terminal code 204 and the service provider dialogue module 206 includes service provider code 208. In some embodiments, the terminal code 204 and the service provider code 208 are the same code.

A dialogue module may be communicated to individual components in the system. The embodiment in FIG. 2 depicts two components, a service provider machine 110 and a terminal machine 120. A dialogue module 202 containing terminal code 208 is communicated to, and stored on, the terminal machine 120. Likewise, a dialogue module 206 containing service provider code 204 is communicated to, and stored on, the service provider machine 110.

In a preferred embodiment, the service provider machine 110 includes a service provider application 112. The service provider application 112 includes a process or processes that allow the service provider machine 110 to conduct the service provider's portion of a dialogue sequence. See FIG. 4 for an example of a dialogue sequence including two machines in a system. In a preferred embodiment, the service provider application 112 includes a computer process for receiving data from a user and is able to update one or more records associated with a dialogue sequence. As shown in FIG. 2, the service provider application 112 may include a platform module 210, a set of computer-executable instructions 214, and service provider code 212.

Figure 10:
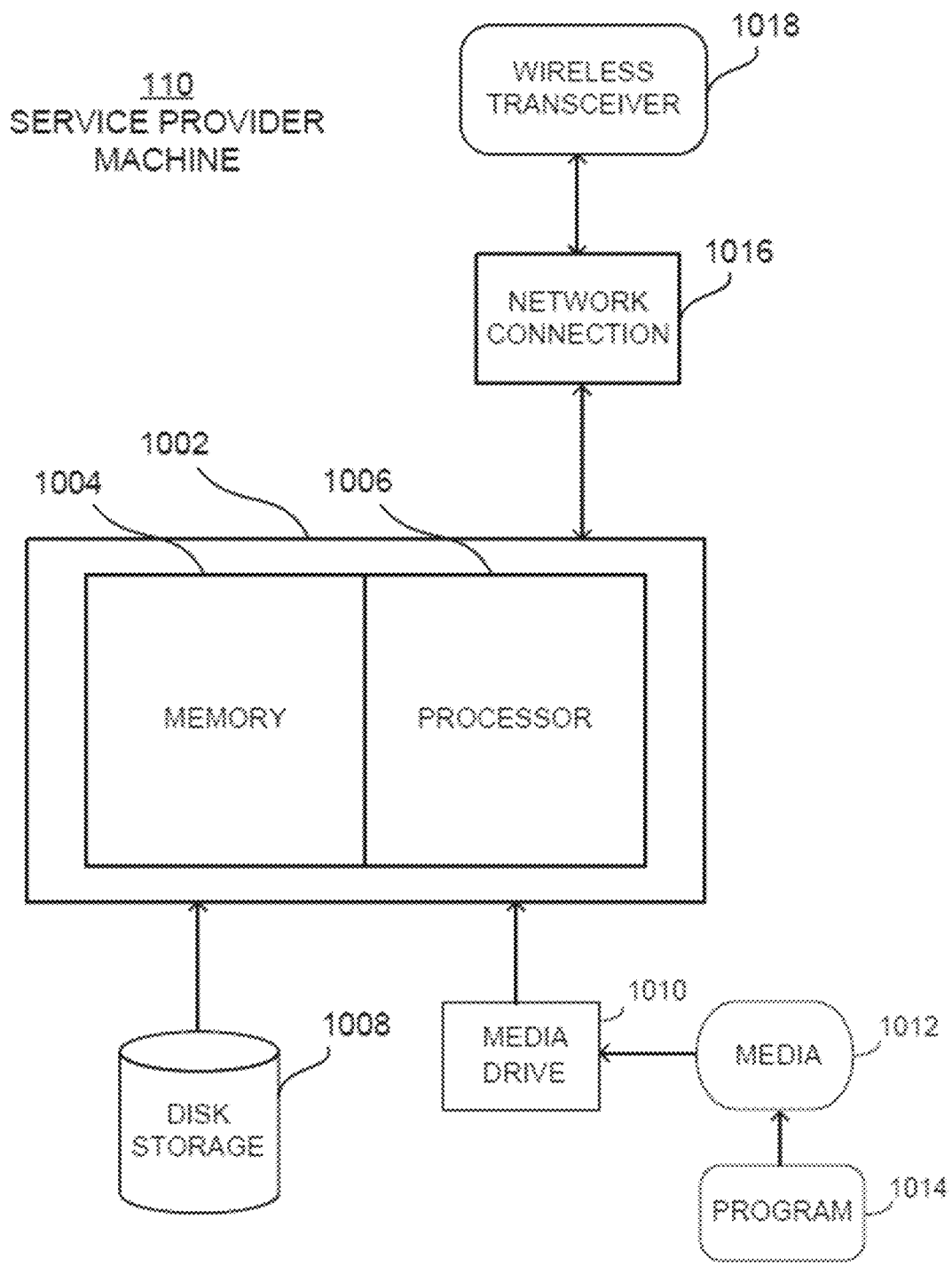
FIG. 10 illustrates an exemplary embodiment of a service provider machine.

In one embodiment, the platform module 210 is also a set of computer-executable instructions that is able to be executed or performed by a service provider machine's computer processor 1006 without additional translation or modification (see FIG. 10 for hardware components of a service provider machine 110). In one embodiment, the platform module 210 is able to interpret the service provider code 212 (stored on the service provider machine 110) so that the code is used when executing the service provider application 112. For example, in some embodiments, the platform module 210 is a virtual machine able to interpret service provider code 212, stored in the form of intermediate code (e.g., Java Byte Code). In other embodiments, the platform module 210 may be another type of executable or computer-executable code that is able to be executed or performed by a service provider machine's computer processor 1006. The platform module 210 may also utilize other computer-executable instructions 214 stored on the service provider machine 110. For example, the platform module may use other dynamically linked libraries or software components.

The service provider application 112 may also include library functions and custom functions that may be referenced by the service provider code 212. For example, in some embodiments, the service provider code 212 may make calls to library or custom functions associated with the service provider application 112.

Similarly, the terminal machine 120 includes a terminal application 122, which allows the terminal machine 120 to conduct the terminal's portion of a dialogue sequence. The terminal application 112 includes a platform module 220, a set of computer-executable instructions 224 and terminal code 222.

Both the service provider code 212 and the terminal code 222 may determine various features of the dialogue protocol including the substantive content of a dialogue sequence (e.g., a sequence of dialogue prompts and user data entries). The code may also determine portions of the graphical user interface presented on a user display. Various features of the dialogue protocol can be modified by downloading a different service provider code 204 and/or terminal code 208 from the update server machine 102. Service provider code 212 and terminal code 222 are discussed in more detail below with reference to the method 1900.

2. Dialogue Module, Update Sequence

Figure 3A:
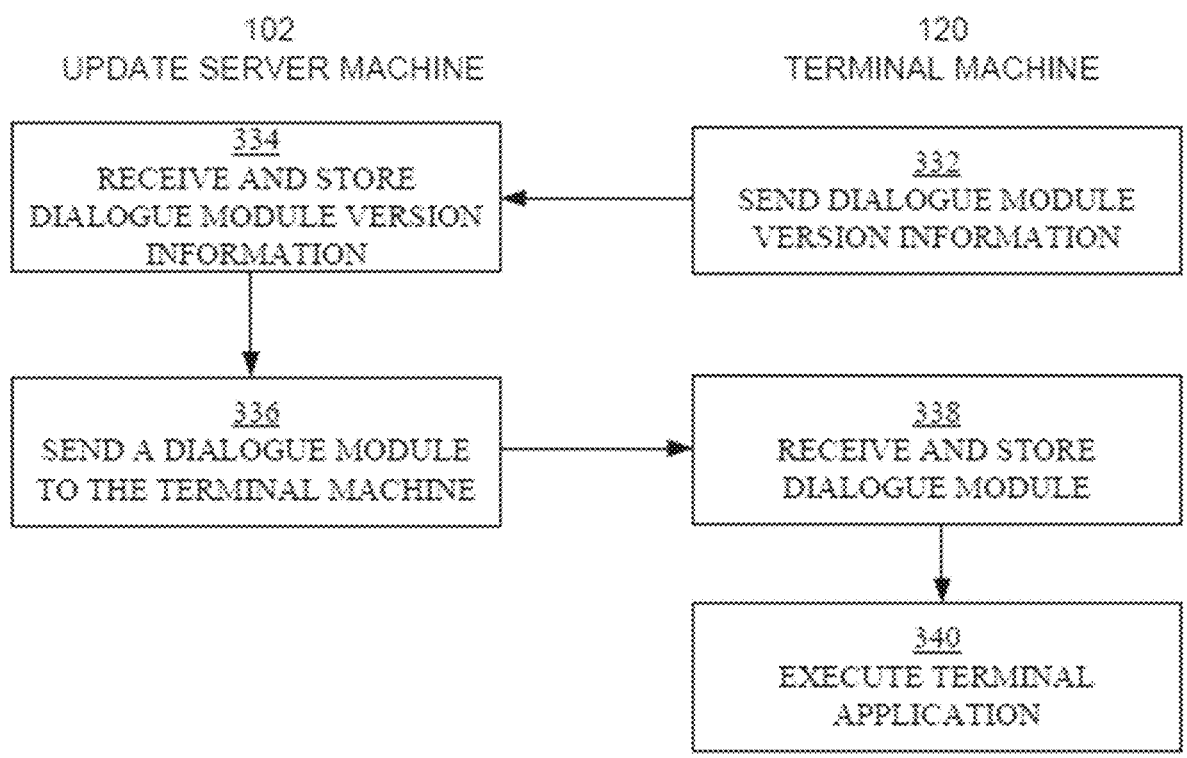
FIG. 3A illustrates a process for updating a dialogue module on a terminal machine using an update server machine.

As described earlier, the dialogue protocol between components in a computerized system may be adapted by uploading a dialogue module. The steps in an exemplary update sequence for uploading a dialogue module to a terminal machine 120 are depicted in FIG. 3A. The following simplified embodiment describes the communication between an update server machine 102 and a terminal machine 120. However, a typical embodiment may include multiple terminal and service provider machines.

In step 332, the terminal machine 120 sends dialogue module version information to the update server machine 102. In some embodiments, the dialogue module version information reflects the version of terminal code that is being used by a terminal application. The version information may be sent in response to an inquiry or request from the update server machine 102. In some embodiments, the dialogue version information may indicate that there is no terminal code currently saved on the terminal machine 120. In an alternative embodiment, the version information is already stored on the update server machine. For example, the version information may be included in a database associating version information with specific terminal machines.

In step 334, the dialogue module version information is received and stored by the update server machine 102. In some embodiments, the version information is associated with the terminal machine 120 and stored in a database including other version information associated with other terminal machines. In some embodiments, the database is used to identify terminal machines that require an updated dialogue module.

For example, a system administrator may specify that one or more terminal machines must support a particular dialogue protocol. The database may be queried by the update server machine 102 to determine which of the terminal machines, if any, currently support that particular dialogue protocol. For those terminal machines that do not support that particular dialogue protocol, the update server machine 102 may determine the dialogue module that is required to enable the particular dialogue protocol. For example, a dialogue module may be selected to provide features and functionality that the terminal device does not currently support.

In step 336, the update server machine 102 sends a dialogue module to the terminal machine 120. The dialogue module may include terminal code and other information to be used by the terminal application. In a preferred embodiment, the dialogue module includes modified terminal code that adapts the terminal application to perform a modified dialogue protocol with a service provider machine. In other embodiments, the dialogue module may include additional or new terminal code that, together with the existing terminal code, provides a specified functionality. In some embodiments, the dialogue module includes information in addition to the terminal code. For example, the dialogue module may include text files, version information or metadata identifying the content of the dialogue module. In some embodiments, the update server machine 102 sends the dialogue module (e.g., one or more portions of code or instructions) to the terminal machine 120 in response to the terminal machine 120 requesting the dialogue module, satisfying a location-based trigger condition, and/or satisfying (or failing to satisfy) some other threshold or criteria.

In step 338, the dialogue module is received and stored by the terminal machine 120. In one embodiment, the dialogue module replaces existing terminal code already saved on the terminal machine 120. In other embodiments, there may not be any terminal code previously saved on the terminal machine 120. For example, the terminal code previously saved on the terminal machine may be an empty set of code. In some cases, the terminal code may supplement other code previously saved on the terminal machine 120.

The newly transferred terminal code is not compiled on the terminal machine 120. In some embodiments, the terminal code may be intermediate code in the form of Java Byte Code. As described earlier, the intermediate code may be interpreted by a platform module portion of the terminal application. In a preferred embodiment, computer-executable instructions or binary code comprising the platform module or other portions of the terminal application (previously stored on the terminal machine) is not deleted or replaced.

In step 340, the terminal machine 120 executes the terminal application. In a preferred embodiment, on execution, the terminal application uses the terminal code sent to the terminal machine 120 in step 336. The terminal code adapts the terminal application to perform a modified dialogue protocol with the service provider machine 110. The terminal application is able to be executed without recompiling or replacing portions of the computer-executable instructions that are included in the platform module of the terminal application. Updating a dialogue protocol between the terminal machine 120 and the service provider machine 110 is discussed in more detail below with reference to the method 1900.

Figure 3B:
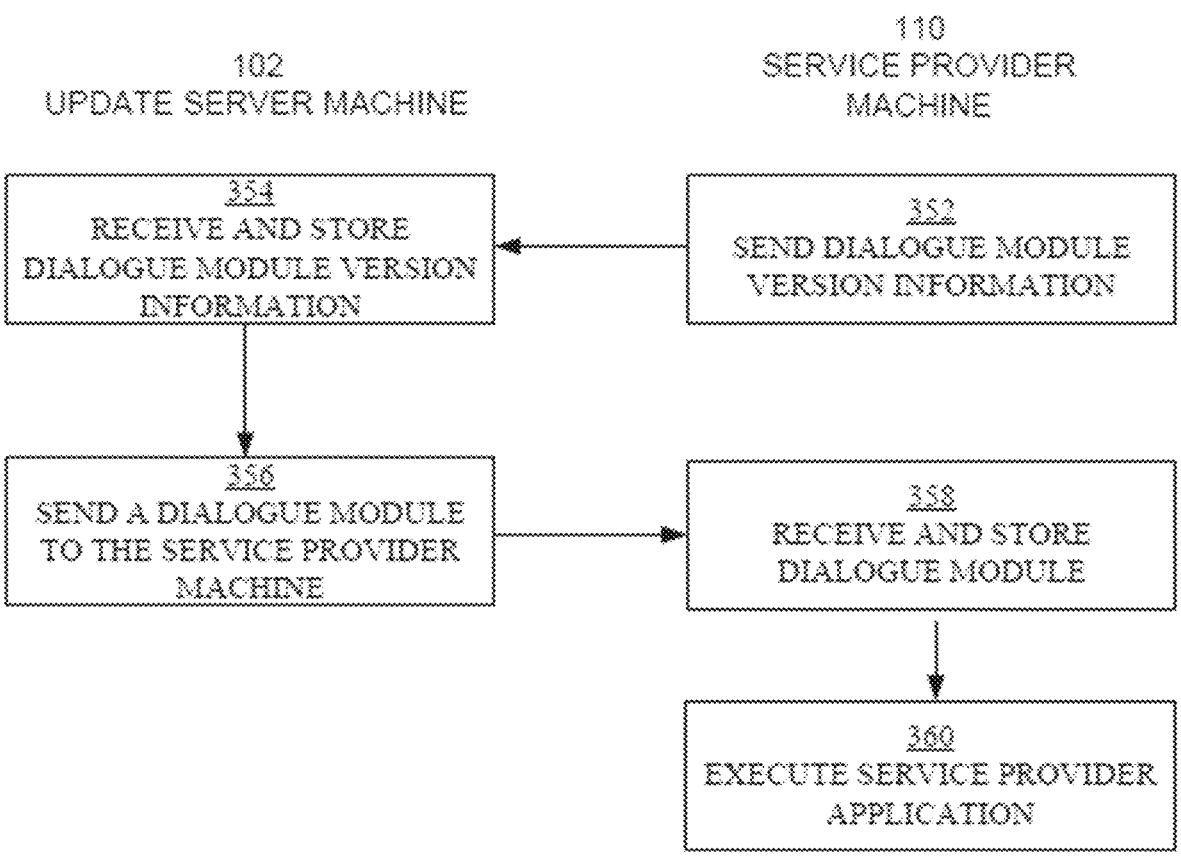
FIG. 3B illustrates a process for updating a dialogue module on a service provider machine using an update server machine.

The steps in an exemplary update sequence for a service provider machine 110 are depicted in FIG. 3B. The following simplified embodiment describes the communication between an update server machine 102 and a service provider machine 110. However, other embodiments may include more than one service provider machine.

In step 352, the service provider machine 110 sends dialogue module version information to the update server machine 102. In some embodiments, the dialogue module version information reflects the version of service provider code that is being used by a service provider application. The version information may be sent in response to an inquiry or request from the update server machine 102. In some embodiments, the dialogue version information may indicate that there is no service provider code currently saved on the service provider machine 110. In an alternative embodiment, the version information is already stored on the update server machine. For example, the version information may be included in a database associating version information with specific service provider machines.

In step 354, the dialogue module version information is received and stored by the update server machine 102. In some embodiments, the version information is associated with the service provider machine 110 and stored in a database including other version information associated with other service provider machines. In some embodiments, the database is used to identify service provider machines that require an updated dialogue module.

For example, a system administrator may specify that one or more service provider machines must support a particular dialogue protocol. The database may be queried by the update server machine 102 to determine which of the service provider machines, if any, currently support that particular dialogue protocol. For those service provider machines that do not support that particular dialogue protocol, the update server machine 102 may determine the dialogue module that is required to enable the particular dialogue protocol. For example, a dialogue module may be selected to provide features and functionality that the terminal device does not currently support.

In step 356, the update server machine 102 sends a dialogue module to the service provider machine 110. The dialogue module may include service provider code and other information to be used by the service provider application. In a preferred embodiment, the dialogue module includes modified service provider code that adapts the service provider application to perform a modified dialogue protocol with a terminal machine. In other embodiments, the dialogue module may include additional or new service provider code that, together with the existing service provider code, provides a specified functionality. In some embodiments, the dialogue module includes information in addition to the service provider code. For example, the dialogue module may include text files, version information or metadata identifying the content of the dialogue module.

In step 358, the dialogue module is received and stored by the service provider machine 110. In one embodiment, the dialogue module replaces existing service provider code already saved on the service provider machine 110. In other embodiments, there may not be any service provider code previously saved on the service provider machine 110. In some cases, the service provider code may supplement other code previously saved on the service provider machine 110.

The newly transferred service provider code is not compiled on the service provider machine 110. In some embodiments, the service provider code may be intermediate code in the form of Java Byte Code. As described earlier, the intermediate code may be interpreted by a platform module portion of the service provider application. In a preferred embodiment, computer-executable instructions or binary code comprising the platform module or other portions of the service provider application (previously stored on the service provider machine) is not deleted or replaced.

In step 360, the service provider machine 110 executes the service provider application. In a preferred embodiment, on execution, the service provider application uses the service provider code sent to the service provider machine 110 in step 356. The service provider code adapts the service provider application to perform a modified dialogue protocol with a terminal machine 120. The service provider application is able to be executed without recompiling or replacing portions of the computer-executable instructions that are included in the platform module of the terminal application.

Figure 4A:
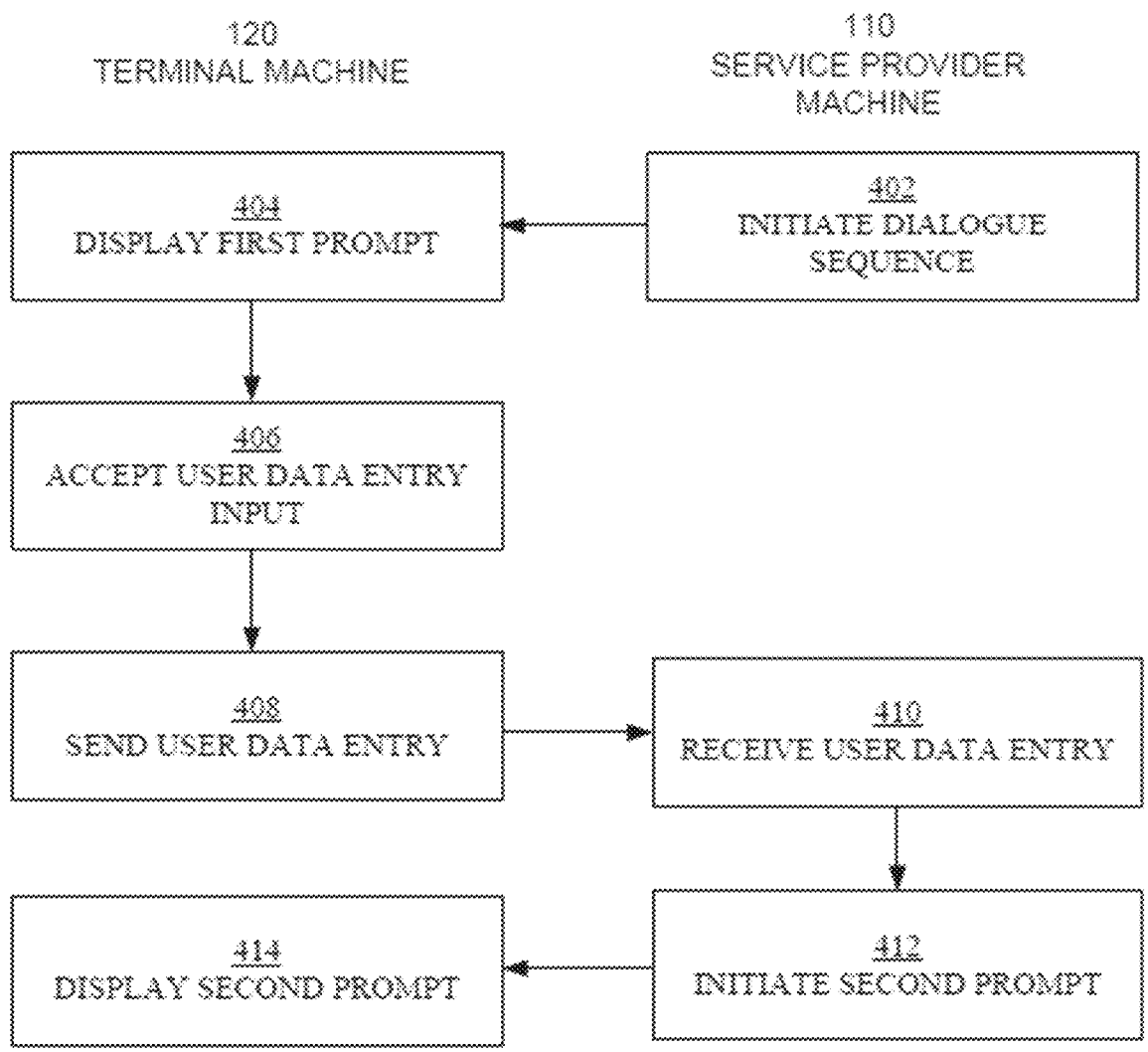
FIG. 4A illustrates a dialogue sequence including a terminal machine and a service provider machine in a continuous communications mode.

3. Dialogue Sequence Including a Terminal Machine and a Service Provider Machine FIG. 4A depicts an exemplary dialogue sequence 400 including a terminal machine 120 and a service provider machine 110 communicating in a continuous mode. The dialogue sequence 400 may include a series of prompts and user data entries as part of an overall dialogue protocol between the terminal machine 120 and the service provider machine 110.

In step 402, the dialogue sequence 400 is initiated by a service provider machine 110. For example, the service provider machine 110 may send a command to the terminal machine 120 to begin a dialogue sequence. In other embodiments, the dialogue sequence 400 may be initiated by the terminal machine 120 or by the user of the terminal machine.

During the initiation of the dialogue sequence 400 one or more initial dialogue parameters may be specified. For example, the initial dialogue parameters may designate a transaction type, language preference, or user authorization code.

The dialogue protocol may require an authorization step at the beginning of the dialogue sequence 400. An authorization step verifies the identity of the user operating the terminal machine 120, and verifies that the user has permission to conduct the dialogue sequence 400. To verify the identity of the user, the system may require the user to input unique information that only the user may know, such as a password, personal identification number ("PIN"), or family name. Additionally or alternatively, the system may require a biometric identifier from a user, such as a fingerprint, eye retinal pattern, or voice signature. Other methods of identifying the user include identifying a device or item that are assumed to be in possession of the user. For example, the system may identify the terminal machine 120 by receiving a serial number, electronic network address, or other electronic data stored on the terminal machine 120. The system may also identify a credit card, smart card or ID card that is scanned into the terminal machine 120 using a card scanning device. The system can verify that the user has permission to conduct the dialogue sequence 400 by comparing the collected user information to a stored record of authorized users.

If the system is operating in a continuous communications mode, the system may require authorization from a service provider before completing a transaction between a user and the service provider. In this example, the authorization occurs at the beginning of the dialogue sequence 400. However, the authorization may also occur during or at the end of the dialogue sequence.

In step 404, the terminal machine 120 displays a first prompt in response to the dialogue sequence 400 being initiated. The type of prompt displayed may depend, in part, on the initial dialogue parameter. For example, the first prompt may be displayed in Spanish, if an initial dialogue parameter specifies that Spanish is the preferred language.

In step 406, the terminal machine 120 accepts data entry input from the user. The data entry input may be any user driven input received from a data entry device 128 (see FIGS. 1 and 9). For example, the data entry input can be one or more character strings entered using a keyboard or keypad. Alternatively, the data entry input may be the coordinates of a user selection corresponding to a location on a terminal display (e.g., a selection using computer mouse). The data entry input could also be an acknowledgement or button press from a data entry device on the terminal machine 120.

In step 408, information regarding the user data entry is transmitted to the service provider machine 110. In this embodiment, the user data entry is sent after the data entry has been accepted by the terminal machine 120. However, if the system is alternating between a continuous and delayed communications mode, the terminal machine may accept two or more data entries before sending the two or more data entries to the service provider machine. For example, the terminal machine 120 may wait until the user has completed a sequence of data entries associated with one transaction before sending the data entries to the service provider machine.

In step 410, information regarding the user data entry is received by the service provider machine 110 and stored in memory. The user data entry may, in part, determine the second prompt in the dialogue sequence. The user data entry may also be used to signal other events or initiate other functionality of the dialogue protocol. As described above, in some embodiments the user data entry may also be received as two or more data entries.

In step 412, a second prompt is initiated by the service provider machine. The initiation of the second prompt may include one or more subsequent dialogue parameters. Similar to the initial dialogue parameters described above, the subsequent dialogue parameters may include a transaction type, language preference, or authorization code. The subsequent dialogue parameter may also specify a subsequent prompt or series of prompts to be presented on the terminal display.

In step 414, the terminal machine 120 displays a second prompt in response to the second prompt 412 being initiated by the service provider machine 110. Similar to the process described above for steps 406, 408 and 410, the terminal machine 120 accepts a second data entry input, sends the second data entry input to the service provider machine 110, which stores the second data entry input in memory.

The steps described above illustrate a simplified example of a dialogue sequence including a terminal machine and a service provider machine communicating in a continuous mode. Other embodiments include multiple prompts and multiple user data entries. In some embodiments a dialogue sequence includes one or more transactions with the user of the terminal machine.

Figure 4B:
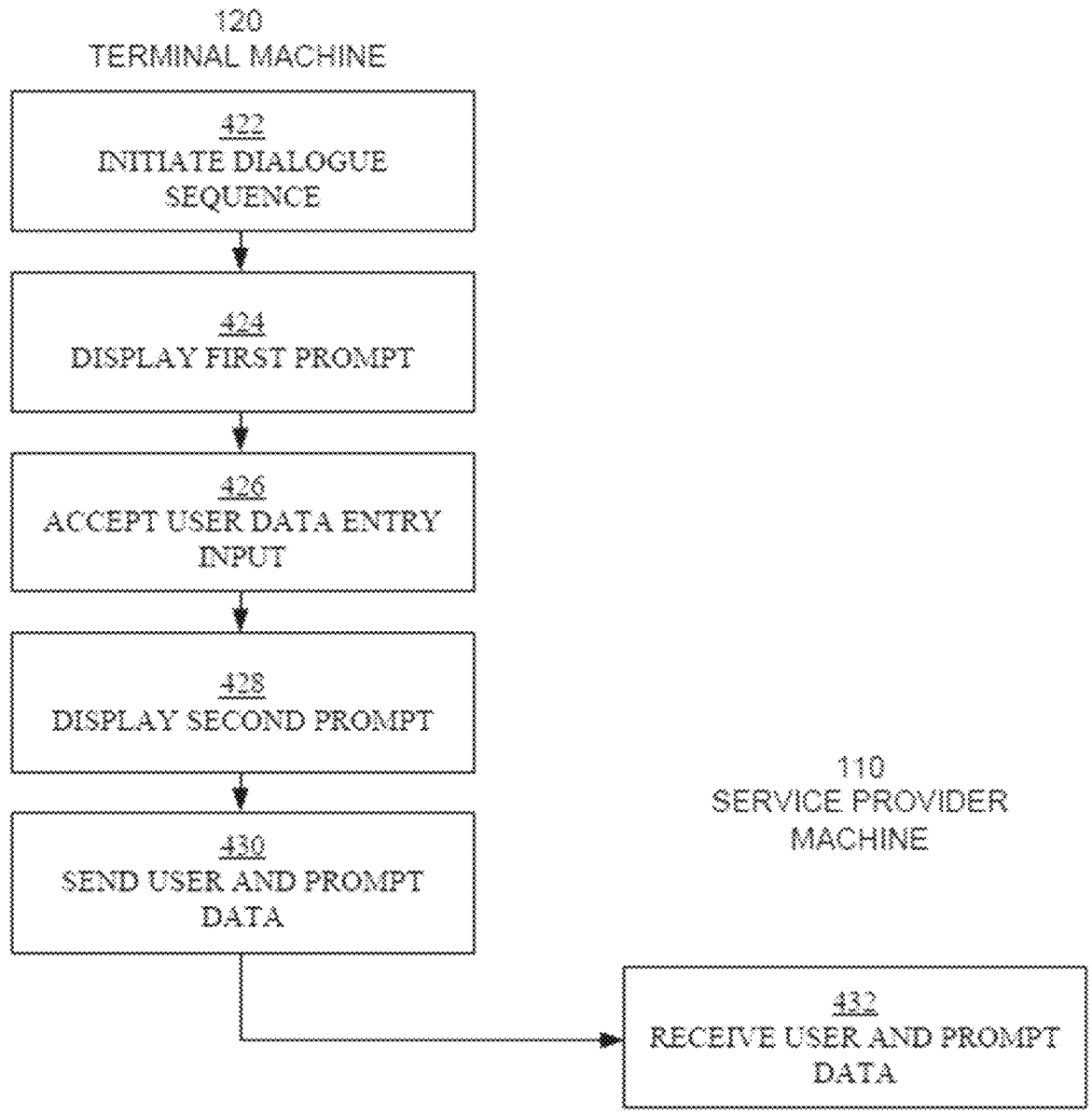
FIG. 4B illustrates a dialogue sequence including a terminal machine and a service provider machine in a delayed communications mode.

FIG. 4B depicts an exemplary dialogue sequence 420 including a terminal machine 120 and a service provider machine 120 communicating in a delayed communications mode. The dialogue sequence 420 may include a series of prompts and user data entries as part of an overall dialogue protocol between the terminal machine 120 and the service provider machine 110.

In step 422, a dialogue sequence is initiated by the terminal machine 120 or by the user of the terminal machine. During the initiation of a dialogue sequence one or more initial dialogue parameters may be specified. For example, the initial dialogue parameters may designate a transaction type, language preference, or user authorization code.

If the system is operating in a delayed communications mode, the system may require authorization from a service provider after completing the dialogue sequence 420. If the dialogue sequence 420 represents a transaction, the authorization may not performed until the transaction has been completed. In this case, the terminal machine 120 collects data associated with the transaction and stores it until it can be transmitted to the service provider machine 110. The authorization with the service provider may occur after the transmission is complete.

In step 424, the terminal machine 120 displays a first prompt in response to a dialogue sequence being initiated. As described above, the type of prompt displayed may depend, in part, on the initial dialogue parameter. In step 426, the terminal machine 120 accepts data entry input from the user. The data is stored by the terminal machine 120 and associated with the first prompt displayed in step 424.

Similarly, in step 428, the terminal machine 120 displays a second prompt in the dialogue sequence 420. The user data entry may, in part, determine the second prompt in the dialogue sequence. The data is stored by the terminal machine 120 and associated with the second prompt. This process is repeated until the dialogue sequence 420 is complete.

Figure 12:
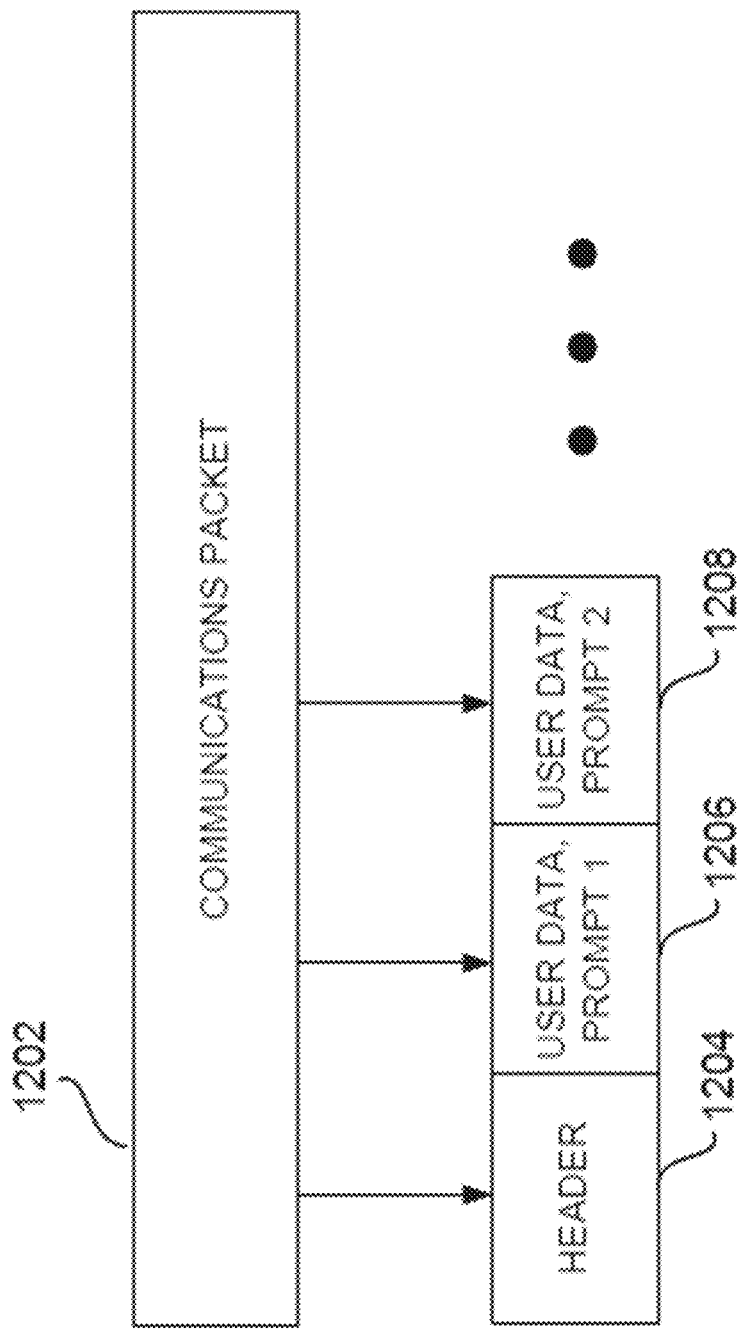
FIG. 12 illustrates an exemplary logical communications packet structure.

In step 430, the combined user data is sent to the service provider machine 110. As described above, in a delayed communications mode, the data may not be transmitted to the service provider machine 110 until a later time when a communication network is available. In some cases, a communications network is available, but the system transmits a group or series of user data entries to reduce network usage. In some cases, the series of prompts associated with the user data are also transmitted in step 430. For example, FIG. 12 depicts an exemplary communications packet that contains a series of prompts and the associated user data.

The steps described above illustrate a simplified example of a dialogue sequence including a terminal machine and a service provider machine communicating in a delayed mode. As described above, a dialogue sequence may also be performed in a mode that alternates between continuous and delayed communication modes.

4. Logical Communications Packet

Communication between the terminal machine and the service provider machine may be performed using a communications packet. FIG. 12 depicts an exemplary communications packet 1202 that may be sent from a terminal machine to a service provider machine, which may start with a header element 1204 followed by a series of user data elements (1206, 1208). In some embodiments, the user data elements (1206, 1208) are associated with a series of prompts that are displayed on the terminal machine. Some prompts may simply provide information to the user without capturing any user data.

As shown in FIG. 12 the header element 1204 may include information including the size of the packet and the number of user data elements. The next element in the communications packet may be a user data element 1206 associated with prompt 1 followed by a user data element 1208 associated with prompt 2. As described above, some prompts may have no user data and may include a null data set.

The dialogue module may specify the header of the communications packet, the size, and locations of the user data elements associated with each screen. This is a "logical" communications packet structure only, and the actual implementation of the communications packet may be different, for example to locate and/or encode the data from the different prompts more efficiently so as to reduce the size of the packet.

In some embodiments, a dialogue module may also define the structure of the communications packet that is communicated between the terminal machine and the service provider machine. New or modified dialogue protocols may require new or modified communications packets between the terminal machine and the service provider machine. For example, in some countries or regions an account may be associated with a person using two last names. In this case, the terminal machine application would have to be modified to accept two last names. The addition of the second last name will require the length of the communications packet to be increased. Also, the structure of the communications packet, including the addition of a new data field (e.g., the use of a second last name) would need to be specified to both the terminal machine and the service provider machine.

In some embodiments, a dialogue protocol may require that new or additional information be sent from the terminal machine to the service provider machine. For example, the number of prompts, the size of the data entries or the type of data entries may change. In this embodiment, the structure of the communications packet would be modified to accommodate new or additional information.

5. Examples of a Terminal Graphical User Interface

Figure 5A:
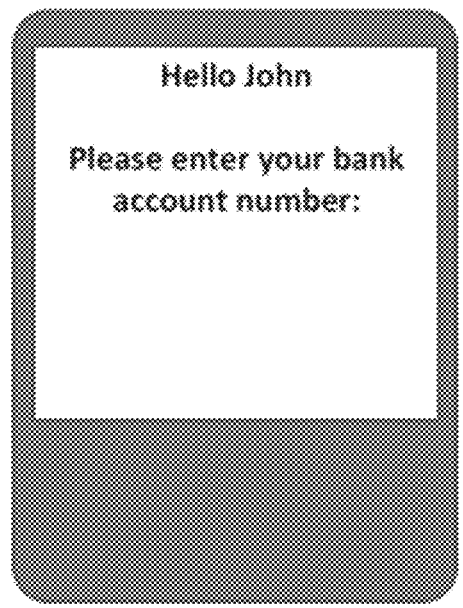
FIG. 5A illustrates an example of a first prompt in a banking dialogue protocol.
Figure 5B:
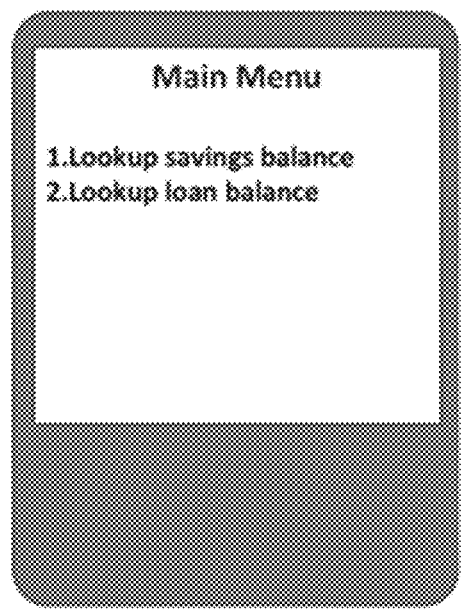
FIG. 5B illustrates an example of a subsequent prompt in a banking dialogue protocol.

FIGS. 5A to 5B depict an example of a series of prompts that may be displayed in a dialogue sequence. This particular series of prompts may be used to guide a user through a banking transaction. These two exemplary prompts are only a portion of a series of prompts that guide a user through an entire transaction.

FIG. 5A depicts an initial prompt presented on a terminal machine display. In some embodiments, one or more initial dialogue parameters may have been used to specify the user's name, the language preference and the type of authorization prompt required. Additionally, properties such as the text of the prompts, prompt sequence, and prompt display may be driven in part by either the terminal code, the service provider code, or both.

To continue to the next prompt, the user must enter an account number using the data entry device on the terminal machine. The initial prompt may also serve as a method of verifying the identity of the user by not allowing the transaction to continue unless a valid account number is entered.

FIG. 5B depicts an exemplary multiple selection prompt. The next prompt in the series may be partially dependent on the selection made by the user.

Figure 6A:
FIG. 6A illustrates an example of first prompt in a banking dialogue protocol.
Figure 6B:
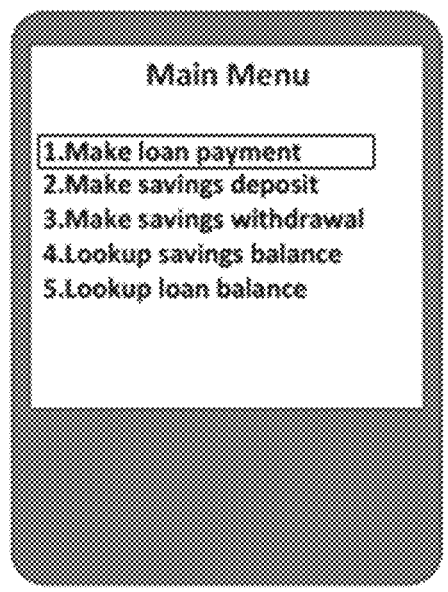
FIG. 6B illustrates an example of a multiple option prompt in a banking dialogue protocol.
Figure 6C:
FIG. 6C illustrates an example of a data entry prompt in a banking dialogue protocol.

FIGS. 6A to 6C illustrate a second example of a series of prompts that may be displayed in a dialogue sequence as part of a dialogue protocol. In some embodiments, the series of prompts in FIGS. 6A to 6C are driven by an updated terminal code or service provider code. For example, a dialogue module may have been downloaded from an update server machine to either a terminal machine, a service provider machine, or both a terminal and a service provider machine. The newly downloaded code may direct, in part, the series of prompts to be displayed.

In FIG. 6A, an initial prompt is displayed greeting the user and requesting a bank account number. In some embodiments, one or more updated initial dialogue parameters may have been used to specify the user's name, the language preference and the type of authorization prompt required. Additionally, properties such as the text of the prompts, prompt sequence, and prompt display may be driven in part by either the terminal code, the service provider code, or both. The initial prompt may be driven, in part, by the newly downloaded code. However, the initial dialogue parameters may be the same as in the example of FIGS. 5A to 5B.

In FIG. 6B, a modified or alternate multiple selection prompt is presented on the terminal machine display. The user may select one of the options presented by making a selection on the terminal display or by entering the corresponding selection number. In this example, the user has selected option 1. FIG. 6C depicts a prompt that is displayed in response to the user's previous selection.

Figure 7A:
FIG. 7A illustrates an example of a first prompt in a medical dialogue protocol.
Figure 7B:
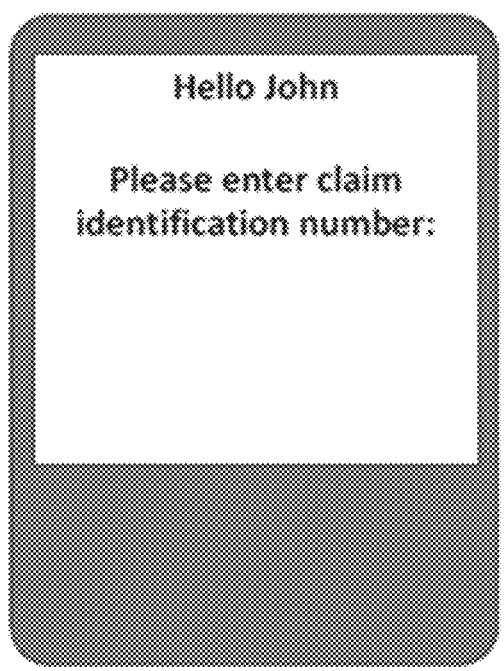
FIG. 7B illustrates an example of a subsequent prompt in a medical dialogue protocol.

FIGS. 7A to 7B depict a third example of a series of prompts that may be displayed in a dialogue sequence. The prompts in FIGS. 7A to 7B may be related to a medical provider transaction. In some embodiments, the sequence of prompts is driven by another dialogue module, downloaded from the update server machine.

6. Modifying the Dialogue Module Using a Design Tool

Figure 8A:
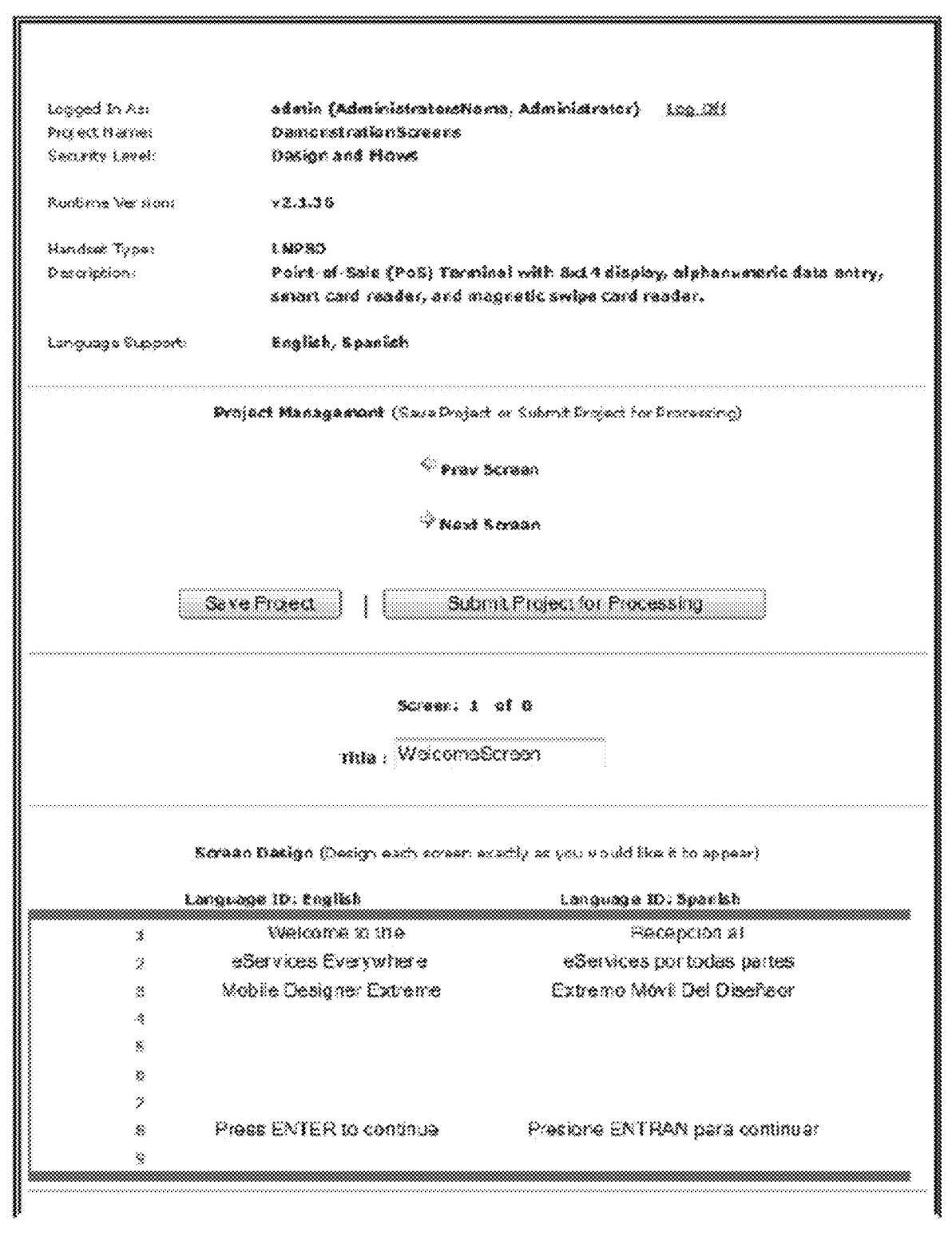
Figure 8B:
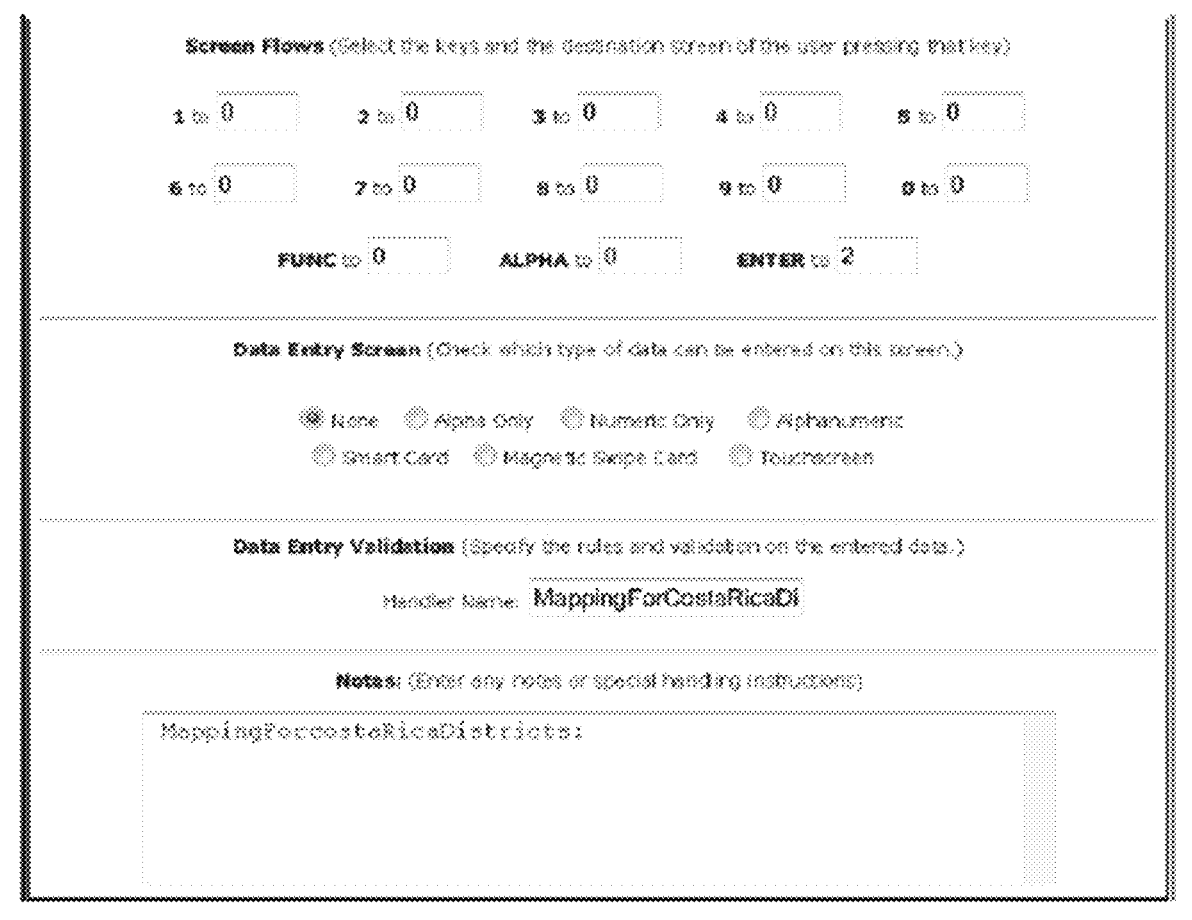

FIGS. 8A and 8B depict an example of a design tool that can be used to create or modify a dialogue module. As shown in FIG. 8A, various features of the dialogue module can be specified. For example, the interface allows a designer to enter the text to be used for a given prompt. Translation of the text may also be provided depending on the languages supported by the dialogue module. Additionally, the designer can select the specific prompts and sequence of prompts to be presented to a terminal user. The designer may also specify the type of user data entry that will be accepted. In some embodiments, a custom or library function may also be specified for the dialogue module.

As shown in FIG. 8B, the design tool may allow the designer to specify the flow of screens. Each screen is a visual depiction of a prompt that is presented to on the terminal machine. The number and order of screens can be modified by the designer. For example, if the user presses the "1" button from this current screen the next screen will be number "0." If the user presses the "ENTER" button from this current screen, then the next screen will be number 442:9

In some embodiments, the settings created using the design tool shown in FIGS. 8A and 8B are used to create or modify terminal code or service provider code. These portions of code may then be included in a dialogue module and downloaded to the appropriate machines in the system using an update server machine. In some embodiments, a version and/or a date may be associated with the code that is created or modified.

The screen shots depicted in FIGS. 8A and 8B are merely an example of a tool that can be used to generate a dialogue module. In the alternative, the dialogue module may be created or modified directly by changing the terminal or service provider code. FIGS. 13A to 18E depict additional examples of the design tool that can be used to create or modify a dialogue module. These figures are discussed in detail below.

7. System Machines

Figure 9:
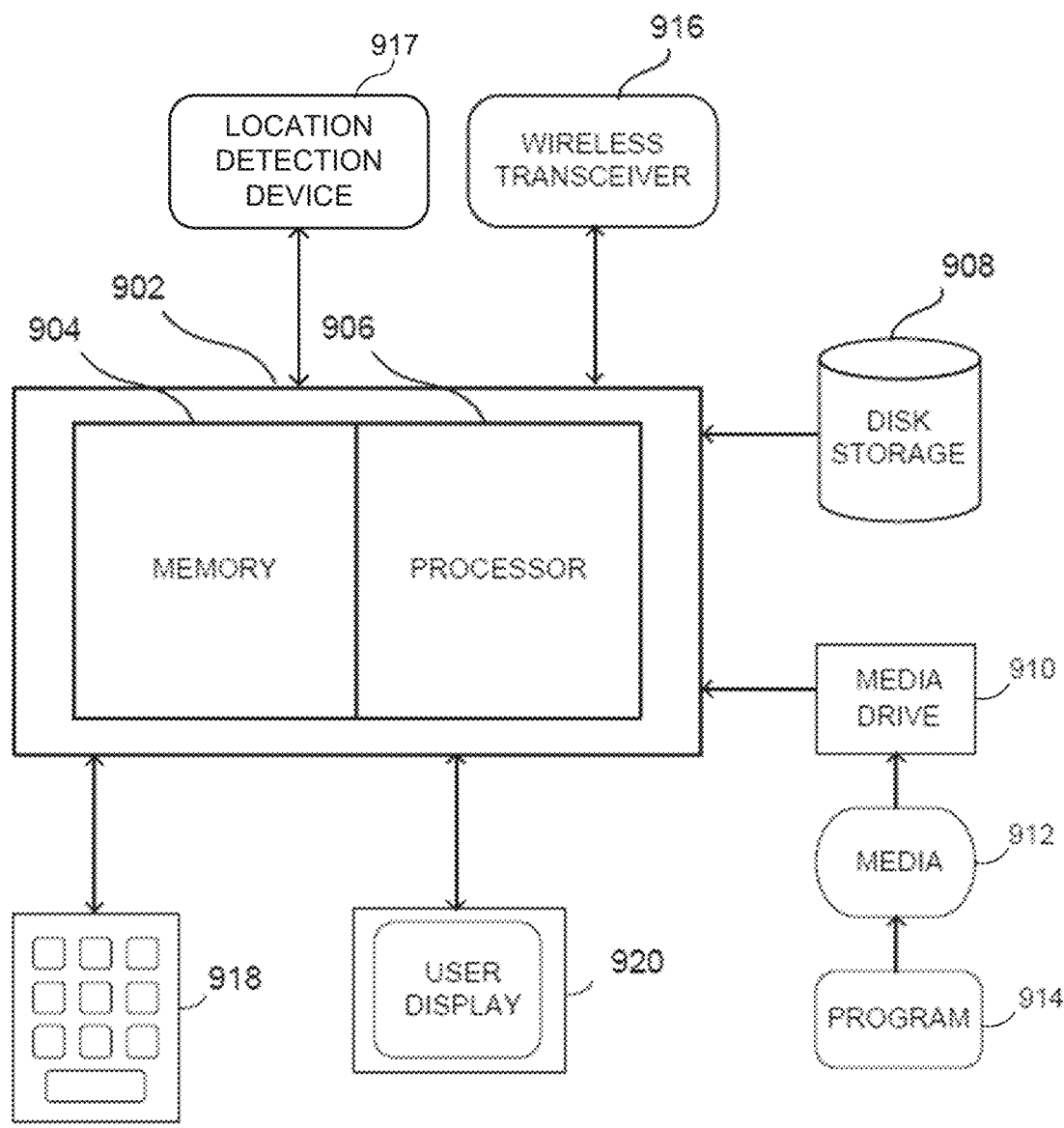
FIG. 9 illustrates an exemplary embodiment of a terminal machine.
Figure 11:
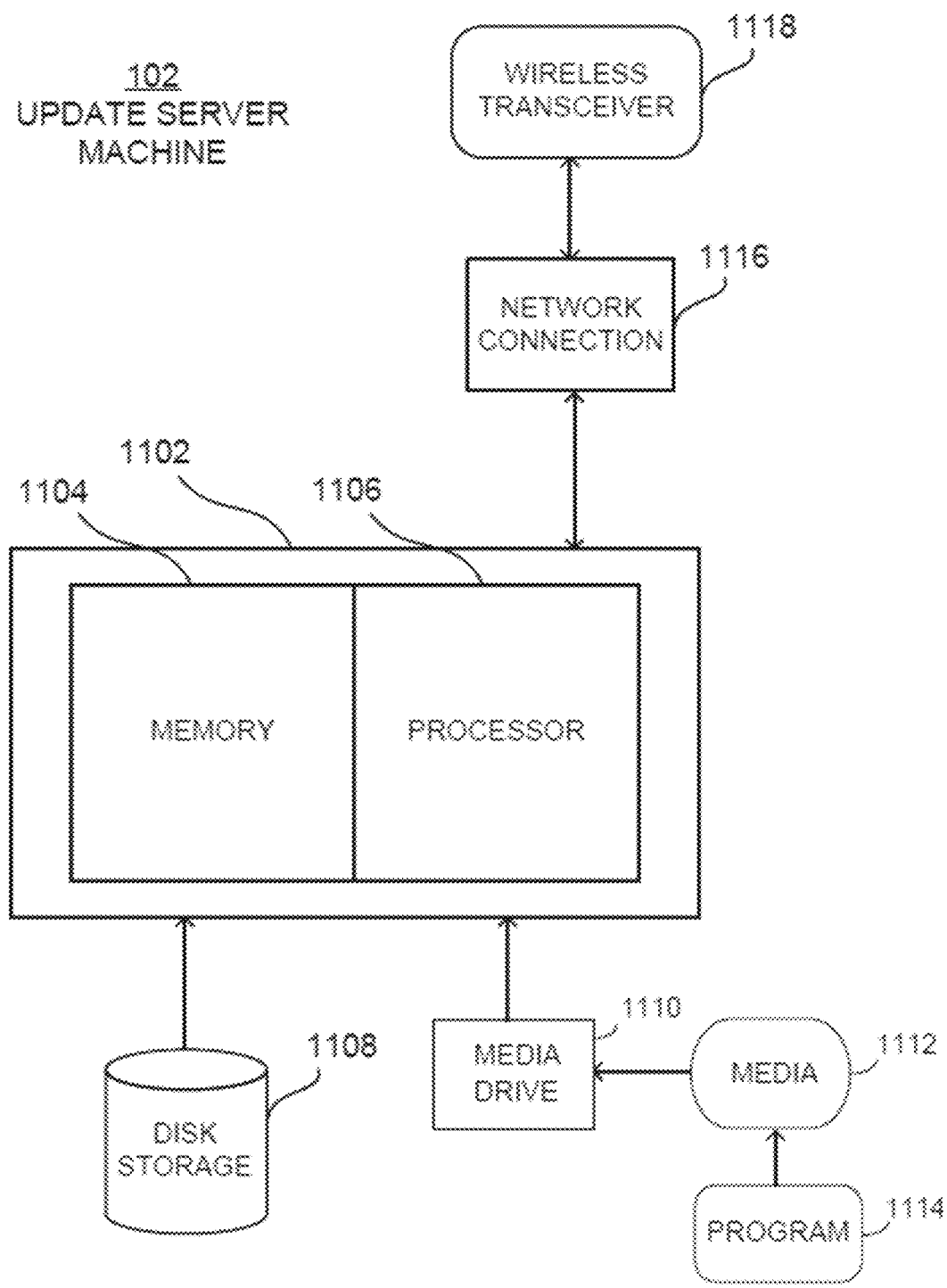
FIG. 11 illustrates an exemplary embodiment of an update server machine.

FIGS. 9 to 11 depict exemplary embodiments of the machines used in one embodiment of a computerized system for updating a dialogue protocol. These embodiments are not intended to be limiting and the machines include additional elements not depicted.

FIG. 9 depicts an exemplary embodiment of a terminal machine 120. The terminal machine 120 includes a computer component 902 that includes at least one processor 906 and computer memory 904. The computer component 902 is able to communicate with persistent memory devices, such as disk storage 908 and a media drive 910. The media drive 910 is able to accept removable media 912 which may include one or more programs 914 or other stored instructions. The terminal machine 120 also includes a wireless transceiver 916 for communicating with a wireless network (or for communicating with local devices, e.g., through NFC, Bluetooth, etc.). In some embodiments, the wireless transceiver 916 is able to communicate with a CDMA or GSM telecommunications network. In some embodiments, the terminal machine 120 includes a location detection device 917, such as a global navigation satellite system (GNSS) (e.g., GPS, GLONASS, etc.) or other geo-location receiver, for capturing/generating location information for the terminal machine 120.

The terminal machine 120 also includes a user display 920 and a data entry device 918. In some embodiments the user display 920 is an LCD screen or similar device that is capable of displaying the user interface described above. In a preferred embodiment, the data entry device 918 may be a keypad, keyboard or other multi-button device. In some embodiments, the data entry device 918 includes other devices, such as a computer mouse or other pointing device. For example, the data entry device 918 can also include a touch screen device integrated with the user display 920.

FIG. 10 depicts an embodiment of a service provide machine 110. The service provider machine 110 includes a computer component 1002 that includes at least one processor 1006 and computer memory 1004. The computer component 1002 is able to communicate with persistent memory devices, such as disk storage 1008 and a media drive 1010. The media drive 1010 is able to accept removable media 1012, which may contain one or more programs 1014 or other stored instructions. The service provider machine 110 also includes a network connection 1016. The network connection 1016 may include a TCP/IP wired connection and/or a wireless device, such as a wireless modem. Through the network connection 1016, the service provider machine 110 is able to communicate with a wireless transceiver 1018. In some embodiments, the service provider machine 110 is networked directly with the wireless transceiver 1018. In other embodiments, the service provider machine 110 is connected to a wireless transceiver 1018 through an external network (not shown). For example, the service provider machine 110 may connect to the Internet or other telephony network to access a wireless transceiver that is part of a telecommunications network. In this embodiment, the wireless transceiver may be a base station in a telecommunications network. In some embodiments, the wireless transceiver 1018 is able to communicate with a CDMA or GSM telecommunications network.

FIG. 11 depicts an embodiment of an update server machine 102. The update server machine 102 includes a computer component 1102 that includes at least one processor 1106 and computer memory 1104. The computer component 1102 is able to communicate with persistent memory devices, such as disk storage 1108 and a media drive 1110. The media drive 1110 is able to accept removable media 1112, which may contain one or more programs 1114 or other stored instructions. The update server machine 102 also includes a network connection 1116. The network connection 1116 may include a TCP/IP wired connection and/or a wireless device, such as a wireless modem. Through the network connection 1116, the update server machine 102 is able to communicate with a wireless transceiver 1118. In some embodiments, update server machine 102 is networked directly with the wireless transceiver 1118. In other embodiments, the update server machine 102 is connected to a wireless transceiver 1118 through an external network (not shown). For example, the update server machine 102 may connect to the Internet or other telephony network to access a wireless transceiver that is part of a telecommunications network. In this embodiment, the wireless transceiver may be a base station in a telecommunications network. In some embodiments, the wireless transceiver 1118 is able to communicate with a CDMA or GSM telecommunications network.

8. Creating and Modifying the Dialogue Module Using a Design Tool

FIGS. 13A-16A and 17A-18E are graphical user interfaces (GUIs) that depict additional examples of the design tool that can be used to create or modify a dialogue module. In this particular example, the design tool, dubbed DIY, is running on a computing device, such as a mobile phone or tablet. One skilled in the art will appreciate that the design tool could also run on various other personal computing devices. In some embodiments, the computing device is in communication with one or more of the terminal machine 120, the update server machine 102, and the service provider machine 110. The design tool may also be a web-based application (e.g., cloud-based application) that is accessed through a web browser running on a personal computing device, mobile phone, tablet, etc.

Figure 13A:
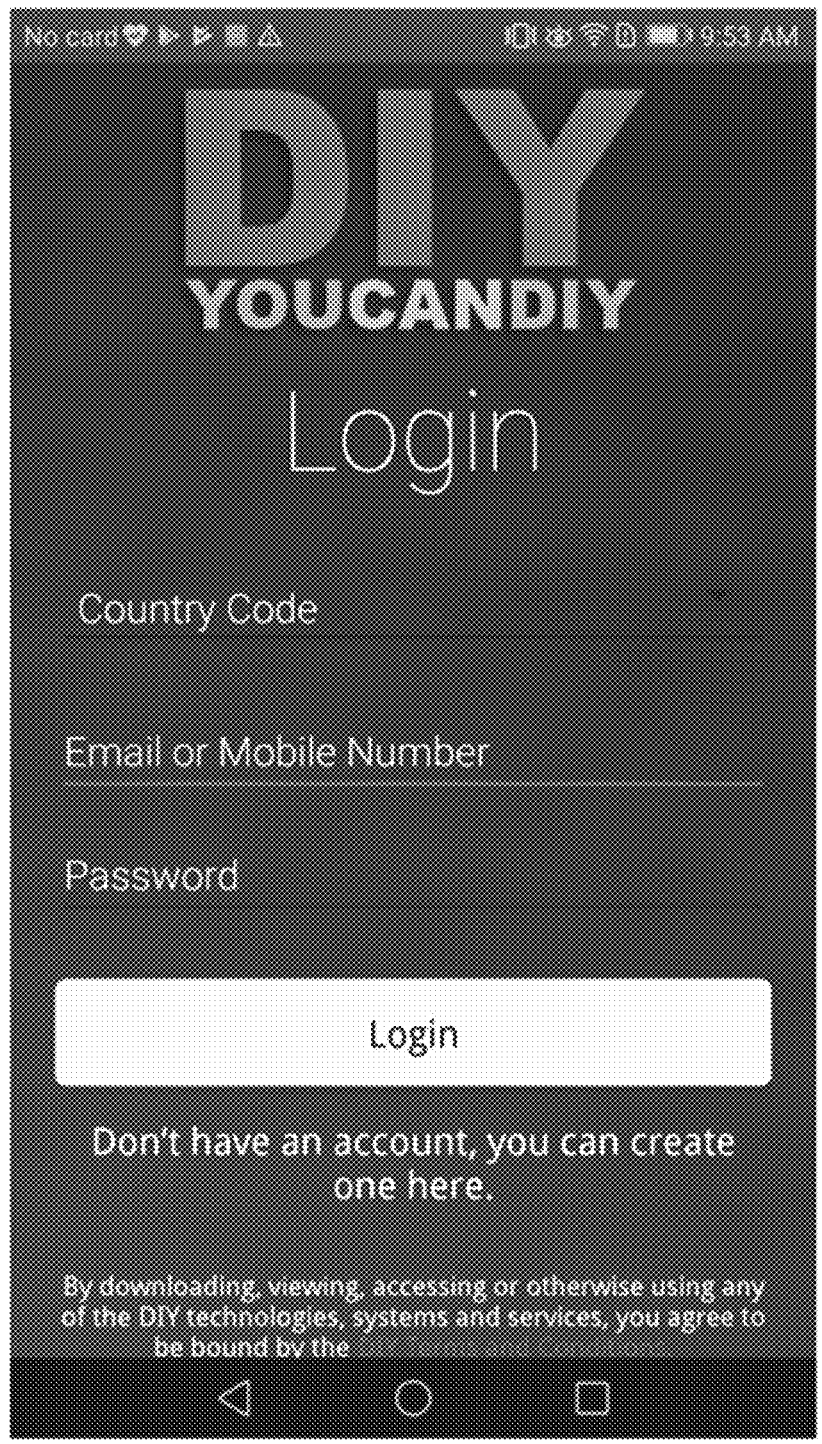

FIG. 13A is a GUI that shows an example login screen for the design tool. The illustrated GUI of the login screen includes a "Country Code" field, a "Email or Mobile Number" field (i.e., a user name field), and a "Password" field. It is noted that not all of the illustrated fields are required, and other means of logging in can also be used, such as biometrics, tokens, and one time passwords. In some embodiments, no login is used, and thus, the login screen of FIG. 13A is optional.

Figure 13C:
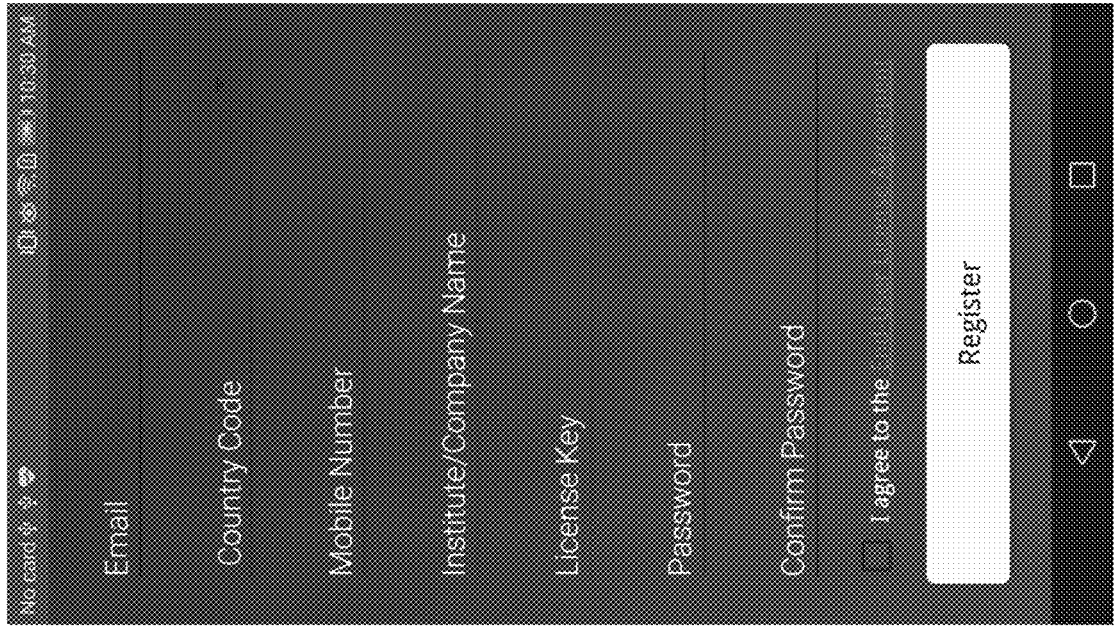
Figure 13B:
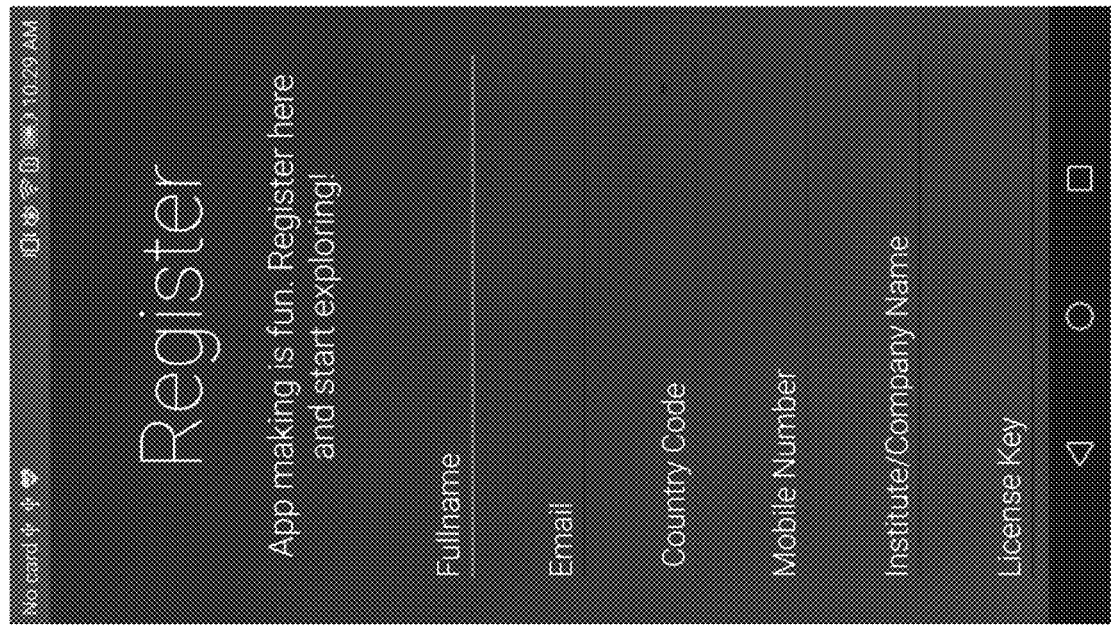

FIGS. 13B and 13C are GUIs that show an example registration screen for the design tool (e.g., a screen that allows a user to create a new account) (the GUI in FIG. 13C is a scrolled version of the GUI in FIG. 13B). Again, not all of the illustrated fields are required, and other means of registration, such as biometrics, can also be used. In some embodiments, no registration is required, and thus, the registration screen of FIGS. 13B and 13C is optional.

Figure 13E:
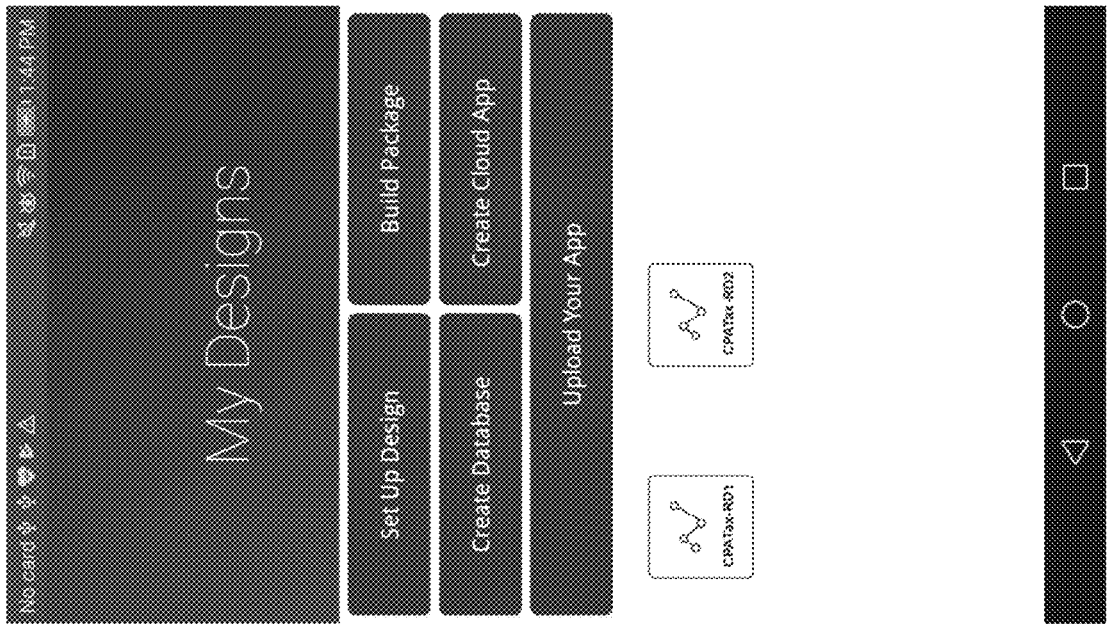
Figure 13D:
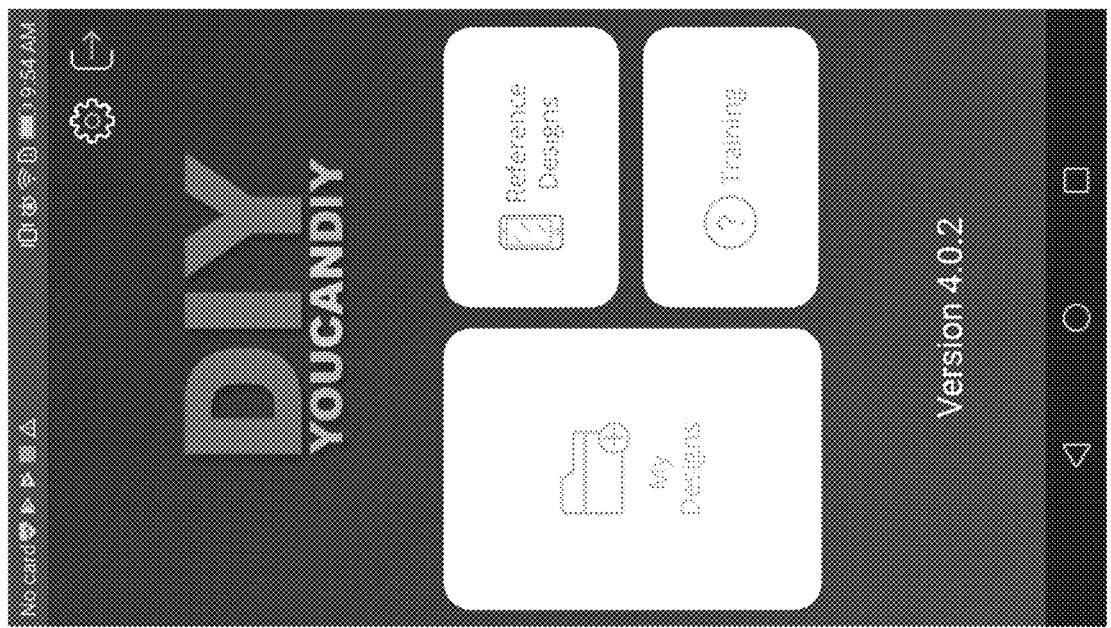

FIG. 13D is a GUI that shows an example home screen of the design tool. As shown, the design tool allows a designer to manage his or her projects (e.g., selection of "My Designs"), access (e.g., download from one or more servers, available within the design tool without further download, etc.) pre-developed reference designs (e.g., selection of "Reference Designs"), and seek training (e.g., selection of "Training"). FIG. 13E is a GUI that shows an example screen that results from selecting "My Designs." As shown, the designer has various projects currently available for use or still in development. Using the "My Designs" GUI (also referred to herein as a "screen shot," or simply "screen"), the designer can create new projects, create a database, create cloud applications, and upload applications to an application platform/hub (e.g., APPLE's APP STORE), an update server machine, or another machine.

FIGS. 13F to 13I are GUIs that show how a designer can leverage reference designs of the design tool. "Reference Designs" are used to provide designers with a starting position for designing their respective projects (e.g., systems). For example, in different embodiments, there are reference designs for gaming-based projects, reference designs for service-based projects, and so on. In some embodiments, the "Reference Designs" are reference designs associated with a particular entity. For example, a hotel chain may provide one or more reference designs that are to be used by developers and designers for that hotel chain. In this way, applications associated with individual hotels of the hotel chain will have the same look and feel as one another and conform to various other requirements across a hotel chain or brand. In another example, a professional sports league (e.g., MAJOR LEAGUE BASEBALL, NATIONAL HOCKEY LEAGUE, etc.) may provide reference designs that are to be used by each franchise. In this way, applications associated with individual franchises (e.g., SAN FRANCISCO GIANTS, SEATTLE MARINERS, etc.) of the sports league will have the same look and feel as one another. Thus, as shown in FIG. 13G, the designer can select the "Download Reference Design" affordance to initiate download of a desired reference design. In some embodiments, a password or other credential is needed to access a particular reference design. In some embodiments, payment (or other form of monetary or non-monetary credits) is needed to access, use, or modify a particular reference design. In some embodiments, the payment (or other credit) is provided when the system is deployed for use, e.g., when end-users or customers are using the developed system based on that reference design. The payment may be based on various different forms of pricing models, including per-user, per-group-of-users (e.g., a fixed amount for every 1000 users, etc.), per-time-period (e.g., per day or per month, etc.), per-transaction (e.g., a percentage commission of each transaction performed using the developed system), etc.

Figures 13H, 13I:
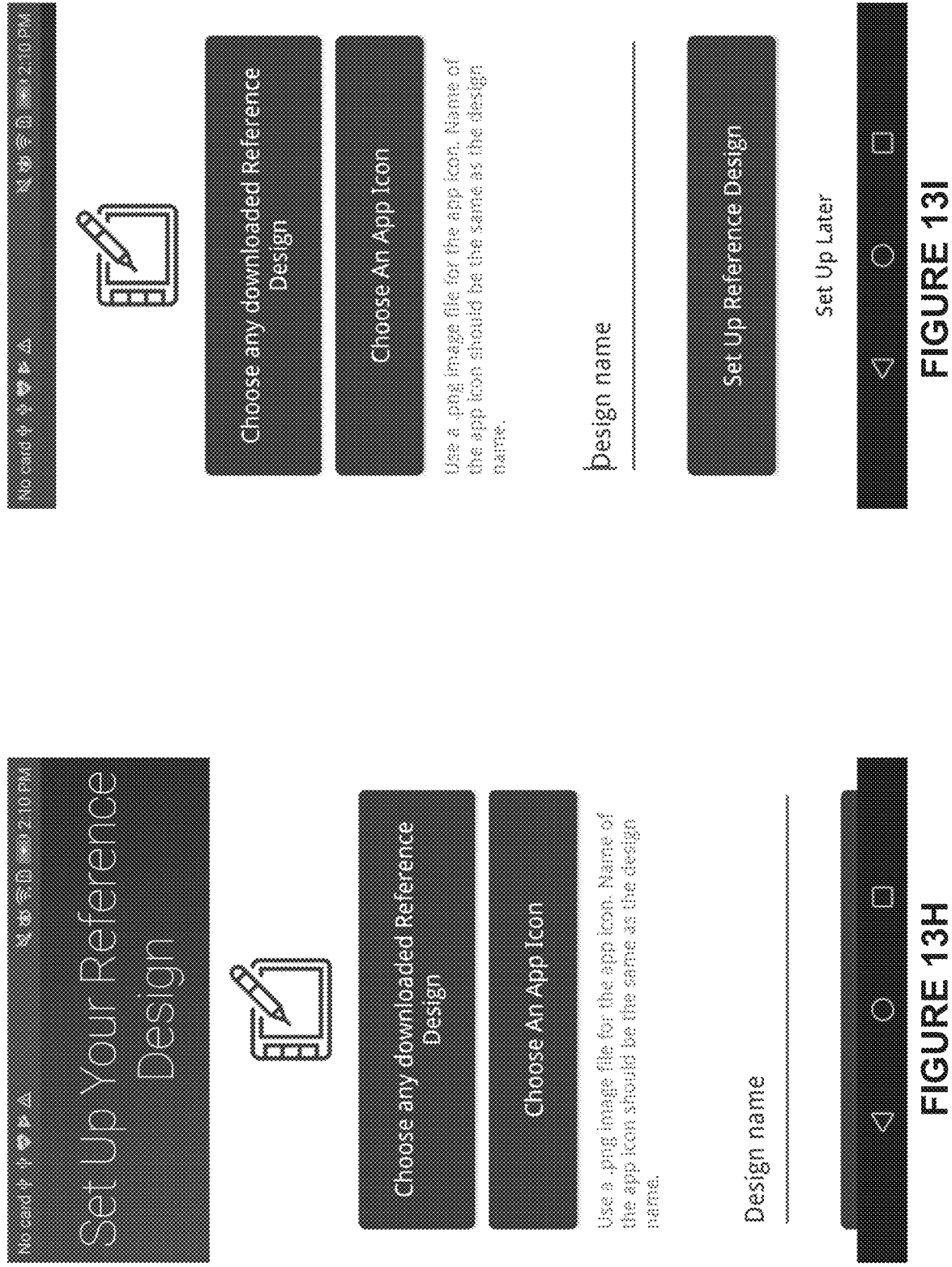

FIGS. 13H and 13I are GUIs that show how a designer can customize some aspects of a downloaded reference design. For example, a custom application icon and application name can be provided for the downloaded reference design. The GUIs in FIGS. 13H and 13I are displayed in response to selection of the "Setup Design" button, shown in FIG. 13E. The GUI in FIG. 13I is a scrolled version of the GUI in FIG. 13H.

Figure 13J:
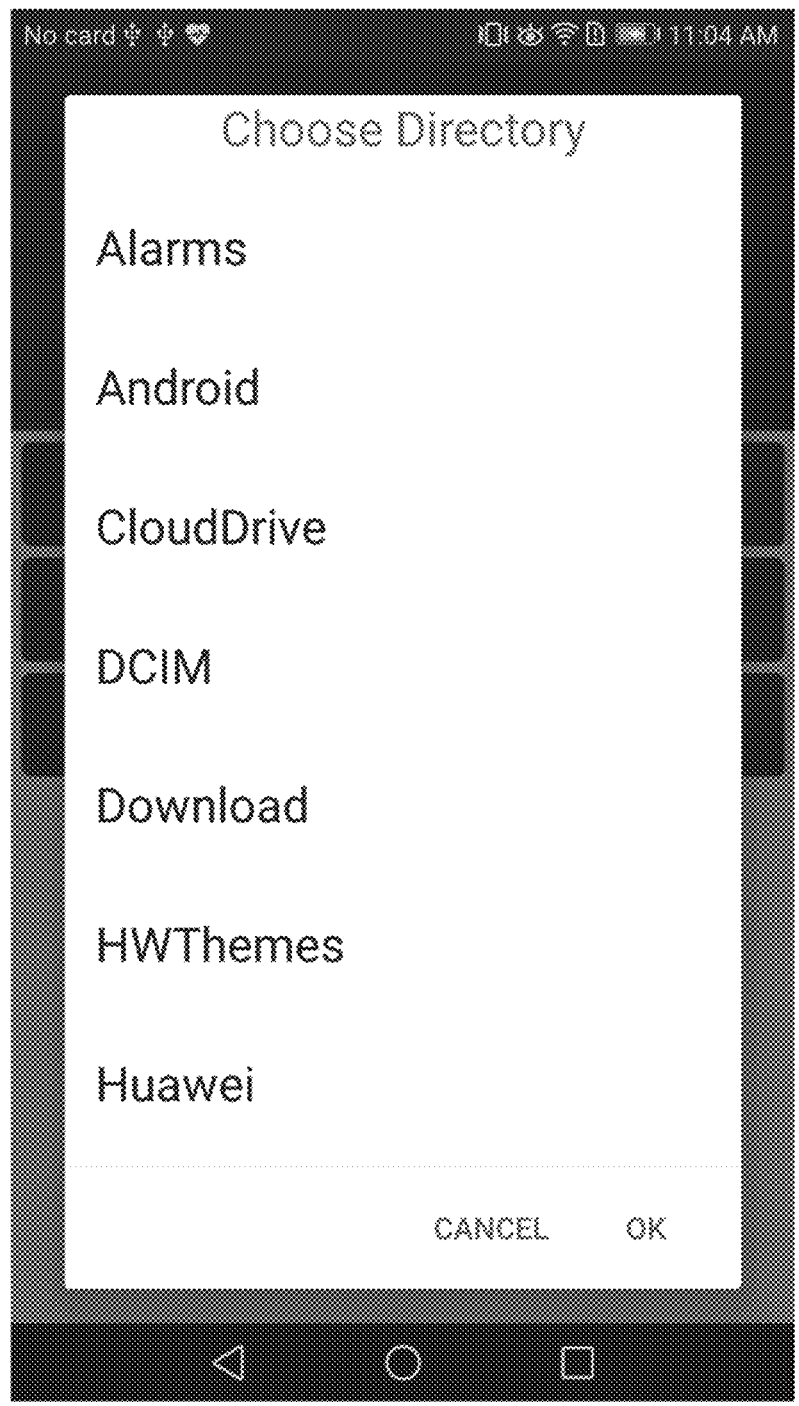

FIG. 13J is a GUI that shows a directory screen that appears in response to selection of the "Build Package" button, shown in FIG. 13E. The GUI in FIG. 13J allows the designer to select the directory on the device (e.g., smart phone) where the application system design that the designer has created is stored. After the directory is selected (e.g., "ANDROID" is selected from the Directory shown in FIG. 13J), the contents of the directory are packaged (e.g., into one or more zip files) and transmitted to one or more servers. For example, the package may be sent to the update server machine. The package may also be sent to a server where a human or software application ensures that the contents of the package (e.g., the designed application system) is appropriate for distribution (e.g., meets specific guidelines for usability, safety, etc., or does not contain offensive information, functionality, etc.).

Figure 13L:
Figure 13L:
Figure 13K:
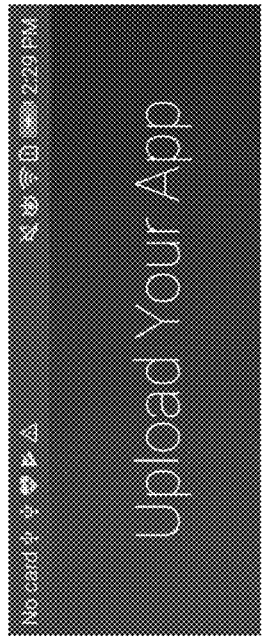
Figure 13K:
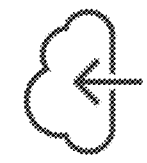
Figure 13K:

FIGS. 13K and 13L are GUIs that show a screen that appears in response to selection of the "Upload Your App" button, shown in FIG. 13E (the GUI in FIG. 13L is a scrolled version of the GUI in FIG. 13K. After the developed design has been packaged using the "Build Package" button, the GUI in FIGS. 13K and 13L allows the designer to input specific information about the application. For example, tags associated with the application may be input so that end-users can more easily locate the application based on searching capability based on tags (discussed below in FIGS. 20C to 20L). Other information may also be input by the user. For example, the postal code and other location information can be entered if the application has utility at a particular country, region or location only. For example, a parking application may only work at one or more specific areas or regions that may be identified by postal code or location name(s). In addition, end-users may search for the application (and similar applications) based on this information (as discussed below in FIGS. 20C to 20L). In some embodiments, information relevant to the application is automatically gathered instead of manually entered by the user. For example, GPS information may be input into the "location name" or other such field instead of the designer manually entering a postal code, location name, or other such information relevant for location. For example, for an application that is meant to be used only at one particular hotel property, GPS information for the perimeter (or other boundary) of the property may be entered, manually or automatically. If the application is meant to be used at multiple properties, GPS information for the perimeter (or other boundary) of each of the properties may be entered, manually or automatically.

Figure 14B:
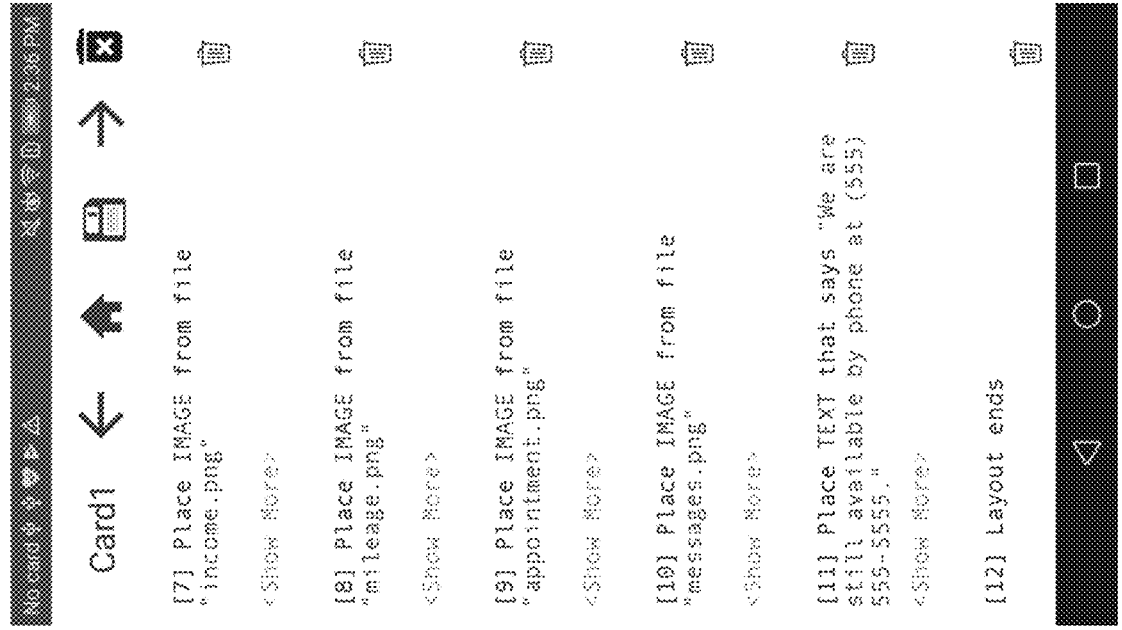
FIGS. 14A to 14K illustrate additional examples of design tools for creating or modifying a system dialogue protocol.
Figure 14A:
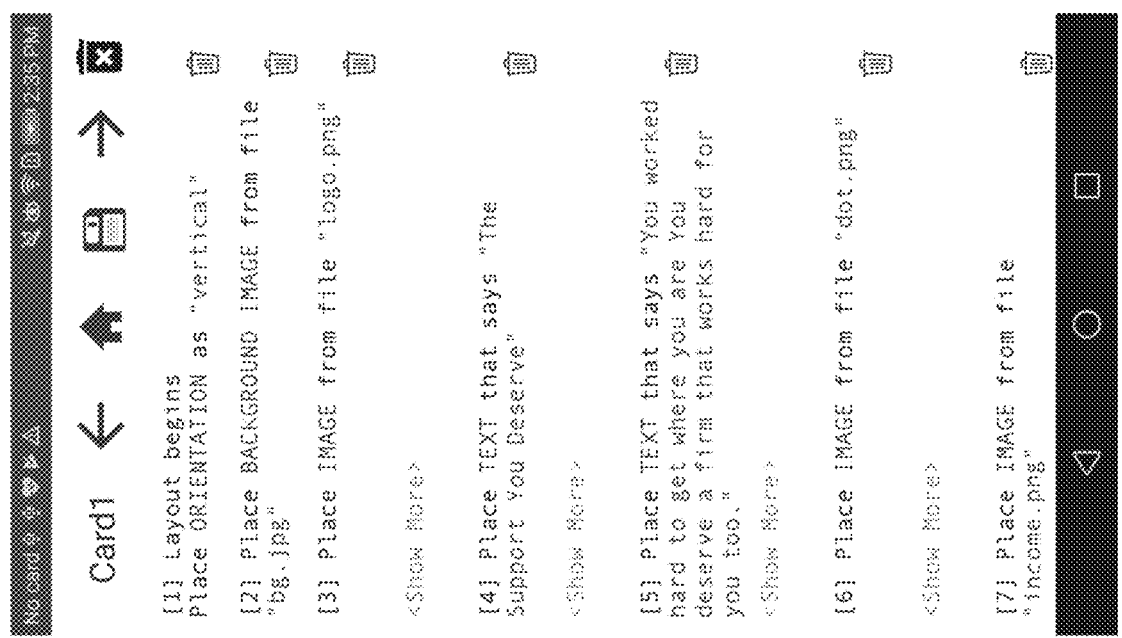

FIGS. 14A and 14B are GUIs that show a screen that appears in response to selection of the "My Designs" button, shown in FIG. 13E (the GUI in FIG. 14B is a scrolled version of the GUI in FIG. 14A). Specifically, the GUI in FIGS. 14A and 14B is shown after "CPATax-RD1" shown in FIG. 13E is selected. Each designed GUI, together with its associated functionality, is referred to as a "Card" followed by a number, e.g., "Card1," as shown on the top left of FIGS. 14A and 14B. These Card identifiers provide one mechanism for the specification of flow control between GUIs and their associated functionality. Each object on the GUI is labeled with a number (in brackets, e.g., [1]). The objects are shown in easy-to-understand English with keywords in special color and values, such as filenames and text, in another special color. A "<Show More>" affordance hides some attributes and additional information about each object. The garbage-can icon next to each object can be used to delete the entire object. The garbage-can icon at the top of the screen shot can be used to delete the entire card (e.g., designed screen and associated functionality). The home icon can be used to navigate to the My Designs GUI (FIG. 13E) or another GUI. Each object includes hidden attributes and additional information that can be edited by pressing the object, as shown in FIG. 14C. New objects can be added to the current card by doing a long-press on the terminal's display, as described below with reference to FIG. 16A.

FIG. 14C is a GUI that illustrates the hidden attributes and additional information for object [5] and object [7], in response to the respective "<Show More>" affordances under each object being selected. As shown, in some embodiments, the attributes and additional information includes one or more of text color, font size, margins, padding, alignments, etc. Additionally, the attributes and information can include information about what should happen when that object is pressed by the user. For example, object 7 shows "when ACTIVATED goes to card 2." Therefore, when the image associated with object 7 is pressed by the user, the application will then navigate to and display Card2, as shown in FIG. 14C(1).

Figure 14D:
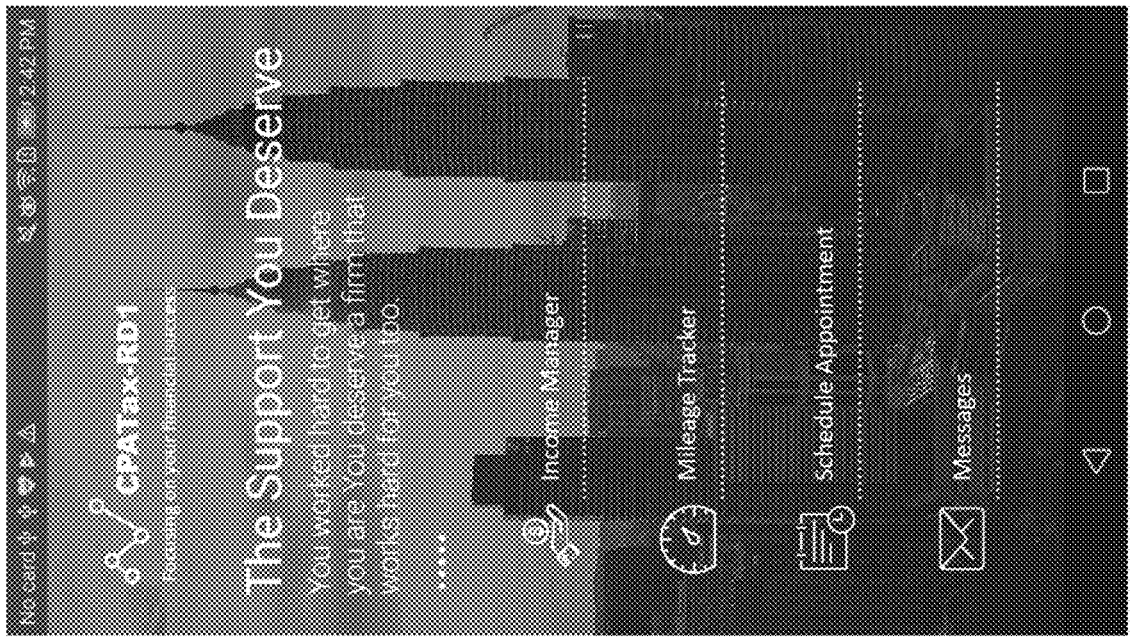
Figure 14C:
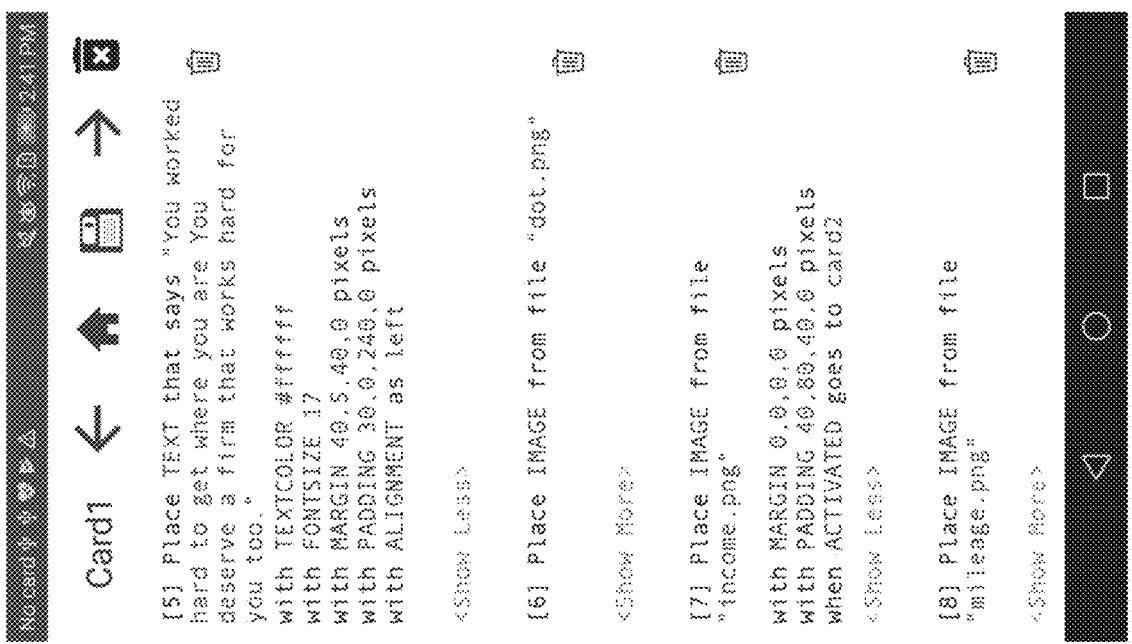
Figure 14F:
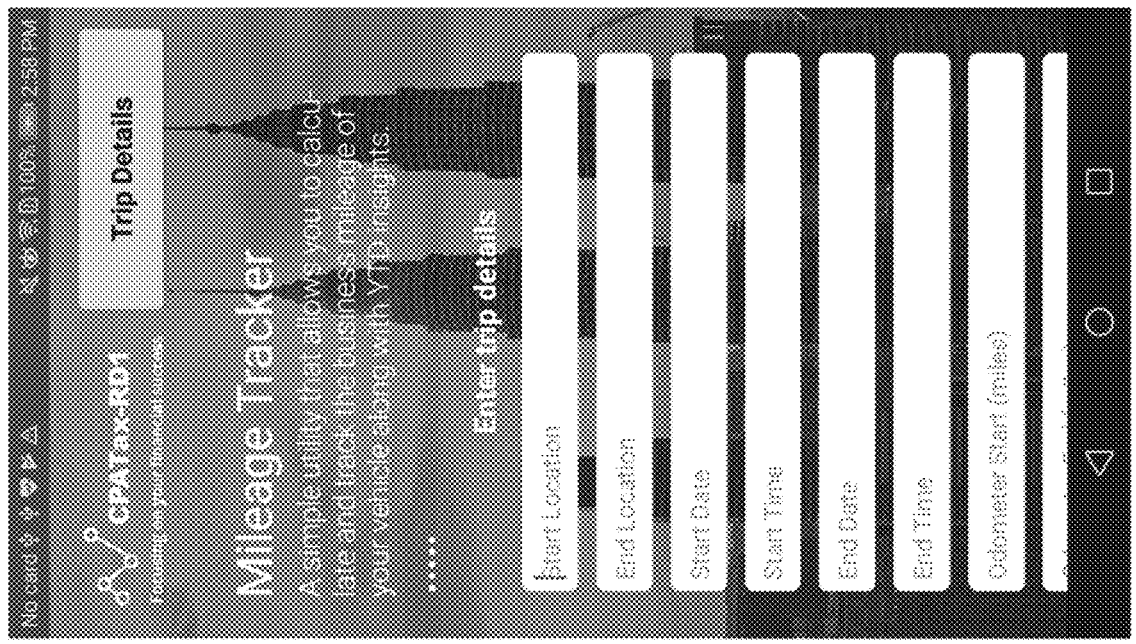
Figure 14E:
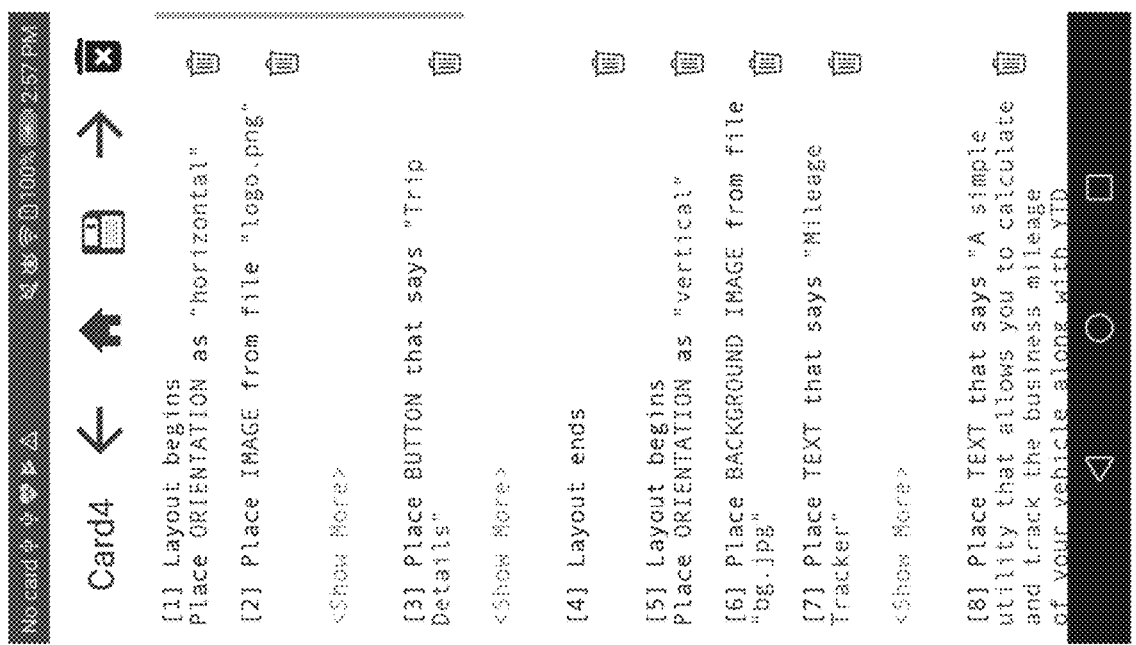
Figure 14H:
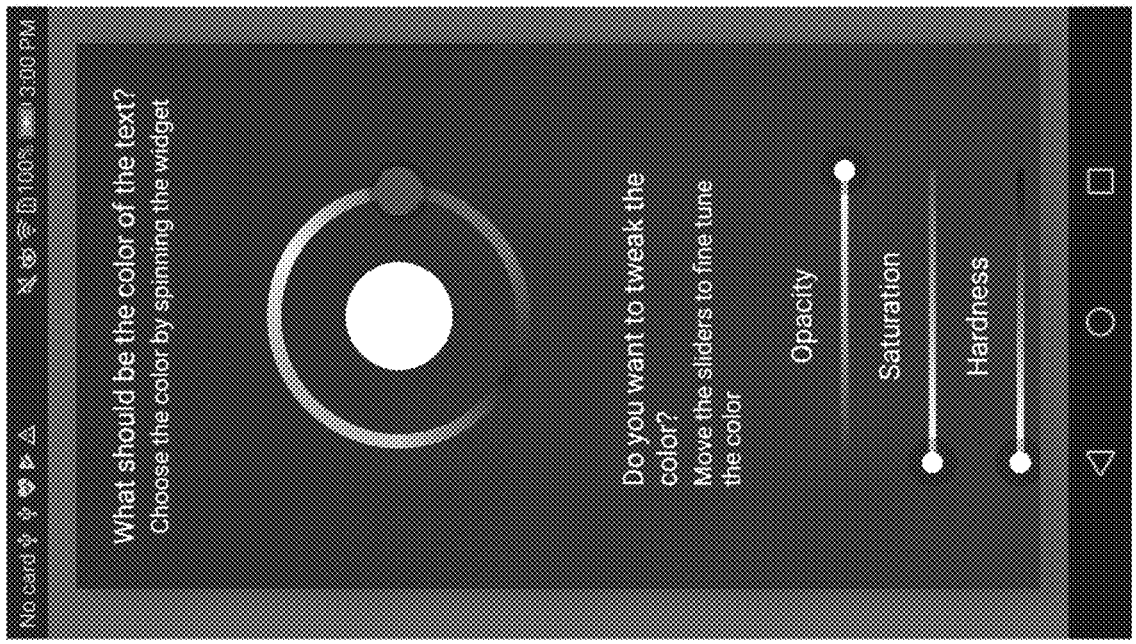

FIG. 14D is a GUI that shows the resulting screen generated by the design tool from the text entered in FIGS. 14A-14B. The GUI in FIG. 14D(1) shows the resulting screen generated by the design tool from the text entered in FIG. 14C(1)'s GUI. Selection of a save button (e.g., floppy disk icon) in FIGS. 14A-14C causes the GUI in FIG. 14D to be shown. In FIG. 14D, pressing any of the active areas (i.e., affordances) on the GUI will cause the application to navigate to the appropriate card, e.g., as specified by "when ACTIVATED" attribute and information. To provide additional context, FIG. 14E is a GUI that shows a design screen that is used to create the GUI shown in FIG. 14F.

Figure 14G:
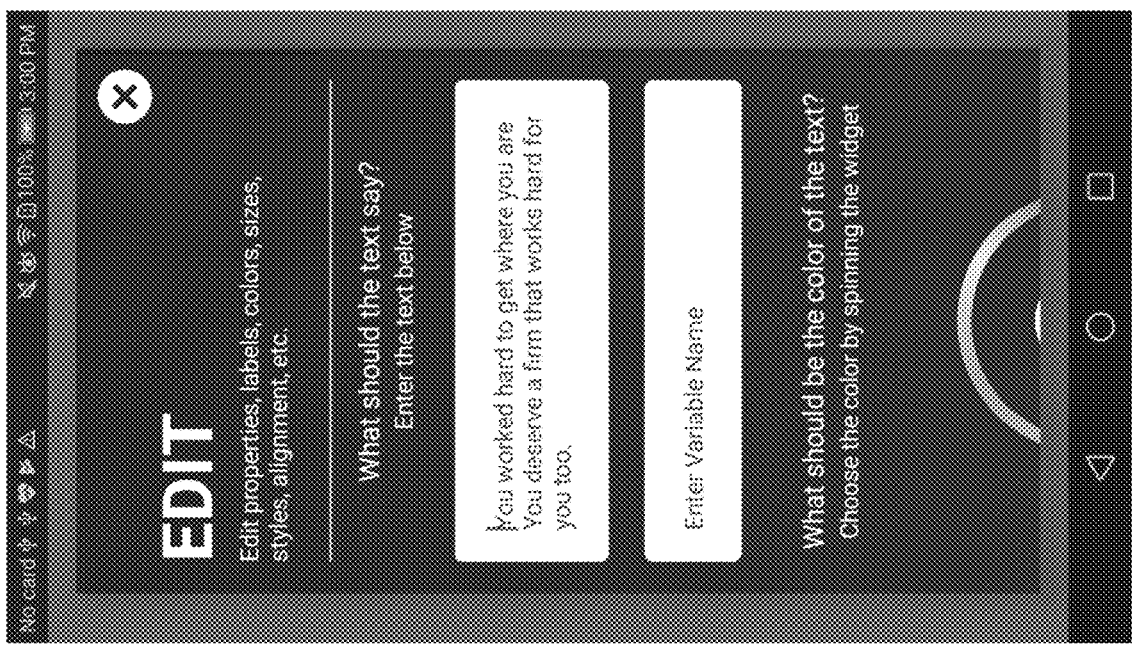
Figure 14J:
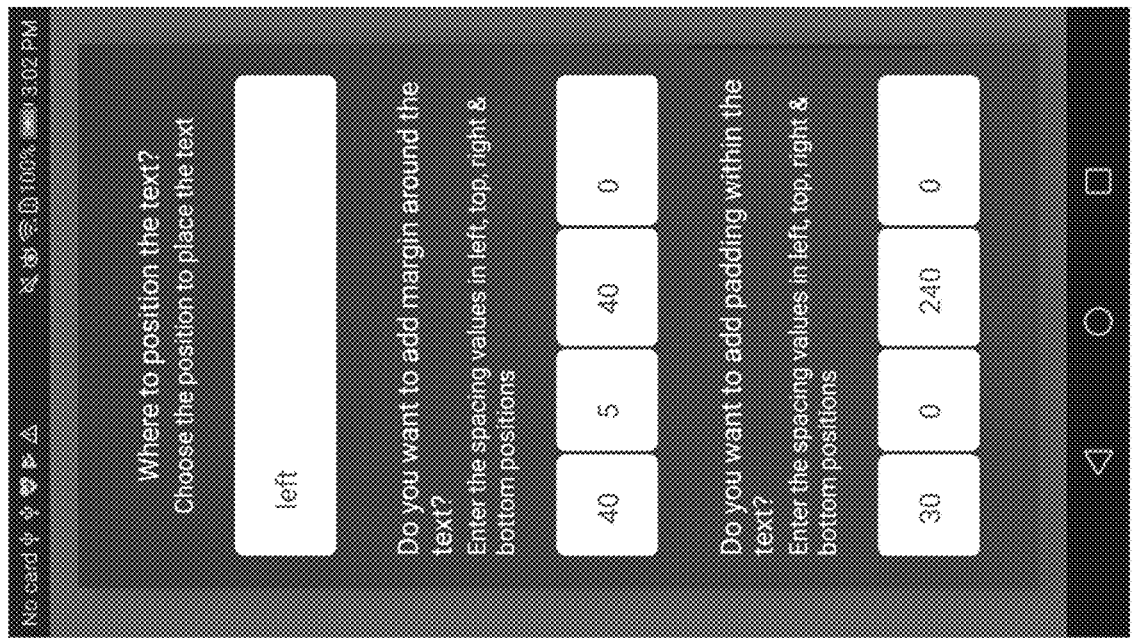
Figure 14I:
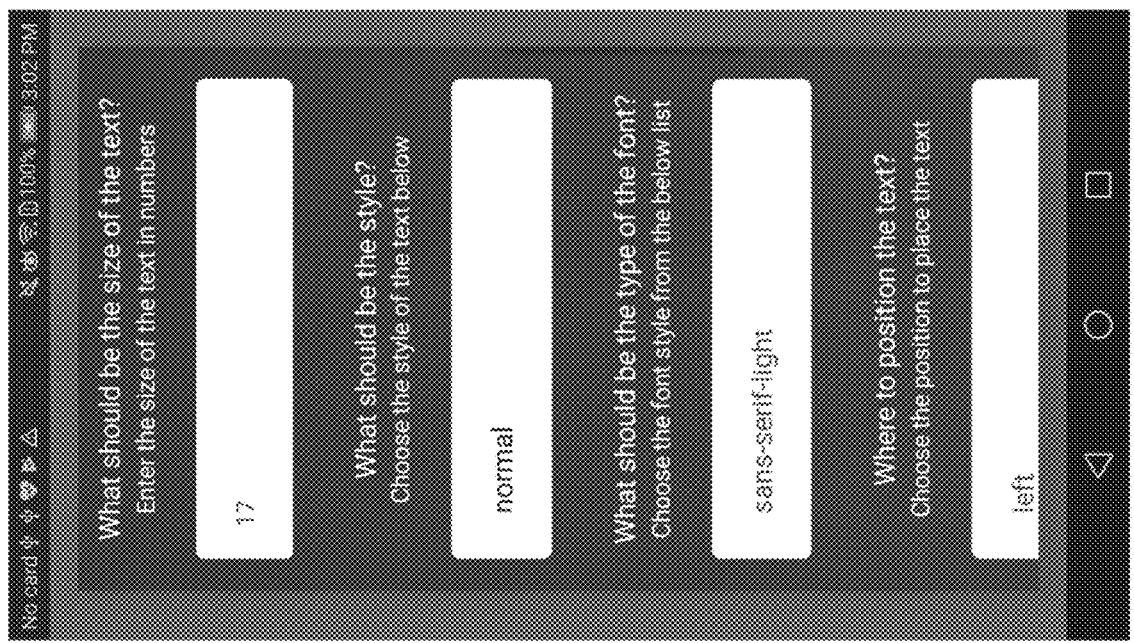
Figure 14K:
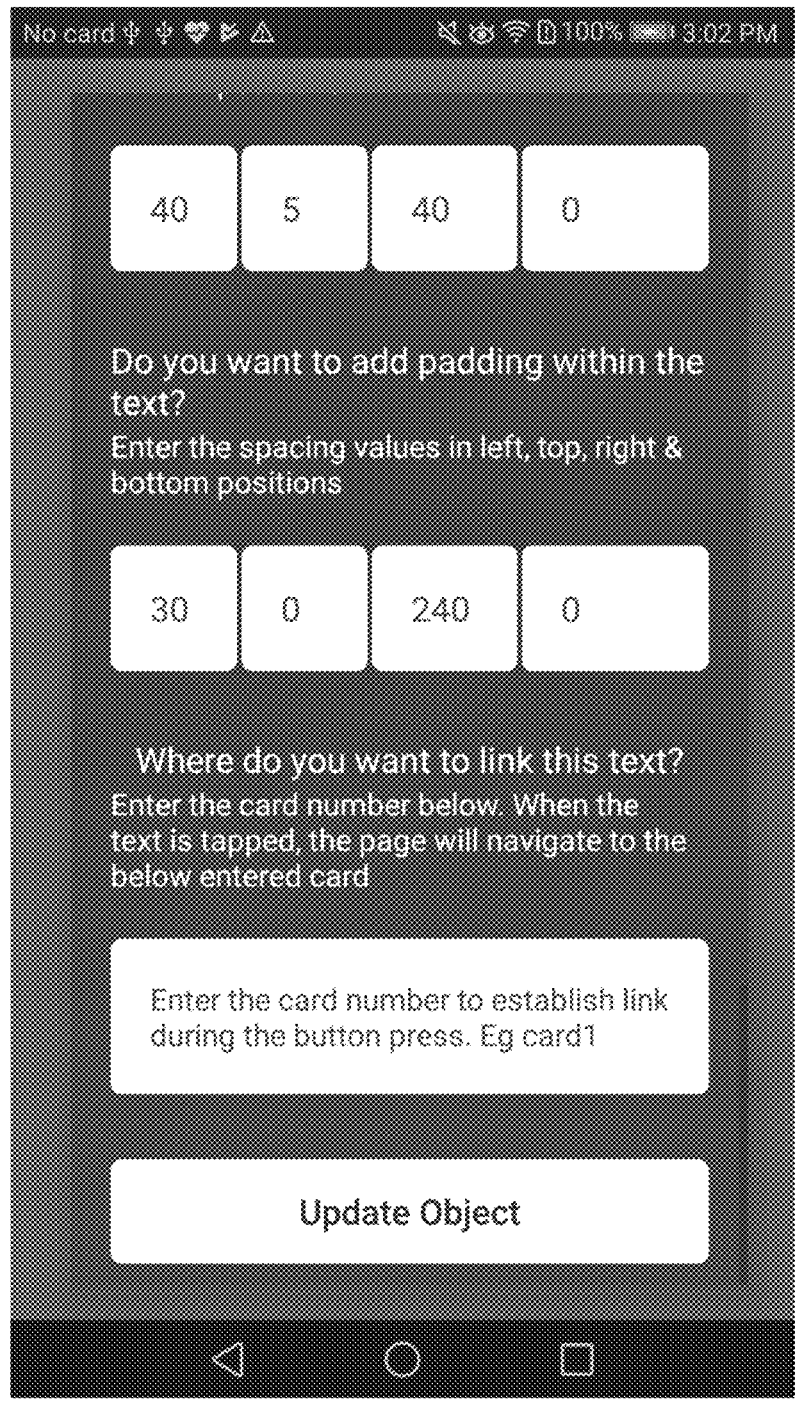

FIGS. 14G-14K are GUIs that show additional screens that can be used to edit or make further adjustments through the design tool. In some embodiments, the "Edit" GUI in FIG. 14G is displayed when the designer presses an existing object. Depending on the type of object pressed, attributes and additional information that are relevant for that object or object type are shown (i.e., the information displayed on the GUIs in FIGS. 14G-14K may change based on the object selected). The designer is able to modify the values or input new values using the GUIs displayed in FIGS. 14G-14K. Furthermore, the additional adjustments may be made using voice-based interactions within the design tool, as discussed below.

In some embodiments, the design tool allows a designer to enter text to be used for a particular prompt (or series of prompts). The design tool is capable of natural language processing, which allows the designer to enter the text in natural language form. For example, the designer can simply input "Place TEXT that says 'Service request at a touch'", and the design tool is able to process the input. In this way, applications can be developed by persons with little or no programming experience.

Figure 15B:
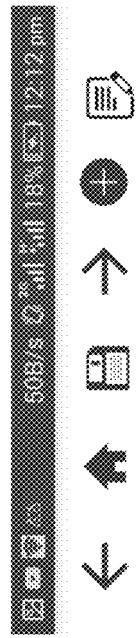
FIGS. 15A and 15B illustrate a translation feature of the design tools.
Figure 15A:
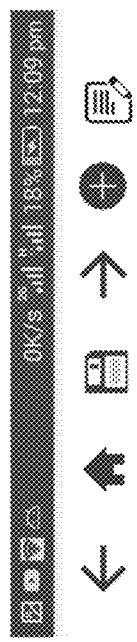

FIGS. 15A and 15B are GUIs that show additional natural language processing capabilities of the design tool. Specifically, the design tool allows a designer to enter the text in a first language (e.g., Mandarin) to be used for a given prompt, and then the design tool translates the entered text into one or more second languages (e.g., English, Spanish, French, etc.). In this way, a designer can quickly and easily create prompts in different languages by simply entering text in a single language. This feature in particularly useful as most programming requires people to understand English because programs, e.g., written in C, Java, etc., have English or English-like keywords. Thus, by using the design tool disclosed herein, designers can input text in different languages (e.g., their native/local language). For example, referring back to FIG. 14A, the third object states: "[3] Place IMAGE from file 'logo.png'." However, the design tool allows the user to input all information in a local language, e.g., Spanish. So, even though the underlying system may work with the keyword "IMAGE" and not the keyword "IMAGEN" (e.g., Spanish translation of "Image"), the design tool and the DIY system is able to function.

In some embodiments, the designer manually uses a different natural language mode, or may connect to a service (local on the device or remote on another device) that converts one language to another. For example, if the user would like to make a project in both English and Mandarin, the user can design the project in English (e.g., as shown in FIGS. 14A and 14B) and then use the service to generate the project in Mandarin. Then, the user can make necessary changes to the Mandarin project, e.g., the English project and the Mandarin project do not have to operate in an identical mode or have the identical functionality, user experience, or user GUI.

Figure 16A:
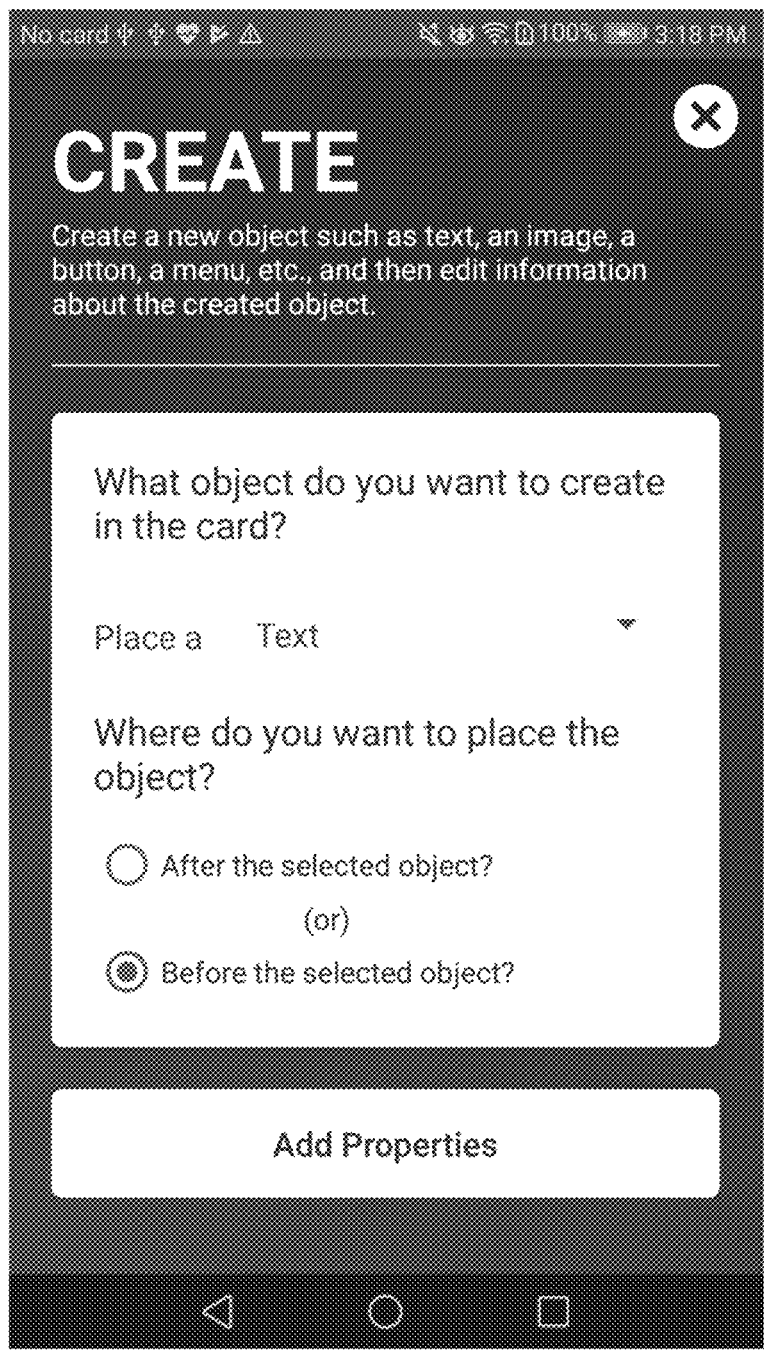
FIG. 16A illustrates object placement features of the design tools.

FIG. 16A is a GUI that shows a software agent that assists designers with creating dialogue modules and applications. As shown, the software agent guides a designer through the development process with easy to understand prompts. For example, the designer can simply tap on the screen and the software agent specifies objects (e.g., text, buttons, drop-down menus, text fields, etc.) to be added. The software agent allows the designer to specify whether to add an object before or after the selected object, as shown in FIG. 16A. As such, an easy to use natural language design is provided to designers. Moreover, in some embodiments, the software agent is intelligent and provides recommendations to the user for how to design the system. For example, the agent can suggest specific prompts that are useful for gathering certain types of information from a user, etc. In some embodiments, the prompts provided by the software agent are displayed in the designer's native/local language.

In some embodiments (instead of or together with the software agent), the design tool may allow voice-based interaction. For example, instead of using the software agent to specify "Place BACKGROUND IMAGE from file xyz.jpg," the designer may use his or her voice to simply speak those words. Further, since text is entered in the design tool in a natural language format (e.g., as shown in FIGS. 14A and 14B), existing and emerging voice interaction tools and services work well with the design tool, whereas with traditional programming methods (where the keywords and other syntax may be non-standard or different from a standard spoken or written natural language), such voice-based interactions oftentimes perform poorly. In other embodiments, the software agent can be used with the voice-based interaction. For example, entries of the software agent shown in FIGS. 14G through 14K, and FIG. 16A can be specified using voice interaction. In some embodiments, the design tool can be paired with a virtual assistant, such as SIRI and ALEXA, built into an electronic device (e.g., mobile phone, tablet, laptop, etc.) running the design tool. For example, the design tool may be running on an IPHONE produced by APPLE, and the designer can leverage APPLE's virtual assistant, SIRI, for voice-based interactions within the design tool.

Figure 16B:
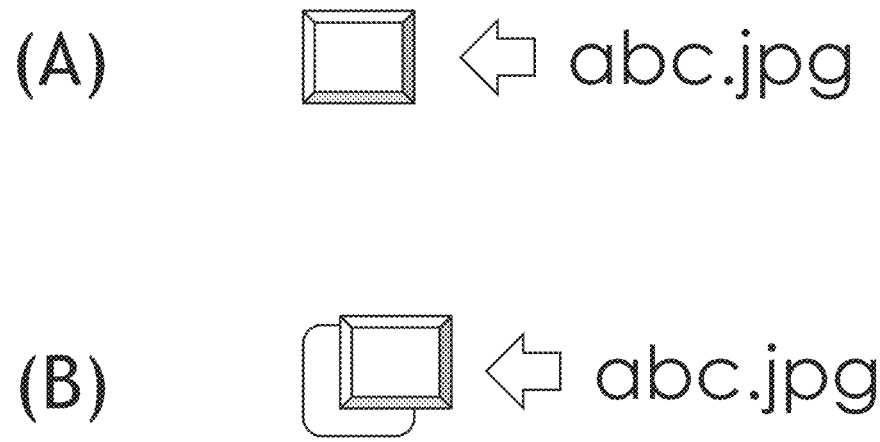
FIG. 16B shows pictorial or iconic representations of inputting information and concepts into the design tool.

The language or the means of inputting information and concepts into the design tool is not limited to natural language, and various other languages may be used (or any other way to represent information or concepts may be used). For example, "Place BACKGROUND IMAGE from file abcjpg" may be considered a natural language representation, while "BACKGROUND IMAGE<-abc.jpg" is another representation that may not be a natural language representation. In addition, a pictorial or icon (or sets thereof) may be used as shown in FIG. 16B, where (A) shows one possible representation that image (foreground) is abc.jpg, and (B) shows another possible representation that background image is abc.jpg. The filename abc.jpg may or may not be actually displayed, and instead, an image display of the actual file may be shown, or both.

Moreover, different languages or representations may be used for different people or different groups of people. For example, people in Spanish-speaking countries may use a Spanish representation or language, while people in English-speaking countries may use an English representation or language. In addition, people in different industries may use or prefer to use different representations, languages, or terminology. For example, people in technical industries, e.g., math or computer science, may prefer a more concise representation based on icons, while people in other industries may prefer a more verbose representation or language. The representation or language may also include keywords or words or phrases that are generally known and commonly used for workers in that industry. Moreover, people may also be segmented based on age group. For example, younger children who may not know to read or write may use graphical, icons, or pictorial representations or languages. Older children, in contrast, may use a combination of both graphical, icons, or pictorial representation together with text words, for example, in an English or Spanish representation.

A graphical, icon, or pictorial approach may be well suited for other types of GUIs and interactions. For example, if the user long presses on the screen, different icons may be shown and the user may be allowed to select from one or more of the displayed icons. After selecting the one or more icons, the user may drag or move the icon(s) to specific locations on the screen. One or more of the icons may be pressed or tapped to edit properties, attributes or other information about that icon representation. This same approach may also be used for non-graphical, -icon or -pictorial representations or languages. Similarly, those with eyesight limitations may use sound or tones as a language or representation. Additionally, flashes of light, different colors and shapes, etc., may also be used as a language or representation.

The different languages or representations (mentioned above) may be translated or otherwise converted to one or more common representations. In some embodiments, the conversion may be performed at the design tool, the update server machine, the terminal machine, the service provider machine, or elsewhere, or in combination thereof or portions thereof. As one example, the common language or representation is "Place BACKGROUND IMAGE from file abc.jpg," and, each of the other representations is translated or otherwise converted into this common language or representation.

In some embodiments, questions that are posed and a type of answer that is expected by the user in the Create or Edit GUIs (FIGS. 16A, 14G to 14K) can use different languages, natural or otherwise, or other representations. For example, the questions may be posed using words that are keywords, or words (or phrases) that are generally known and commonly used for workers in a particular industry, or age group (e.g., for children), etc. The responses to the questions may also allow the use of keywords (or words, phrases) that are generally known and commonly used for workers in a particular industry, or age group (e.g., for children), etc. Therefore, the same functionality, e.g., for a terminal application or a service provider application or both, may be specified using one or more different languages, natural or otherwise, or other representations. A similar approach can be used for the database and database table creation and editing, and cloud app creation and editing, as explained below.

Figure 17A:
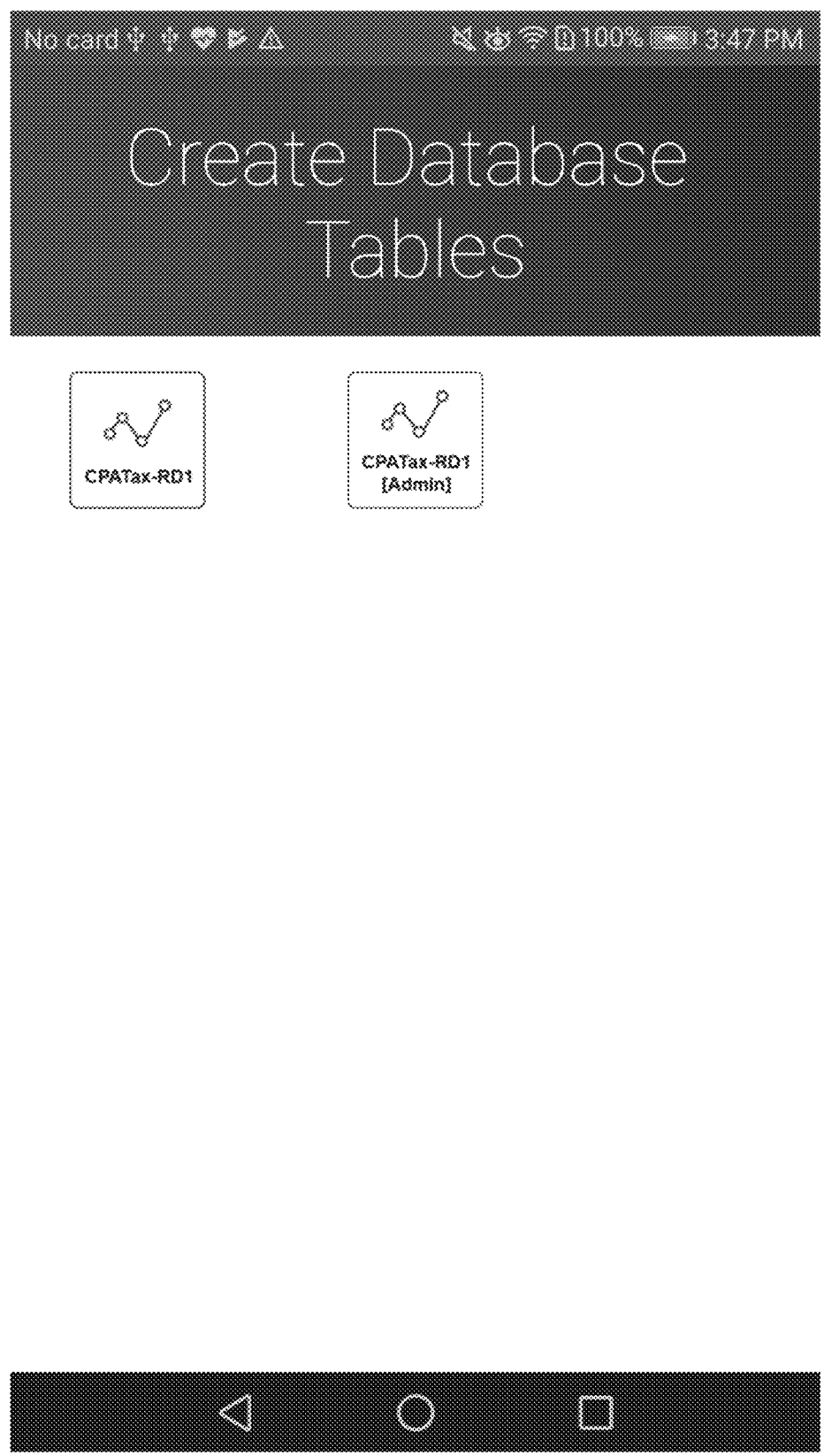
FIGS. 17A to 18E illustrate additional examples of design tools for creating or modifying a system dialogue protocol, including associated databases and database tables.
Figures 17B, 17C:
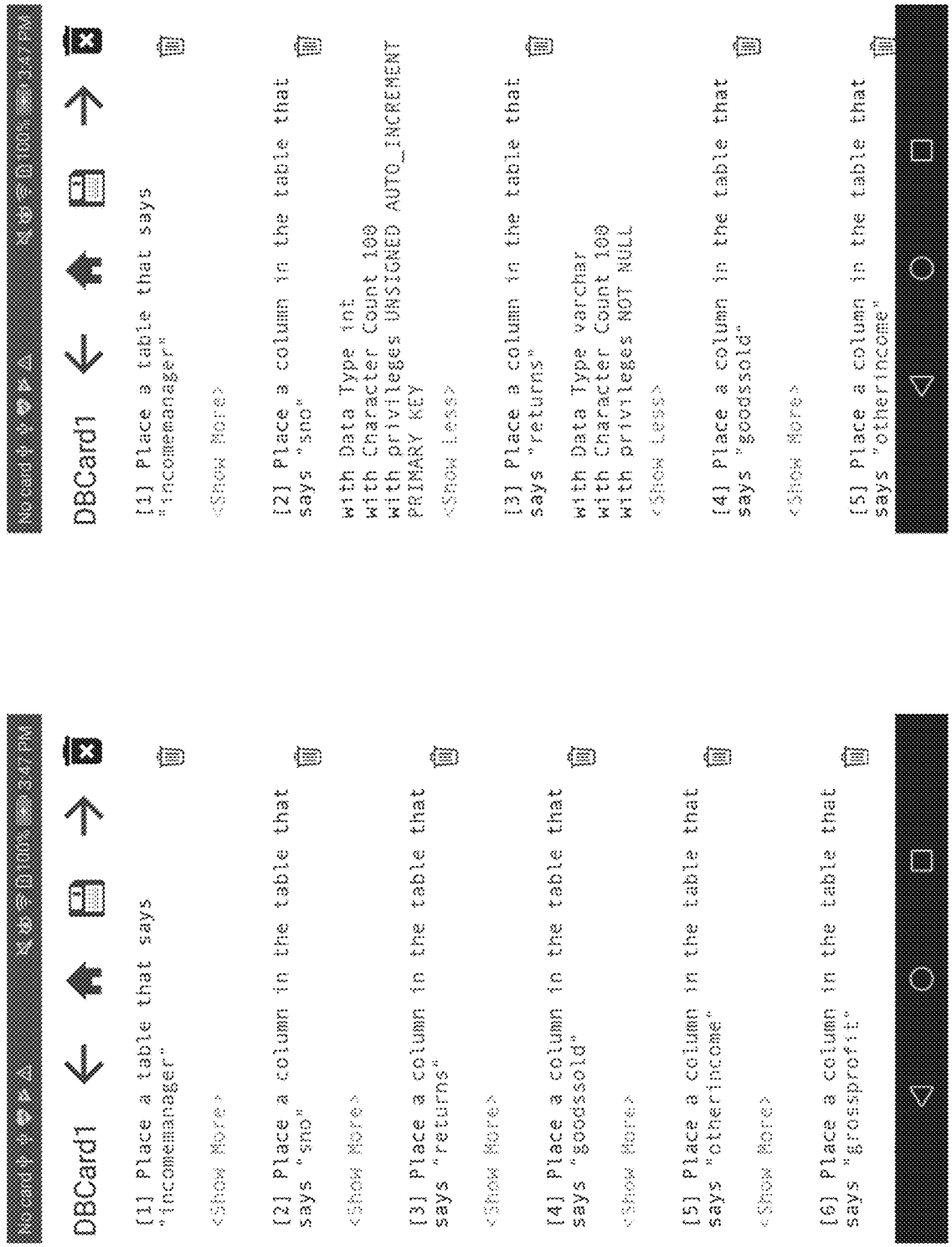

The discussion above in relation to FIGS. 13D to 16A mostly concerns the initial design and development of a mobile application (e.g., one or more terminal dialogue modules). The discussion below concerns the back-end functionality that corresponds to the mobile application (e.g., one or more service provider dialogue modules). To begin, FIG. 17A is a GUI that shows an initial screen for either creating or managing database tables. For example, the designer may select either "CPATax-RD1" or "CPATax-RD1 [Admin]," and the GUIs of FIGS. 17B and 17C are presented in response to user selection of one of the reference designs displayed in FIG. 17A. The GUIs in FIGS. 17B and 17C are used for creating or managing database tables. As shown, the first line [1] indicates that a table named "incomemanager" is being created, and within that table, there are columns titled "sno," "returns," "goodssold," and so on. A "<Show More>" affordance hides some attributes and additional information about each numbered line, e.g., "[2] Place a column in the table that says 'sno'." FIG. 17C illustrates the hidden attributes and additional information for lines [2] and [3], in response to the respective "<Show More>" affordances being selected.

Figure 17E:
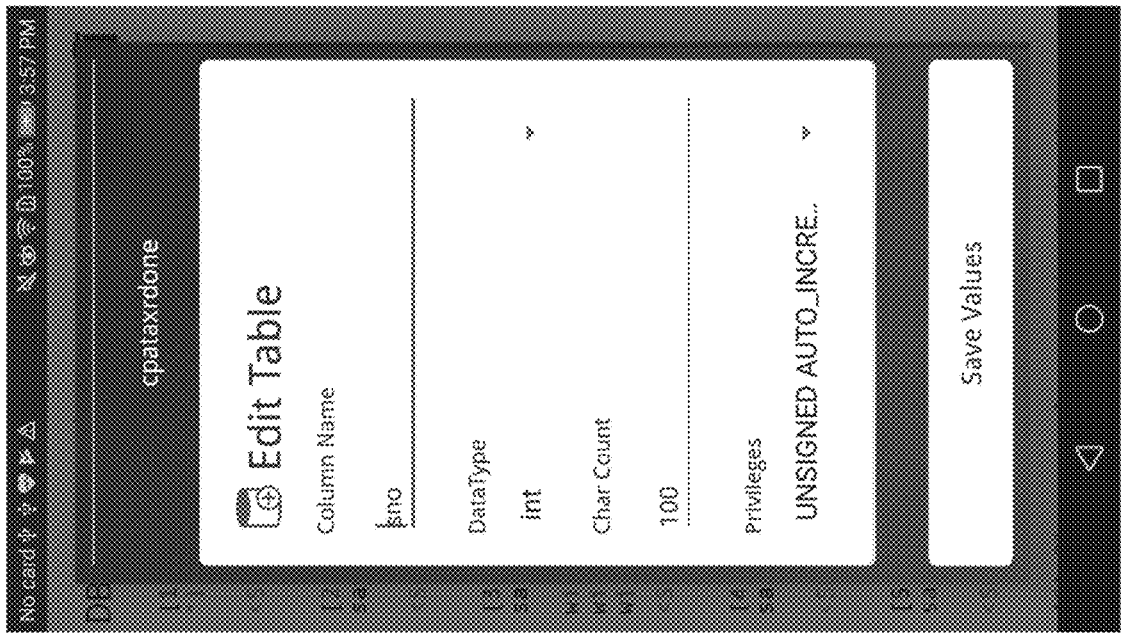
Figure 17D:
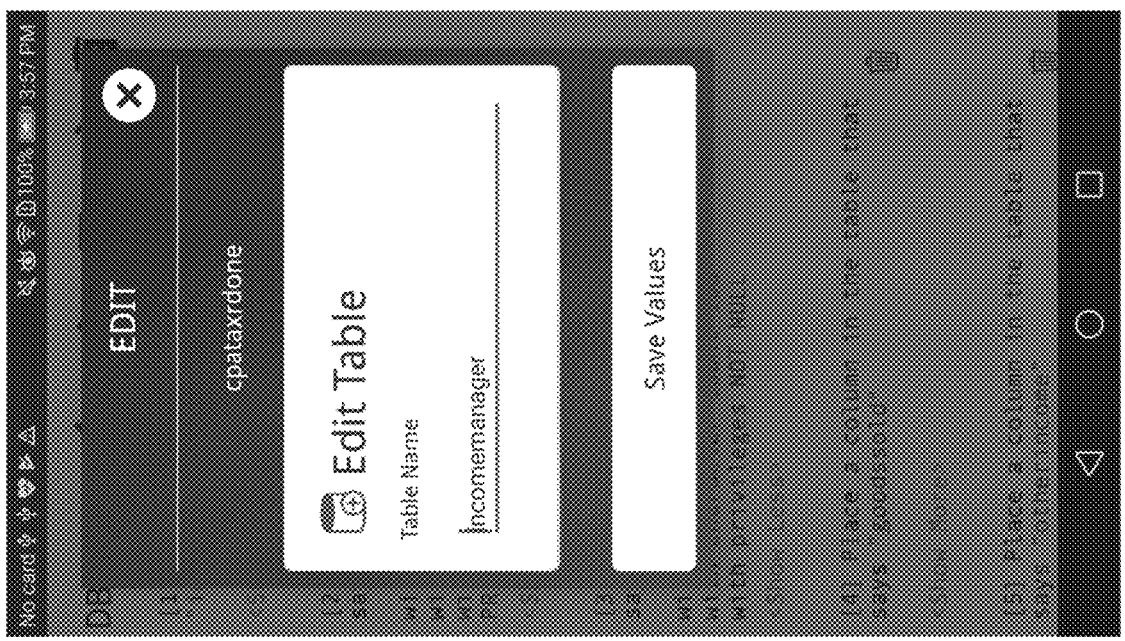

FIGS. 17D and 17E are GUIs that show intelligent agents that can be used to create the information displayed in FIGS. 17B and 17C. For example, instead of typing out the second line [2] in FIG. 17B ("place a column in the table that says 'sno'"), the designer may use this intuitive tool to either create the column or edit the column by answering simple questions (e.g., the designer types the column name as "sno," the DataType as "int," etc.). FIG. 17D shows how the design tool can be used for creating or editing a new database table, including the table's name. The GUI in FIG. 17E specifically shows how the design tool can be used for adding and editing columns within a new or existing database table.

FIG. 17F is a GUI that shows a graphical representation of the database table that corresponds to the database table shown in FIGS. 17B and 17C. As shown, the table in FIG. 17F is named "incomemanger" and has table fields (columns) corresponding to the text in FIGS. 17B and 17C.

In another example, a user of the design tool may create a single database table, such as the table shown in FIG. 17G, which may be more intuitive or easily understood by some users. However, such a design may not be the most efficient design, as known by those skilled in the art. For example, as data is entered into the table, it may emerge that the same customer (e.g., John Smith) has multiple invoices. Storing the first name, last name, telephone number, and other information (e.g., address, birth date, social security number, tax id number, etc.) about the same person repeatedly is not the most efficient use of resources for a database. Therefore, although the user has specified a single table, e.g., "customerinvoice," the implementation of that design may split the designed single table into two or more tables to use relationships (e.g., using foreign keys from one table to another, etc.), thereby creating a more efficient database table schema.

FIG. 17H is a representation that shows an example split of the table illustrated in FIG. 17G. Splitting a table into two or more tables may occur in response to a user adding (or deleting) columns to (from) the table. For example, if the number of columns is becoming too large (e.g., over a certain threshold number, which may depend on different types of applications or may also depend on the hardware or software resources of the machine on which the database is being run), the table may be broken into two or more tables. As another example, if the data that is stored in the single table has repeated data (e.g., there are multiple rows of the table with the same first and last name, such as John Smith), the system may automatically change the implementation to have two or more database tables, as shown in FIG. 17H.

Accordingly, rules, metrics, or data analytics (or other forms of analysis or learning, or combinations thereof) may be used to dynamically change the implementation of the designed or developed system. For example, based on rules or learning over time, e.g., based on artificial intelligence or other means, the system may determine that tables containing names and addresses are likely to result in redundancies and inefficiencies if the table contains other unrelated columns, e.g., invoice information. As another example, the system may learn (or through rules) that tables containing certain data (e.g., invoice data) will likely have redundant data, e.g., names, addresses, social security or tax identification numbers (and the like) over time (e.g., may be not on the first month but over the subsequent months, if invoices are issued on a monthly basis). This and other kinds of learning or rules can be used to split the single designed table into two or more tables. In some embodiments, the splitting of a single table occurs immediately, even before redundancies are found, which would not require the table to be later split and the data migrated from the single table to the two or more tables.

In some embodiments, the splitting (or at least a portion of the splitting) is performed by the design tool, at the update server machine, at the terminal machine, at the service provider machine or other machine, or a combination thereof. In one embodiment, the design tool may provide suggestions and tips to the user based on learning, rules, etc., while the update server machine or other machine adapts the implementation of the design, with or without authorization or confirmation by the developer/user. This approach also simplifies the design and development, including associated thought pattern, for the user of the design tool. For example, users can focus on the design and functionality of their developed application system and they do not have to understand, or even know about implementation issues, efficiencies, redundancies, etc. related to computer systems and engineering.

Based on this simplified database table design, users can also develop one or both of the terminal application and provider application, or the associated dialogue modules. For example, a terminal application may be developed based on the single designed database table (even though the implementation may split or may have split the single table into two or more tables). In addition, a terminal dialogue module may contain code to fetch data based on the single designed database table. Similarly, a service provider dialogue module may contain code to query the database or to fetch data based on the single designed database table. Thus, the system provides an easy and efficient means for users of the design tool to design and develop the applications and the dialogue modules, which are then appropriately translated or otherwise converted during implementation.

Moreover, simplifying the design and development of databases and tables can be applied to all aspects of the invention as disclosed herein (and can also be applied to IOT devices, analytics, etc.). For example, functionality, e.g., calculation of tax amount from the invoices, of the designed application system may be specified in the design of the terminal application (e.g., as discussed in relation to FIGS. 14A to 14K, 16A) or in the design of the service provider application (e.g., cloud application as discussed in relation to FIGS. 18A through 18E, as discussed in more detail below). However, the implementation of where the functionality is actually performed, e.g., on the terminal application or on the service provider application or elsewhere, may be determined by the system based on rules, metrics, or data analytics (or other forms of analysis or learning) or combinations thereof. For example, if the functionality to calculate the tax amount is specified in the design of the terminal application, but the system determines, e.g., based on rules, learning, metrics, etc., that the calculated tax amount(s) is not displayed or otherwise used by the terminal application but it is simply stored in a database table, the system may determine to implement that designed functionality within the service provider application. Using the same principles as described above, as another example, one or more analytics performed (e.g., on one or more of service provider machine, on the terminal machine, or other machine) can also be designed and developed using the same method. For example, analytics on the number of invoices can be specified using the single designed database table. Similarly, the number of invoices with amounts that are in excess of $5,000 can also be specified using the single designed table. In sum, the discussion above (e.g., natural and other languages and representations, using simplified database table designs and related applications based on the simplified database table design, etc.) enables technology to be created, managed and customized by more people, and not just by people that are trained in technology and programming, such as software engineers.

Figures 18A, 18B:

FIG. 18A is a GUI that shows an initial screen for designing and developing the service provider application that runs on the service provider machine (e.g., creating one or more of the service provider dialogue modules). To begin, the designer selects which reference design he or she wants to edit. For example, the designer may select either "CPA-Tax-RD1" or "CPATax-RD1 [Admin]," and the GUI in FIG. 18B is presented in response to user selection of the CPA-Tax-RD1 reference design displayed in FIG. 18A. FIG. 18B shows the intuitive English-like language that allows designers to create or edit the service provider application. In the illustrated example, the designer is specifying a function that uses the "incomemanager" database table (described in FIGS. 17A to 17E), which columns within that table to use (e.g., "using COLUMNS named" as shown in FIG. 18B), and the specific operations that this function provides.

Figure 18D:
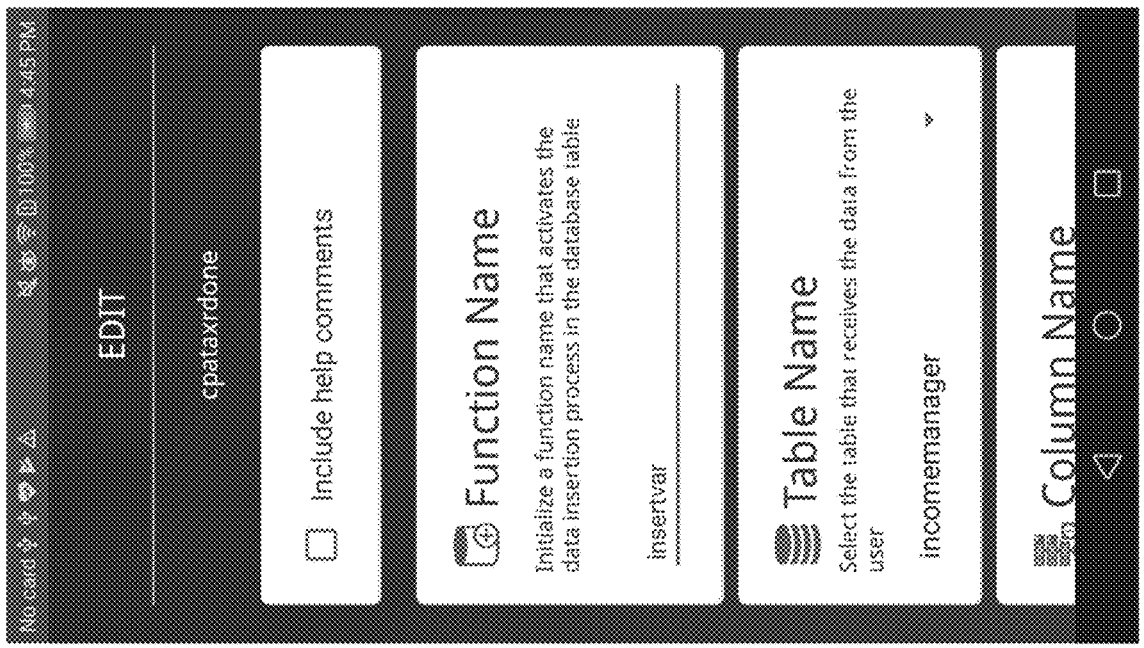
Figure 18C:
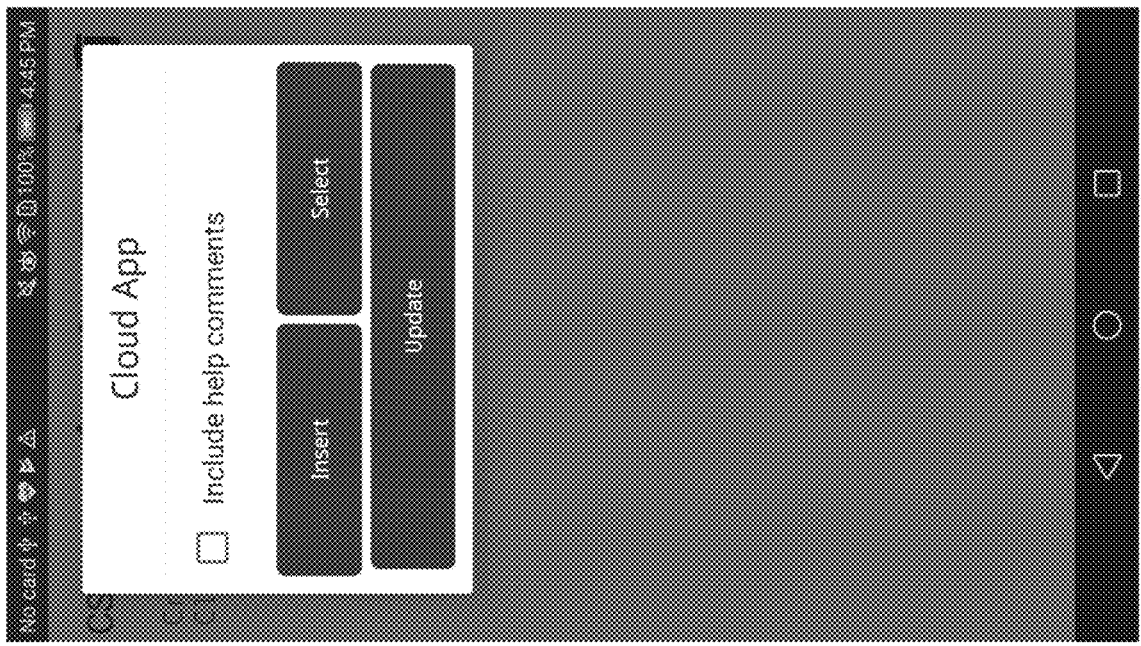

FIGS. 18C and 18D are GUIs that show screens of an intelligent agent within the design tool that can be used to create the information displayed in the GUI of FIG. 18B. For example, instead of typing out all the text in the GUI of FIG. 18B, the designer can use this intuitive tool to create the text displayed in the GUI of FIG. 18B by answering simple questions. In the illustrated example, in an accountant application, the designer may want to allow the client to schedule a meeting with the accountant. Thus, the designer can create a function with the name "getAvailableAppointments," which accepts a date from the terminal application (e.g., a mobile application). This function then goes into the database and locates available time slots on that date for that account and returns the information to the terminal application. The terminal application may display the information to allow a user to select an appointment time. Then, the terminal application can call another function within the service provider application (e.g., cloud application) called "confirmAppointment" that accepts a date and a time. When that function receives that information (e.g., in the cloud or other server), it goes into the database to book the appointment.

Figure 18E:
Figure 19A:
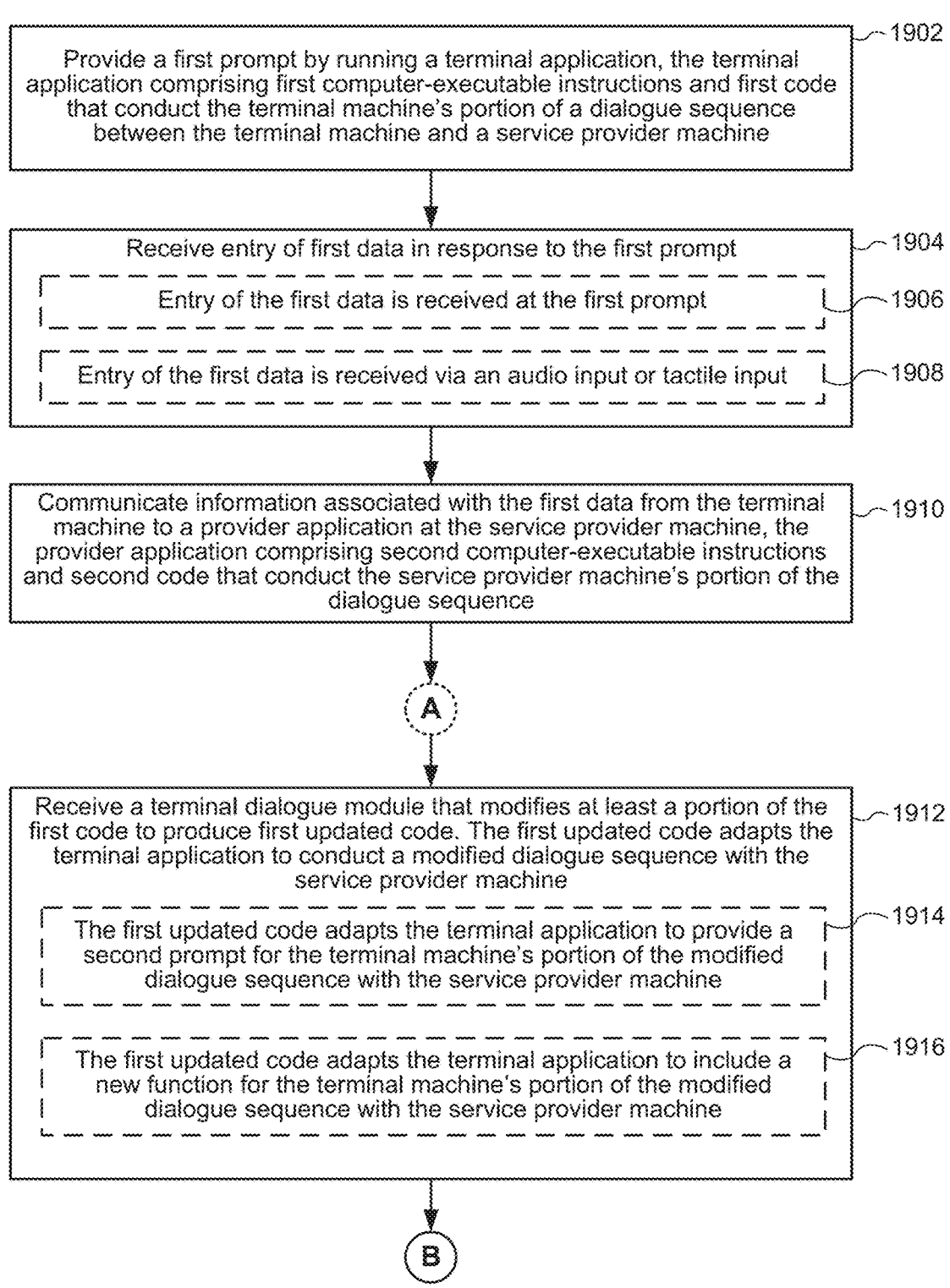
FIGS. 19A-19D of updating a dialogue sequence between a terminal machine and a service provider machine in accordance with some embodiments.
Figure 19B:
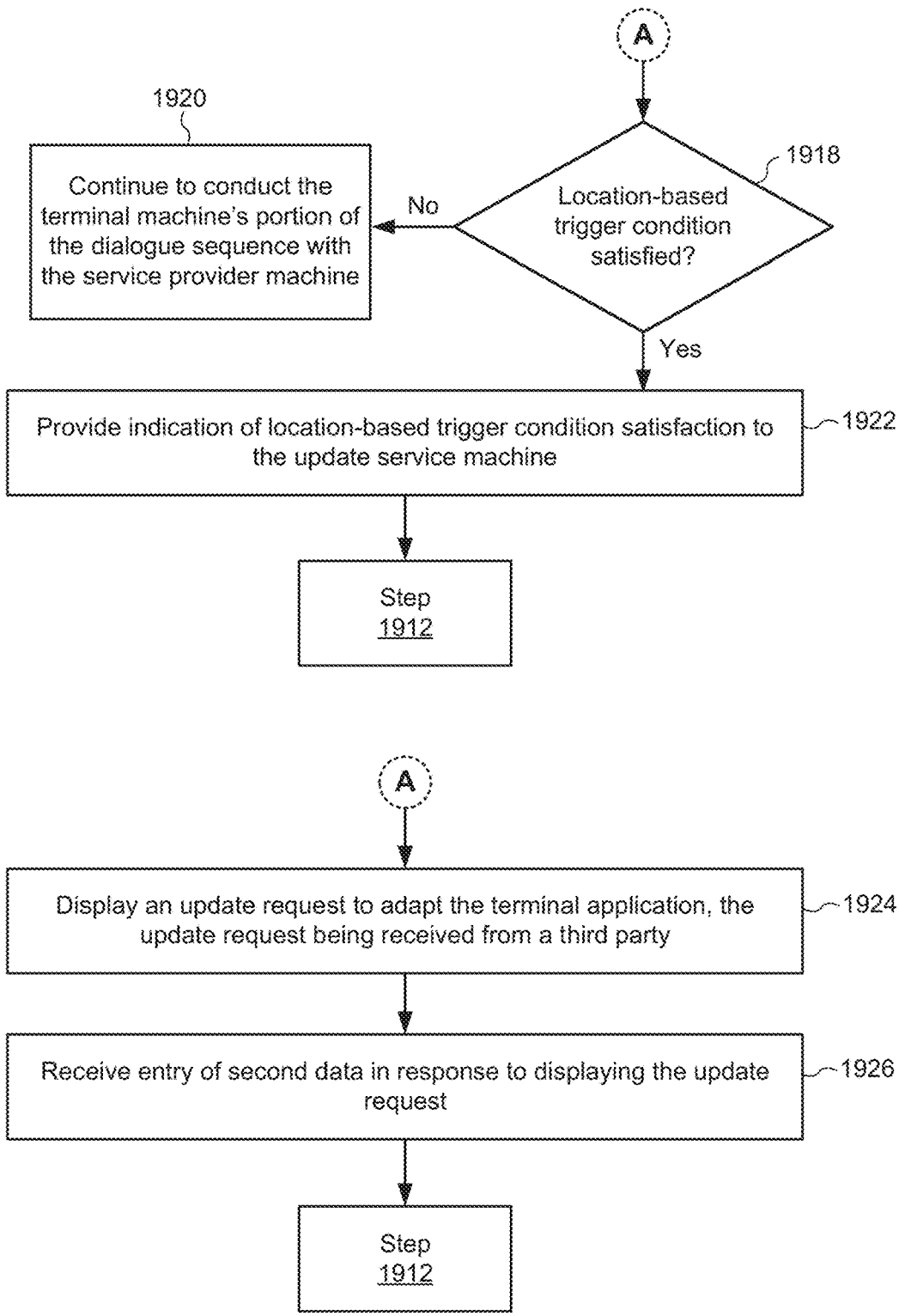
Figure 19C:
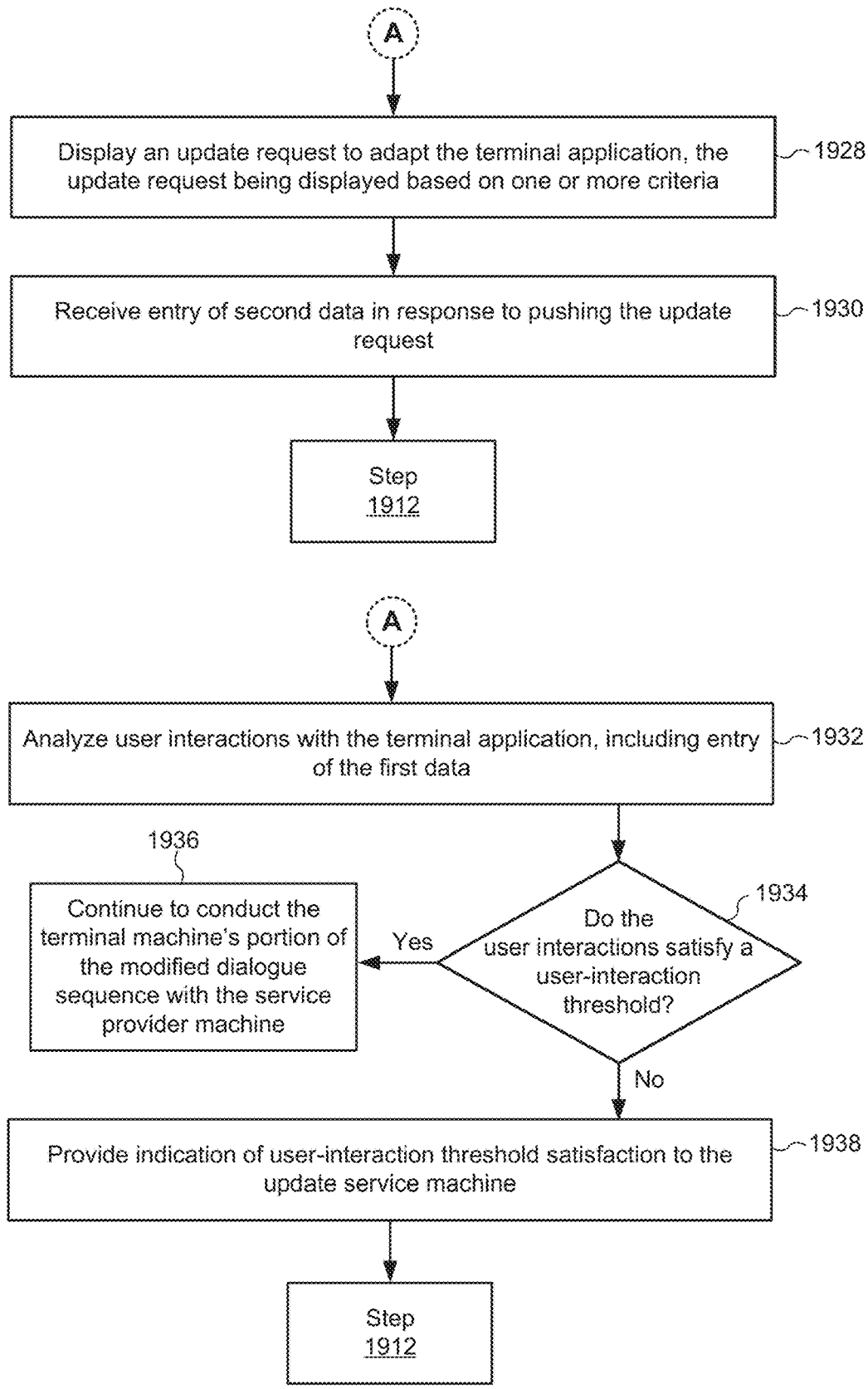
Figure 19D:
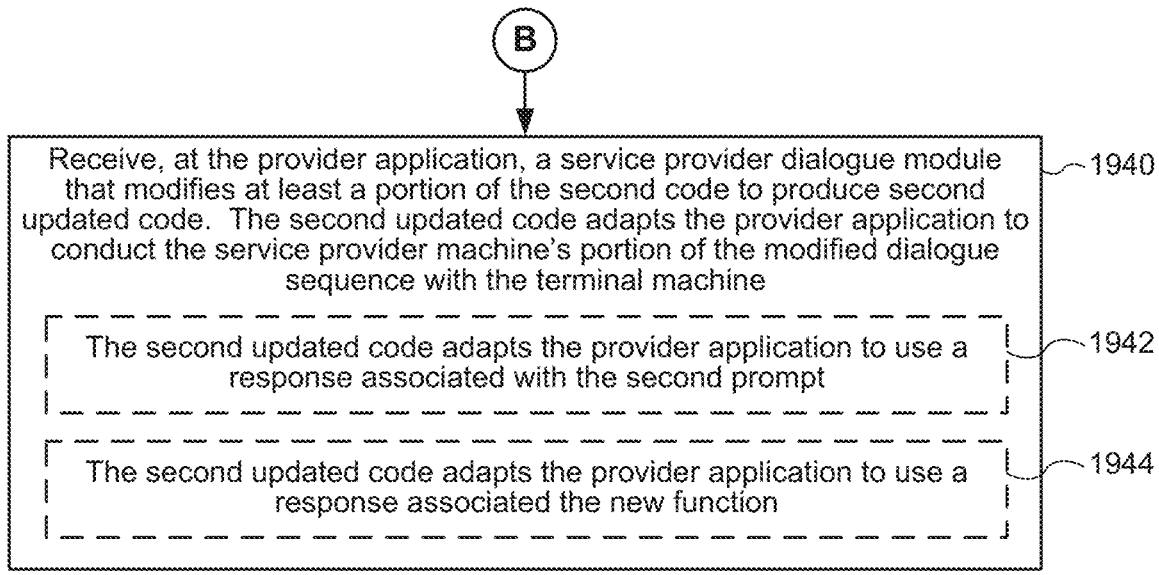
Figure 19D:
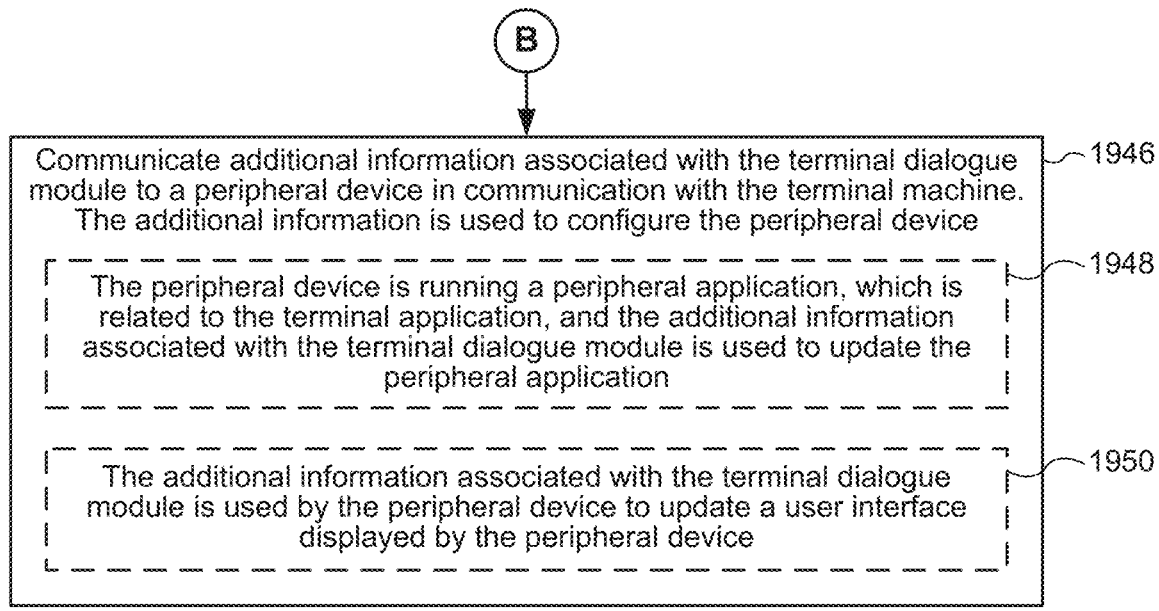

FIG. 18E is a GUI (a scrolled version of the GUI in FIG. 18D) that shows additional screens that can be used to develop a function in the service provider application based on database values. The functions do not always have to be based on database values or data. In some embodiments, the functions perform other calculations. For example, a function may be called "canFileTaxesOnTime," which calculates whether the current date is before or after April 15 of the current year. If it is before April 15, then the function returns "true" indicating that taxes can be filed on time.

The principles of this natural (and other) language design, including the design tool and its associated intelligent agent, can be used to create the contents of the terminal and provider modules. Alternatively, the natural (and other) language design can be analyzed using rules—static or dynamic rules or both—to create the contents of the terminal and service provider modules. Some examples of static rules related to the design (i.e., use of the design tool) and creation of dialogue modules may be the following: (i) a static rule may be used to advise the designer when he or she is trying to put too many prompts/data entries on a single card, which may make the GUI less attractive or more difficult to use, (ii) another static rule may be used to advise the designer that the background color and the foreground text color do not have sufficient contrast to be read easily, and (iii) another static rule may be used to advise the designer that the font size is too small to be read easily on smaller devices.

Dynamic rules relate more to how the dialogue modules are being used, as opposed to creation of the dialogue modules. For example, even though a dialogue module may include a prompt "X" that requires corresponding data entry "Y," the system may determine that users of the developed system are not using prompt "X" and data entry "Y." Therefore, even though the dialogue module specifies this data entry, the system may, based on analytics, decide not to display the prompt in the future. Similarly, if the prompt is not displayed (and no corresponding data entry is entered), there is no need to structure the communications packet to account for this data and the packet structure may be modified accordingly.

The analytics mentioned above may be performed at the terminal machine 120 (of FIG. 1), e.g., the terminal machine determines that no user-data entry is provided for a particular prompt. Alternatively or in addition, the analytics may be performed at the service provider machine 110 (of FIG. 1), e.g., the service provider machine determines that one or more of the terminal machines associated with the service provider machine and running the terminal application are not providing user-data entry for a particular prompt. Thus, based on these analytics, the service provider machine (or the terminal machine) may inform the platform on one or more of the terminal machines to not display a particular prompt and/or to modify the packet structure (or not send the data entry). Alternatively, based on the analytics, instead of instructing the platform to ignore or not display the prompt specified in the terminal dialogue module, the analytics portion of the service provider machine (or some other server) may communicate with the design tool to guide the designer to change or remove the prompt from the troubled dialogue modules. Analytics are discussed in further detail below with reference to the method 1900.

In some embodiments, the design tool is configured to send data associated with a dialogue module to the update server machine 102 (of FIG. 1). For example, if a designer wants text for a prompt without any other information, the design tool transmits data for the desired prompt text to the update server machine, and the update server machine in turn develops code or one or more dialogue modules based on the provided data. In other embodiments, the design tool is configured to develop and transmit one or more dialogue modules or code to the update server machine. In other words, the design tool develops one or more dialogue modules or code, or portions thereof, based on what the designer inputs into the design tool, including the intelligent agent.

FIGS. 19A-19D are flow diagrams illustrating a method 1900 of updating a dialogue sequence between a terminal machine and a service provider machine, in accordance with some embodiments. The steps of the method 1900 may be performed by a terminal machine (e.g., terminal machine 120, FIG. 9) and/or a service provider machine (e.g., service provider machine 110, FIG. 10). FIGS. 19A-19D correspond to instructions stored in a computer memory or computer-readable storage medium (e.g., memory 904 of the terminal machine 120, FIG. 9). To assist with describing the method 1900, the method 1900 will be described, where appropriate, with reference to the example GUIs illustrated in FIGS. 13A-16A, 17A-17E, 18A-18E, and 20A through 20P.

In some embodiments, the method 1900 includes receiving, by the terminal machine (and/or the service provider machine), a request to download a terminal application (or a provider application). A request to download a terminal application may include downloading a platform module 220, a set of computer-executable instructions 224 and terminal code 222. Similarly, a request to download a service provider application may include a platform module 210, a set of computer-executable instructions 214 and service provider code 212. However, if one or more of platform modules 220 and 210, computer-executable instructions 224 and 214, and terminal code 222 and service provider code 212 have already been downloaded (e.g., because of an earlier application download), only the necessary items, e.g., terminal code, need to be downloaded. For example, if platform modules 220 and 210, and computer-executable instructions 224 and 214, have previously been downloaded or otherwise already exist (e.g., pre-installed) on the terminal machine and service provider machine, respectively, only the terminal code and service provider code need to be downloaded onto the terminal machine and service provider machine, respectively. Additionally, if the service provider code also already exists on the service provider machine, e.g., previously downloaded or preinstalled, then only the terminal code needs to be downloaded onto the terminal machine. Downloading applications is discussed in further detail below with reference to FIGS. 20C to 20L.

In some embodiments, receiving the request to download follows a user input. For example, a user of the terminal machine can input a geographic identifier (e.g., zip code, geographical coordinates, etc.) into a GUI of the terminal machine, e.g., as shown in FIG. 20J. In response to the user input, the terminal machine may present one or more different terminal applications for download that correspond to the geographic identifier. The GUI may be for an application platform (e.g., repository), such as APPLE's "APP STORE" or the like. For example, based on the user's selection, the provider dialogue module 206 is sent to the service provider machine, and the terminal dialogue module 202 is sent to the terminal machine. One or more of the service provider dialogue modules do not have to be sent to the service provider machine each time a user of a terminal machine selects an application system from the repository or listing. For example, the first time an application is selected by a user using a terminal machine, the terminal dialogue(s) and service provider dialogue(s) may be sent to the terminal machine and the service provider machine, respectively. On subsequent selections of this same application, however, the service provider dialogue is not necessarily sent to the service provider machine. Alternatively, the applications and systems can be published to an alternate publishing system. In this case, an application system repository or an application system listing service is drawn from one or more update server machines. Applications can be searched or listings may be provided based on a number of different mechanisms, some of which are discussed below. It is noted that, in some embodiments, the terminal machine automatically downloads the terminal application, as described below with reference to FIG. 20L.

With reference to FIG. 20J, the user inputs a postal code of 94010 or associated city or county name, e.g., for San Mateo, California, into a query GUI of the terminal machine. In response to the user input, the terminal machine may present one or more different terminal applications that correspond to the postal code on the terminal display, and the user may select one (or more) of the presented applications to download. In another example, the user of the terminal machine can input a search query into the query GUI. In response, the terminal machine may present one or more different terminal applications that correspond to the search query, and the user may select one (or more) of the presented applications to download. The two examples described above can also be combined. For example, the user may search for legal services and also enter location information associated with the search. This could be for the user's current location (in which case this information may be input manually by the user or GPS data or other geolocation techniques or means, e.g., based on Wi-Fi networks, IP addresses, etc., can be used to automatically determine the user's current location). For example, the terminal machine may indicate or determine that the user (i.e., the terminal machine) is located in San Mateo County, California. Based on these two pieces of information, the terminal machine presents one or more terminal applications on the terminal display, and the user may select one (or more) of the presented terminal applications for download.

In other embodiments, the terminal machine presents one or more terminal applications on the terminal display without user input, e.g., of search parameters. For example, the terminal machine may present one or more terminal applications on the terminal display, as shown in FIG. 20L, based on the current location of the terminal machine (e.g., the user is walking into or has entered a building with both a Legal Aid Society office and a hotel named Residency Hotel so both of these apps are presented), a current date (e.g., it's the day before Valentine's day so flower ordering applications are presented), current promotions, reviews, download history, and/or various information, analytics or statistics. For example, if the user of the terminal machine consistently visits news websites on weekday mornings, the terminal machine may present one or more news-based terminal applications on the terminal display on a weekday morning.

In some embodiments, the method 1900 includes downloading the terminal application associated with the request. In such instances, the terminal machine may receive a terminal dialogue module (e.g., terminal dialogue module 202, FIG. 3A) for the terminal application, e.g., from the update server machine. Downloading applications is discussed in further detail below with reference to FIGS. 20C to 20L.

In some embodiments, the method 1900 includes initiating a dialogue sequence between the terminal machine and the service provider machine. For example, the service provider machine may send a command to the terminal machine to begin the dialogue sequence. In other embodiments, the dialogue sequence may be initiated by the terminal machine or by the user of the terminal machine. Initiating dialogue sequences is discussed in detail above with reference to FIGS. 4A and 4B (e.g., steps 402 and 422).

In some embodiments, the method 1900 includes providing (1902), by the terminal machine, a first prompt by running the terminal application (e.g., in response to the initiating). The terminal application includes first computer-executable instructions and/or terminal code that conduct the terminal machine's portion of the dialogue sequence between the terminal machine and the service provider machine. In some embodiments, providing the first prompt involves displaying the first prompt (or a portion of the first prompt) on a terminal display of the terminal machine (i.e., displaying a GUI that prompts a user of the terminal machine to input data, as shown in FIG. 5A). Alternatively or in addition, in some embodiments, providing the first prompt involves audibly playing the first prompt (or a portion or a representation of the first prompt) (e.g., via an audio output device of the terminal machine 120, such as speakers or an audio output connection connected to speakers, earphones, or headphones). Put plainly, the terminal machine plays audio that prompts a user of the terminal machine to input data. Alternatively or in addition, in some embodiments, providing the first prompt involves providing the first portion (or a portion or a representation of the first prompt) as tactile feedback (e.g., vibrating the terminal machine in such a manner that prompts a user of the terminal machine to input data).

In some embodiments, the method 1900 includes receiving (1904) entry of first data in response to providing the first prompt. In those embodiments where the first prompt is displayed by the terminal machine, entry of the first data can be received at the displayed first prompt (1906). For example, the first data entry can be one or more numeric and/or character strings entered using a keyboard or keypad, coordinates of a user selection corresponding to a location on a terminal display, and/or acknowledgement or button press from a data entry device on the terminal machine 120. In those embodiments where the first prompt is produced audibly (1908), entry of the first data can be received via an audio input device (e.g., a microphone) of the terminal machine 120 (e.g., speech from a user). For example, the first prompt may pose one or more questions to the user of the terminal machine, and the user may respond to the posed questions audibly through the audio input device. In those embodiments where the first prompt is presented tactilely (1908), entry of the first data can be received via one or more inertial measurement units (e.g., gyroscope, accelerometer, etc.) of the terminal machine 120 (e.g., rotation, shaking, shifting of the terminal machine). In other words, motion and/or orientation changes of the terminal machine are used to respond to the first prompt.

In some embodiments, the first prompt is provided in a first form (or multiple first forms) and the first data entry is provided in a second form (or multiple second forms) different from the first form. For example, the first prompt may be displayed on the terminal display, and the first data entry may be an audible response and/or a detected motion of the terminal machine. In another example, the first prompt may be provided tactilely, and the first data entry may be an audible response, detected motion of the terminal machine 120, and/or a user input. Various other combinations of prompts and responds are also possible.

In some embodiments, the method 1900 includes communicating (1910) information associated with the first data from the terminal machine to a provider application at the service provider machine. In some embodiments, the communicating is performed in response to the first data entry. Alternatively, in some embodiments, the terminal machine may wait to send the first data entry until the user has completed a sequence of data entries associated with one transaction before sending the data entries to the service provider machine. Alternatively, one or more of the terminal application and the terminal machine may delay sending the first data entry. The provider application includes second computer-executable instructions and/or service provider code that conduct the service provider machine's portion of the dialogue sequence. The service provider machine receives and stores the information associated with the first data. Communications between the terminal machine and the service provider machine are discussed in further detail above with reference to steps 408 and 410 in FIG. 4A.

In some embodiments, the method 1900 includes determining whether the terminal machine satisfies one or more trigger conditions. For example, the method 1900 may include determining (1918) whether the terminal machine satisfies a location-based trigger condition. In such example, the terminal machine may include a location detection device 917 (FIG. 9), such as a global navigation satellite system (GNSS) (e.g., global positioning system (GPS) and the like) or other geo-location receiver, for capturing/generating location information. Further, the terminal application executing on the terminal machine, with proper permissions, may use the GNSS or other geo-location capabilities (e.g., Internet Protocol address, Wi-Fi, or hybrid positioning systems) of the terminal machine to determine the terminal machine's location. Once the terminal machine's location is known, the terminal machine may compare its location against various predetermined locations to determine if the location-based trigger condition is satisfied (e.g., a match between the terminal machine's location and a predetermined location results in the location-based trigger condition being satisfied). In some embodiments, the predetermined locations are stored in the terminal machine's memory.

Alternatively, in some embodiments, one or more of the update server machine, service provider machine or other server or machine (e.g., location server or service) determines whether the terminal machine satisfies the location-based trigger condition. In such instances, the service provider machine (or other server/machine), including associated applications, may communicate with the update server machine for querying the available the terminal and service provider applications and for sending the appropriate one or more of terminal dialogue module(s) and provider dialogue module(s). In embodiments where the update server machine determines whether the terminal machine has satisfied the trigger condition, the terminal machine sends location information to the update server machine, and the update server machine compares the received location information with one or more predetermined locations to determine if the location-based trigger condition is satisfied. The terminal machine may also send other relevant information (or attributes) to the update server machine, such as "provide hotel apps," or some other keywords. The terminal machine can send location information to the update server machine periodically (e.g., once every minute, five minutes, ten minutes, etc.). In some embodiments, the terminal machine sends location information to the update server machine at a higher frequency when some initial location information indicates that the terminal machine is close to one of the predetermined locations. For example, if the terminal machine is within a predetermined range (e.g., several city blocks) of one of the predetermined locations, the update server machine may request location information at a higher frequency from the terminal machine (e.g., once every second, five seconds, or ten seconds). The determination of the frequency and other parameters and information related to the analysis or sending of location information can be determined by one or more of the terminal machine, service provider machine, update server machine or other server or machine, including associated applications and systems.

Various other trigger conditions can also be used, each of which can lead to the operations discussed at step 1912. For example, a trigger condition may be satisfied when the terminal machine receives a predetermined user input (e.g., the user presses an "update" affordance, whether virtual or physical, inputs data into the terminal machine or moves the terminal machine in a predetermined pattern, such as shaking the terminal machine at a threshold frequency while the terminal application is running). In another example, the trigger condition may be satisfied when the terminal machine receives a signal (e.g., message) from another electronic device (e.g., an internet of things (IOT) or other device transmits a message to the terminal machine when within a threshold distance from the terminal machine (e.g., NFC, Bluetooth, etc. based range). In yet another example, the trigger condition may be satisfied when analytics gathered by the terminal machine satisfy some threshold (e.g., the interaction threshold at step 1934). In yet another example, the trigger condition can be time based, and thus the trigger condition is satisfied when the terminal machine determines that a predetermined time (or day) is reached (e.g., Valentine's day is two days away, which satisfies the trigger condition). It is noted that these triggers can be retrieved from external applications and systems, e.g., calendar application running on the terminal machine or running on the service provider machine, etc.

In some embodiments, in accordance with a determination that the terminal machine does not satisfy the trigger condition (1918—No), the method 1900 includes continuing (1920) to conduct the terminal machine's portion of the dialogue sequence with the service provider machine. In other words, the terminal machine's portion of the dialogue sequence remains unchanged.

However, in accordance with a determination that the terminal machine satisfies the location-based (or other) trigger condition (1918—Yes), the method 1900 includes providing (1922) an indication of the location-based trigger condition being satisfied, e.g., to the update server machine. For example, the terminal machine may send a request to the update server machine (e.g., a request for updated terminal code, or some other information, that can be used to update terminal application). In another example, the terminal machine may inform the update server machine that the terminal machine is located at one of the predetermined locations. It is noted that step 1922 is skipped in those embodiments where the terminal machine informs the update server machine of the location of the terminal machine, and the update server machine makes the determination as to whether the terminal machine satisfies the location-based trigger condition. In either case, the method 1900 then proceeds to step 1912, which is discussed below.

To provide some additional context for the location-based trigger condition, a predetermined location may be associated with a specific entity, such as a hotel, located in a specific city. Accordingly, when a user walks close to or into the hotel with his or her terminal machine, a match between the terminal machine's location and the predetermined location is established. As such, the terminal machine may provide an indication of the location-based trigger condition being satisfied to the update server machine, and then the update server machine would send a (or an updated) terminal dialogue module to the terminal machine. The terminal dialogue module is used (as discussed below at step 1912), at least some embodiments, to adapt the terminal application. For example, prior to receiving the terminal dialogue module, the terminal application may be more generalized and applicable to the entity's business as a whole (e.g., the terminal application applies to all hotels owned by an entity). However, after receiving the updated terminal dialogue module, the terminal application is adapted for the specific hotel located at that specific location. In this way, information unique to the specific hotel (e.g., nightly specials being served at the hotel's restaurant, which floor the gym is located on, ability to order food and drinks from the beach adjacent to the hotel, etc.) can be quickly and easily presented on the adapted terminal application. Satisfying the trigger condition may also result in the downloading of a totally new or different application. For example, the terminal machine may not have any hotel application (related to the entity that owns the hotel that he or she just entered or any other hotel). When the trigger condition is satisfied, a new application (e.g., one or more of the general hotel application for this group of hotels, the application specific to the hotel that the user just entered, or both). Adapting the terminal application is discussed in further detail below.

In one embodiment, the terminal dialogue module replaces existing terminal code already saved on the terminal machine (e.g., the terminal code mentioned above obtained during the downloading of the terminal application associated with the request). In other embodiments, there may not be any terminal code previously saved on the terminal machine. For example, the terminal code previously saved on the terminal machine may be an empty set of code. In some cases, the terminal code may supplement other code previously saved on the terminal machine.

In addition, as described earlier, in some embodiments, the newly transferred terminal code is not necessarily compiled on the terminal machine 120. In other embodiments, the newly transferred terminal code, or portions thereof, is compiled (or partially compile) on the terminal machine 120. In some embodiments, the terminal code may be intermediate code in the form of Java Byte Code. As also described earlier, the intermediate code may be interpreted by a platform module portion of the terminal application. In one embodiment, computer-executable instructions or binary code comprising the platform module or other portions of the terminal application (previously stored on the terminal machine) is not deleted or replaced.

It worth noting that the terminal machine is distinct from the service provider machine. Furthermore, the update server machine may be separate and distinct from the terminal machine and the service provider machine. In some other embodiments, however, the update server machine is either the terminal machine or the service provider machine.

In some embodiments, at least one of the service provider machine and the update server machine is a remote server, where the remote server runs as a virtual machine instance in a cloud-computing environment. Alternatively, at least one of the service provide machine and the update server machine is a computing device, such as a mobile phone, tablet, laptop computer, desktop computer, etc.

In another aspect, the method 1900 can include displaying (1924) an update request to adapt the terminal application, where the update request is received from a third party. The update request may be displayed after the terminal machine provides terminal machine or other identification information to the third party (e.g., via Near-Field Communication (NFC), Bluetooth, Wi-Fi, etc.). For example, while checking in at a hotel, a user of the terminal machine may transfer identification information of the terminal machine (or the user) to the hotel's computer system, and in response, the hotel's computer system may send the update request to the terminal machine. The terminal machine, user or other identification information can include a telephone number, email, account information, or any other identifier. The user of the terminal machine can also provide identification information in the form of a telephone number, email, etc. to the third party, e.g., while filling out a written form or by verbal communications. In some embodiments, the terminal machine, user or other identification information is part of the first data entry.

Furthermore, in some embodiments, the method 1900 includes receiving (1926) entry of second data in response to displaying the update request. The second data entry can be an acceptance or a rejection of the update request. For example, as a user checks into a hotel, the hotel staff may ask for the user's phone number and, based on that identifier, send an update request to the user's terminal machine, e.g., for that hotel's application. If the second data entry is an acceptance, the method 1900 then proceeds to step 1912, which is discussed below. It is noted that, in some embodiments, after the terminal machine (or the user of the terminal machine) provides the identification information of the terminal machine to the third party, the terminal machine automatically accepts the update request. Accordingly, step 1926 is optional.

In yet another aspect, the method 1900 can include displaying (1928) an update request to adapt the terminal application, where the update request is displayed based on one or more criteria. The one or more criteria can correspond to user input in the terminal application. For example, a user of the terminal machine can input a geographic identifier (e.g., zip code, coordinates, etc.) into a GUI of the terminal application. In response, the terminal application may provide various relevant updates. To illustrate, the user inputs a postal code (as shown in FIG. 20J), and in response to the user input, the terminal application may present application updates on the terminal display (e.g., updates to the terminal application currently downloaded on the terminal machine). In this way, like the location-based trigger condition discussed above, the terminal application can be adapted for, say, a specific hotel located in a particular city or region associated with the postal code. In another example, the user of the terminal machine can input a search query into a GUI of the terminal application (as shown in FIG. 20D). In response, the terminal application may provide various relevant updates that correspond to the search query (and potentially other information associated with the terminal machine, such as location information). To illustrate, the user may search for "hotels" and the terminal machine may be located in San Francisco, California at the time of the search. Further, the terminal application may be an application for a specific hotel company (e.g., MARRIOTT). Based on these pieces of information, the terminal application presents one or more application updates on the terminal display for MARRIOTT hotels located in (or near) San Francisco. Furthermore, in some embodiments, the method 1900 includes receiving (1930) entry of second data in response to displaying the update request. The second data entry can be a selection of one of the displayed application updates.

In yet another aspect, the method 1900 includes analyzing (1932) user interactions with the terminal application, which can include entry of the first data. The analyzing can evaluate user interactions with various portions of the terminal application to determine how users interact with the application. In this way, the terminal machine can determine if the terminal application is presented in a user-friendly manner. In some embodiments, analyzing user interactions with the terminal application includes analyzing user interaction with the first prompt (e.g., determine if users are interacting with the first prompt in the intended manner, if at all). As described earlier, information associated with data entries can be stored in a machine's (e.g., a terminal machine, a service provider machine, etc.) memory for subsequent analysis. The storing can be accomplished using a relational or other database, standard files, in persistent or non-persistent memory, or any other way of storing information. Accordingly, the analyzing at step 1932 can involve analyzing information associated with data entries stored in the machine's memory. A terminal machine (or service provide machine, update service machine) can also request information stored at another device for analysis.

The analyzing (1932) of the user interactions with the terminal application can involve various kinds of analytics, learning, data mining, etc. To provide some non-limiting examples, the analyzing (1932) may include calculating a number of transactions performed by one or more terminal machines, calculating an aggregate or average amount of the transactions performed by one or more terminal machines, etc. In addition, the analysis can be performed over a given time period, e.g., year-to-date transactions performed by all terminal machines, or transactions performed daily (or some other time frame). The analysis can also be performed immediately or a later time. For example, if the information is stored in non-persistent memory, the analysis may be done immediately (or somewhat immediately) and optionally, the results of the analysis can be used to provide a signal or other event, or may be itself stored. Moreover, the analysis or the results of the analysis can be used to present data (e.g., graphs and other analysis) or to take some action (e.g., used to signal other events or initiate other functionality of the dialogue protocol, as described below).

Furthermore, in some embodiments, the method 1900 includes determining (1934), based on the analyzing, whether the user interactions with the terminal application satisfy an interaction threshold. For example, if the user (or users generally) continually look for a specific piece of information buried within the terminal application (or, say, skip a provided prompt and its associated data entry), then the terminal machine can determine that the terminal application should be adapted to present the specific piece of information in a more prominent location (or the frequently skipped prompt should no longer be displayed). It is noted that one or more of the analyzing (1932) and the determining (1934) may also be performed by the service provider machine and/or the update server machine. In such embodiments, the terminal machine (along with other terminal machines running the terminal application) is (are) configured to provide the service provider machine and/or the update server machine with user-interaction data.

In some embodiments, in accordance with a determination that the user interactions with the terminal application satisfy an interaction threshold (1934—Yes), the method 1900 includes continuing (1936) to conduct the terminal machine's portion of the dialogue sequence with the service provider machine. In other words, the terminal machine's portion of the dialogue sequence remains unchanged. Alternatively, in accordance with a determination that the user interactions with the terminal application do not satisfy the interaction threshold (1934—No) (i.e., there is a lack of user interaction), the method 1900 includes providing (1938) an indication of the user-interaction threshold not being satisfied to the update server machine (and/or the service provider machine). For example, the terminal machine may send an update request to the update server machine, as described above with at step 1918—Yes. In another example, the terminal machine may provide information resulting from the analyzing to the update server machine. The method 1900 then proceeds to step 1912, which is discussed below.

In some embodiments, the method further includes receiving (1912), at the terminal machine, a (new or updated) dialogue module (optionally including other information) that modifies at least a portion of the first code to produce first updated code (e.g., terminal dialogue module 202). As mentioned above, a dialogue module can include one or more portions of code or instructions related to a dialogue sequence. Thus, in some embodiments, the received dialogue module includes updated terminal code. Alternatively or in addition, the dialogue module may include other information that can be used to produce the first updated code. For example, the other information may be text in natural language or other form, as shown in FIGS. 14A and 14B, which is then interpreted, compiled, or otherwise modified by the terminal machine so that it can be executed on the terminal processor. The first updated code adapts the terminal application to conduct a modified dialogue sequence with the service provider machine. In some embodiments, the terminal machine receives the dialogue module from the update server machine. Alternatively, in some embodiments, the terminal machine receives the dialogue module from a different terminal machine, or the service provider machine. In some embodiments, the dialogue module is received without any additional input by the user (e.g., occurs automatically once the trigger condition is satisfied).

As noted above with steps 1922 and 1938, the terminal machine may provide an indication of a trigger condition or threshold being satisfied by the terminal machine. In such instances, the terminal machine may request the dialogue module from the update server machine (or some other machine that has the dialogue module). Alternatively, in such instances, the terminal machine informs the update server machine (or some other machine that has the dialogue module) of the satisfaction (or lack thereof), and the update service machine selects the dialogue module to send to the terminal machine (e.g., the update service machine selects the dialogue module from a plurality of possible dialogue modules). Using the hotel example from above, the update service machine may include a unique code for each MARRIOTT hotel. Or, the update server machine maintains geocoordinates or other location information associated with each such hotel. Any kind of relevant or useful information or data can be maintained for each application and dialogue modules. Accordingly, the update service machine selects the dialogue module that best aligns with the information received from the terminal machine.

In some embodiments, the first updated code adapts the terminal application, at least partially, to provide a second prompt for the terminal machine's portion of the modified dialogue sequence with the service provider machine (1914). In some embodiments, providing the second prompt involves displaying the second prompt on the terminal display of the terminal machine (i.e., displaying a GUI that prompts a user of the terminal machine to input data). Alternatively or in addition, in some embodiments, providing the second prompt involves audibly playing the second prompt (e.g., via an audio output device of the terminal machine 120). Alternatively or in addition, in some embodiments, providing the second prompt involves creating tactile feedback.

Alternatively or in addition, the received dialogue module may adapt the terminal application to include a new function for the terminal machine's portion of the modified dialogue sequence with the service provider machine. For example, prior to the receiving the dialogue module, the terminal machine's portion of the dialogue sequence with the service provider machine may not support voice-based interactions/responses. However, the dialogue module may adapt the terminal application to support voice-based interactions/responses. In this way, the terminal application can be quickly and easily adapted to support new functions that were not widely implemented when the terminal application was first developed.

In another example, the received dialogue module may provide the terminal application with the ability to control or interact with a new electronic device. To illustrate, the dialogue module may provide the terminal application with the ability to unlock a hotel room (i.e., the new function). The ability to unlock a door may be new functionality created using the design tool, and sent using the dialogue module. The dialogue module may also include additional information (e.g., encrypted key) that may be transmitted to the new electronic device (e.g., using Bluetooth, NFC, etc.) that is used to control the new electronic device (e.g., the encrypted key is used to unlock the hotel room door). In some instances, the terminal machine transmits the information to the electronic device in response to the user interacting with the second prompt. For example, the terminal machine may transmit the encrypted key to the door lock when the user presses a "Unlock Door" button/prompt on the second prompt on the terminal machine (or speaks "Unlock Door" or moves the terminal machine in a predetermined manner, such as shakes the terminal machine at or above some predefined frequency or brings the terminal machine in proximity to the door lock, etc.).

In some embodiments, the method 1900 includes receiving (1940), at the provider application, a dialogue module (optionally including other information) that modifies at least a portion of the service provider code to produce second updated code (e.g., service provider dialogue module 206). In some embodiments, the received dialogue module includes updated service provider code. Alternatively or in addition, the received dialogue module may be text in natural or other language form, as shown in FIGS. 17B-17C, which is then interpreted, compiled, or otherwise modified by the service provider machine so that it can be executed on the service provider machine processor (e.g., to produce the second updated code). The second updated code adapts the provider application to conduct the service provider machine's portion of the modified dialogue sequence with the terminal machine. In some embodiments, the received dialogue module is received from the update server machine. In some embodiments, at least one of the terminal code, the service provider code, the first updated code, and the second updated code includes intermediate code.

In some embodiments, the method 1900 includes determining whether the service provider machine satisfies a trigger condition, and the receiving (at step 1940) is performed in response to determining that the service provider machine satisfies the trigger condition. Additionally, the service provider machine may also send an update request to the update server machine in response to determining that a trigger condition is satisfied. In some embodiments, the trigger conditions are the same for the terminal machine and the service provider machine, and in other embodiments, the trigger conditions differ in some way. For example, the service provider machine may be heavily loaded or response time may be inadequate and another instance of the service provider machine (e.g., cloud virtual server instance) may need to be manually or automatically created. In this case, the load factor may be a trigger to for the new virtual server instance to receive the dialogue module at step 1940 (i.e., triggers may also be based on factors other than loading).

The receiving at step 1940 and the receiving at step 1912 may occur at the same or different times. In one example, the receiving at step 1940 occurs when a new application or new update to an application is available (e.g., the service provider machine receives the application automatically (e.g., cloud virtual server instances) or has to make a request), while the receiving at step 1912 occurs at a later time by individual terminal machines (e.g., when a user downloads the terminal application to his or her terminal machine, when the user receives an update request (as explained above), or when the terminal machine satisfies a trigger condition (as explained above)).

In some embodiments, the dialogue module received at step 1940 is received from the update server machine. In some embodiments, the service provider machine request the dialogue module from the update server machine. Alternatively, in some embodiments, another machine or software or combination thereof may instruct the update server machine to transmit one or more dialogue modules to the service provider machine. For example, the cloud management system may instruct a update server machine to transmit one or more dialogue modules to a new cloud virtual server instance. Alternatively, the new cloud virtual server instance may request one or more dialogue modules from one or more update server machines.

In those embodiments where in the first updated code adapts the terminal application to provide a second prompt, the second updated code adapts the provider application to use a response associated with the second prompt, the second updated code can instead (or also) adapt the provider application to include (or process) new functionality. For example, if the first updated code allows the terminal application to support voice-based interactions/responses, then the second updated code may allow the provider application to process voice-based interactions/responses. Alternatively, the terminal application or terminal machine may convert the voice-based response into another format before it is received by the service provider application, e.g., text equivalent of the voice response.

As described earlier, in some embodiments, the newly transferred service provider code is not necessarily compiled on the service provider machine 110. In other embodiments, the newly transferred service provider code is compiled on the service provider machine 110. In some embodiments, the service provider code may be intermediate code in the form of Java Byte Code or .NET Framework's Common Intermediate Language (CIL) or Microsoft Intermediate Language (MSIL). As also described earlier, the intermediate code may be interpreted by a platform module portion of the service provider application. In one embodiment, computer-executable instructions or binary code comprising the platform module or other portions of the service provider application (previously stored on the service provider machine) is not deleted or replaced.

In some embodiments, the terminal machine is in communication with a peripheral device (e.g., smart watch, smartphone, mobile device, tablet, smart appliance, or some other Internet of things (IOT) device). For example, the terminal machine may communicate with the peripheral device through a wired or wireless (e.g., Bluetooth, Wi-Fi, etc.) interface. In such embodiments, the method 1900 can include communicating (1946), by the terminal machine, additional information associated with the received terminal dialogue module (step 1912) to the peripheral device, the additional information being used to control, configure, request or instruct the peripheral device. Using the example from above, the peripheral device may be an electronic door lock for a hotel room door, and the additional information associated with the received terminal dialogue module may be an encrypted key that is used to unlock the hotel room door (e.g., transition the electronic door lock from a locked state to an unlocked state).

In some embodiments, the peripheral device (e.g., a smart watch) is running a peripheral application, which may be related to the terminal application, and the additional information associated with the received terminal dialogue module is used to update, configure, control, request or instruct the peripheral application (1948). For example, the additional information associated with the received terminal dialogue module is used by the peripheral device to update a GUI displayed by the peripheral device (1950). In another example, the additional information associated with the received terminal dialogue module is used by the peripheral device to provide a new function to the peripheral device (e.g., a door-unlock function—tap smart watch against electronic door lock). In some embodiments, the additional information is the received terminal dialogue module (or a portion of the terminal dialogue module), and the peripheral device processes the terminal dialogue module in the same (or similar) manner as the terminal machine.

Figure 20A:
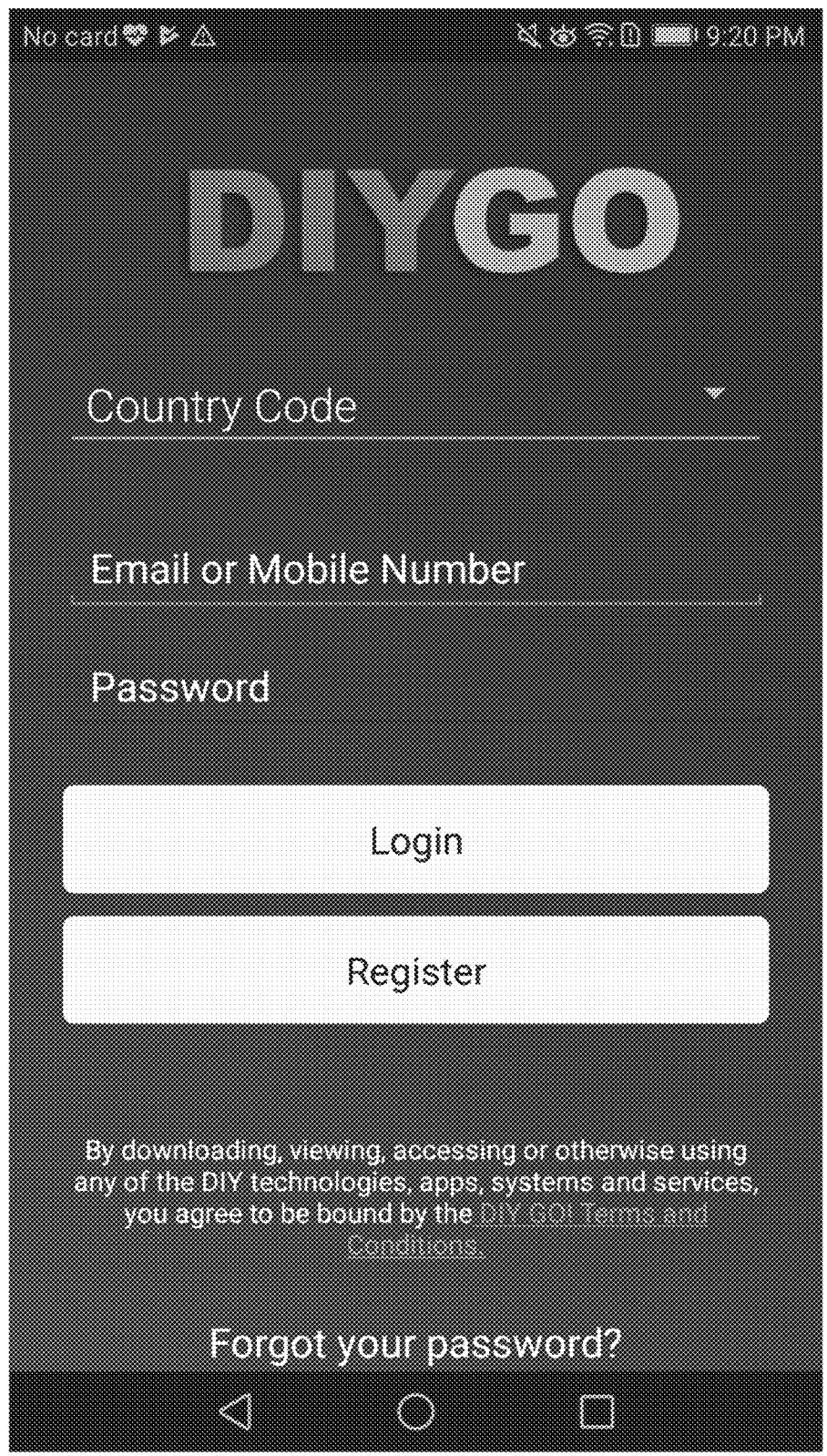
FIGS. 20A-20P illustrate example screens of a terminal application with a built-in search tool that allows searching for terminal applications and associated service provider applications. The figures depict one embodiment of the present invention for purposes of illustration only. One skilled in the art will readily recognize from the following discussion that alternative embodiments of the structures and methods illustrated herein can be employed without departing from the principles of the invention described herein.
Figure 20B:
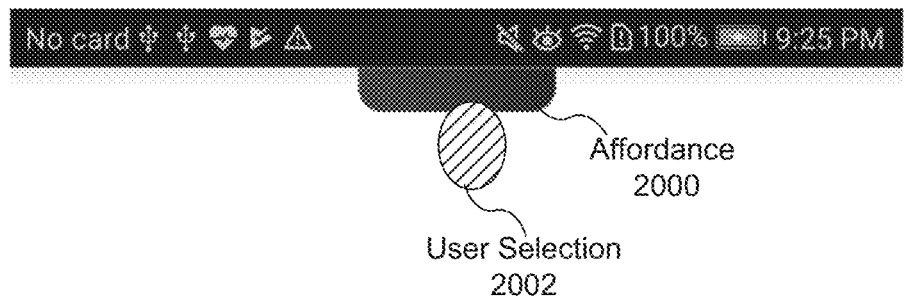
Figure 20B:
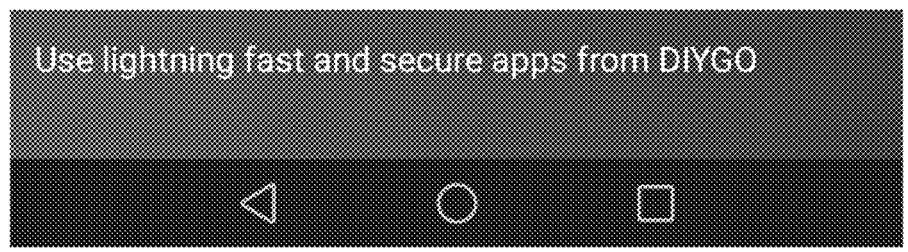
Figure 20D:
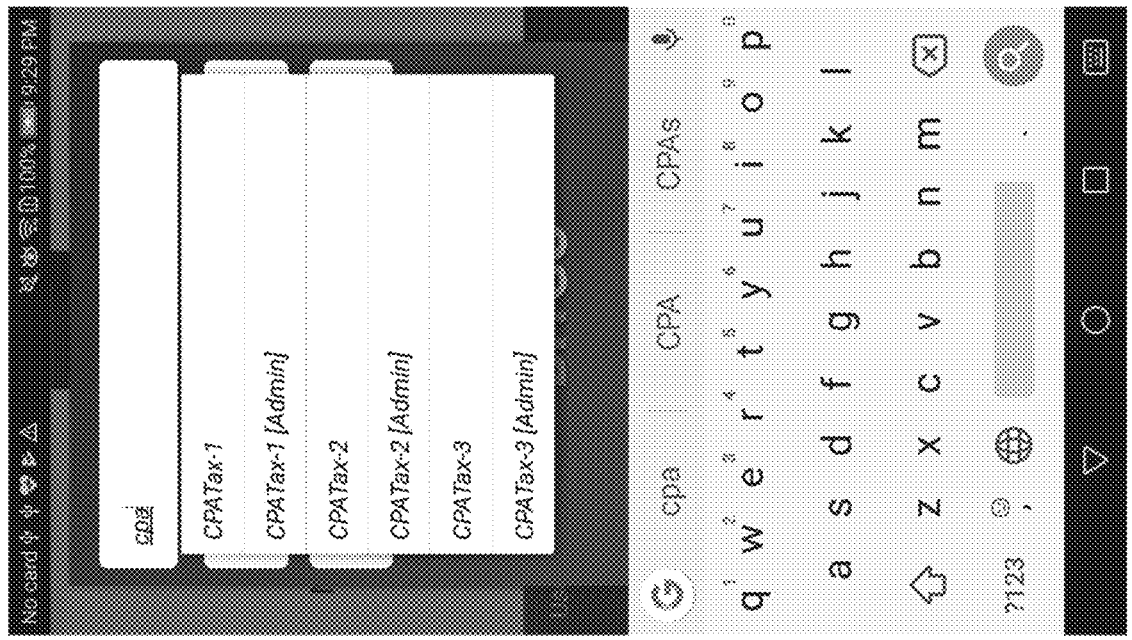
Figure 20C:
Figures 20E, 20F:
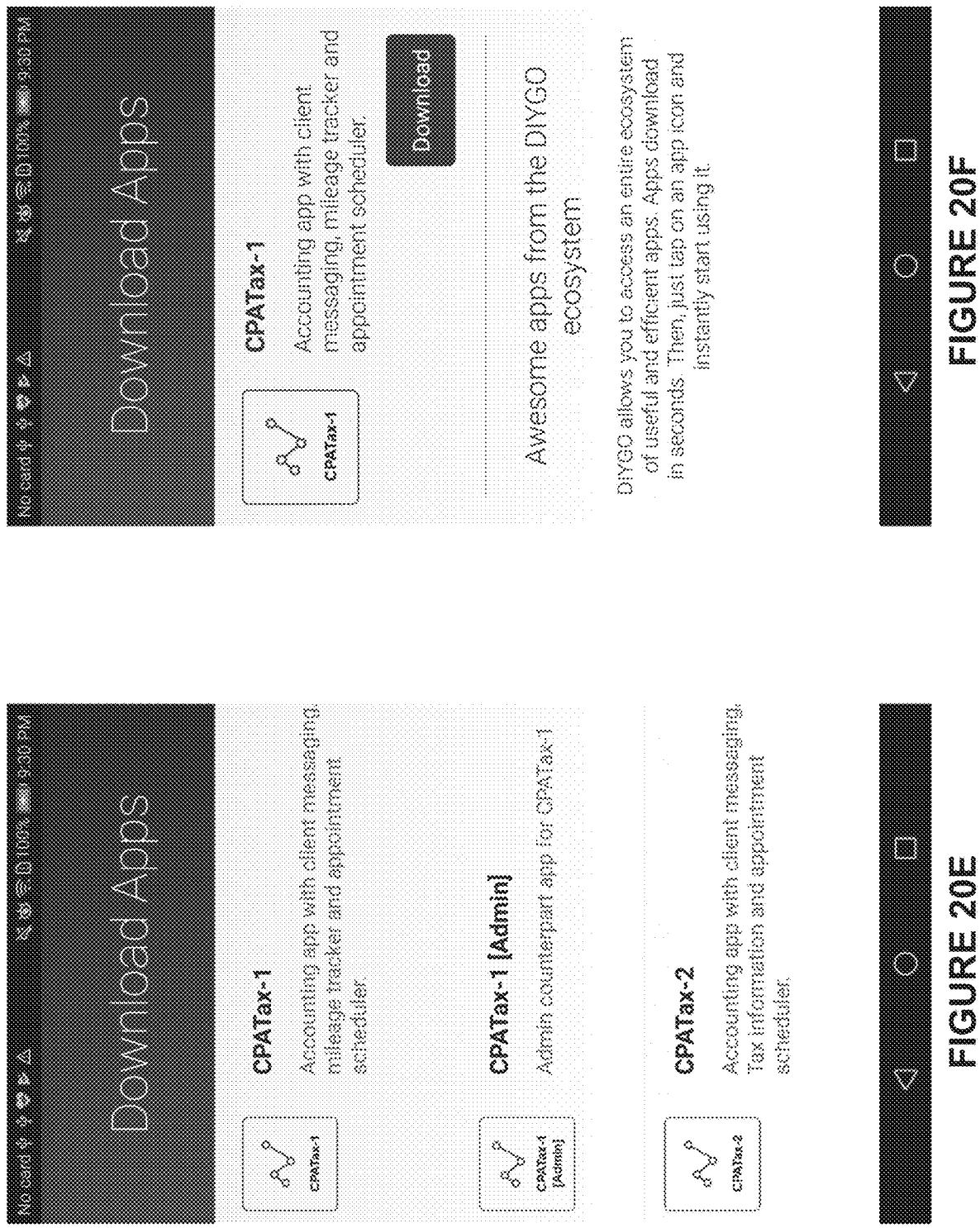
Figure 20H:
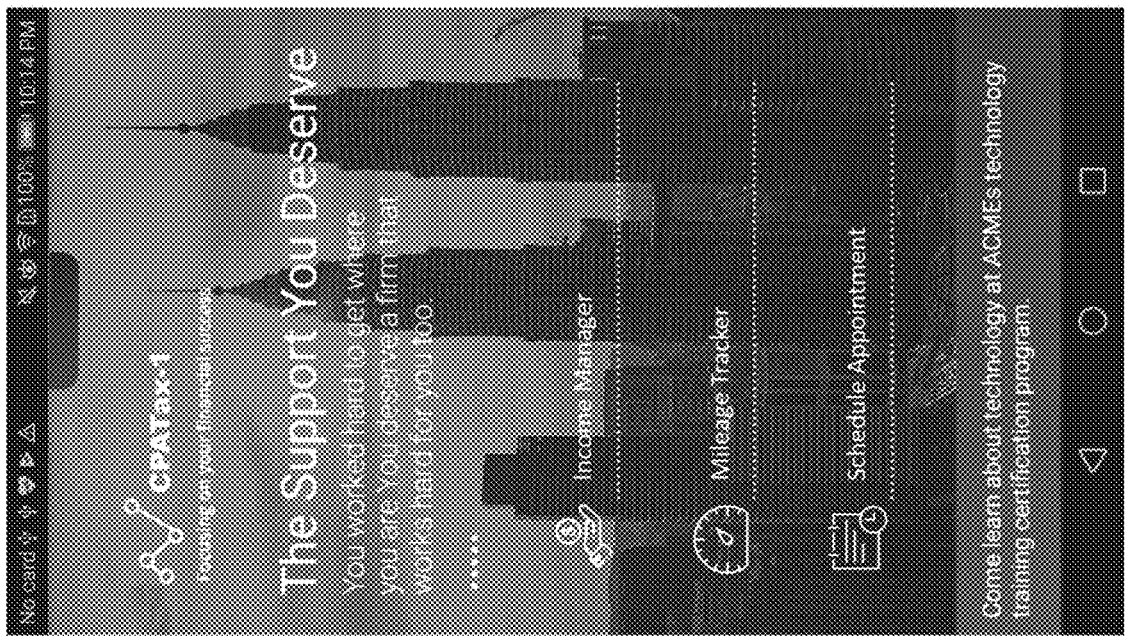
Figure 20G:
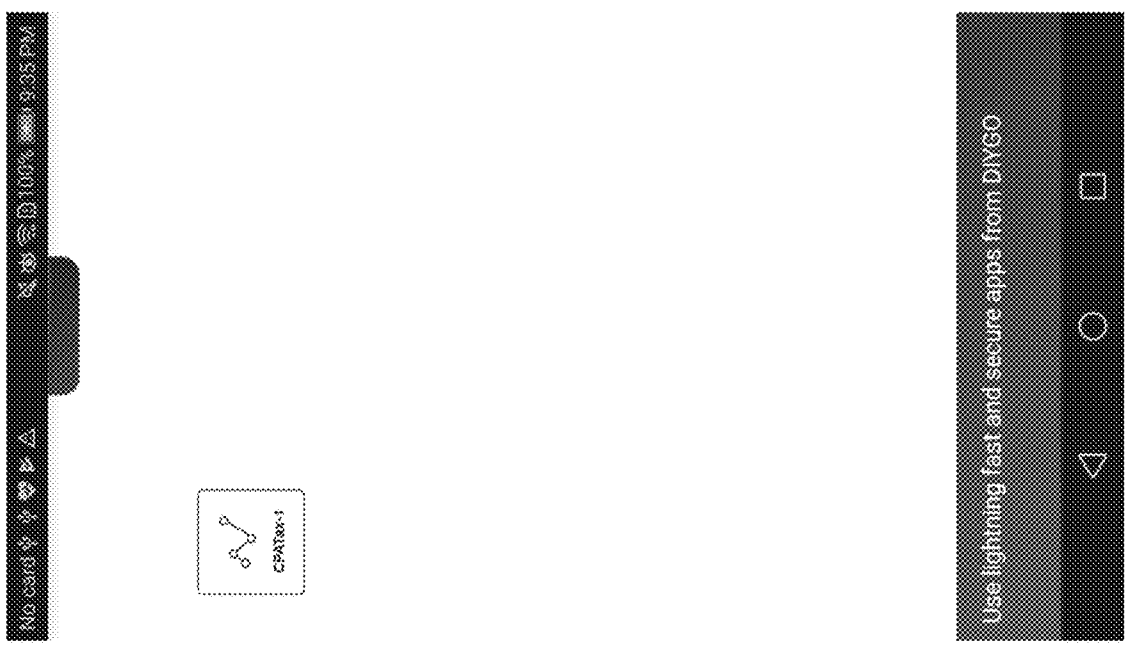
Figure 20I:
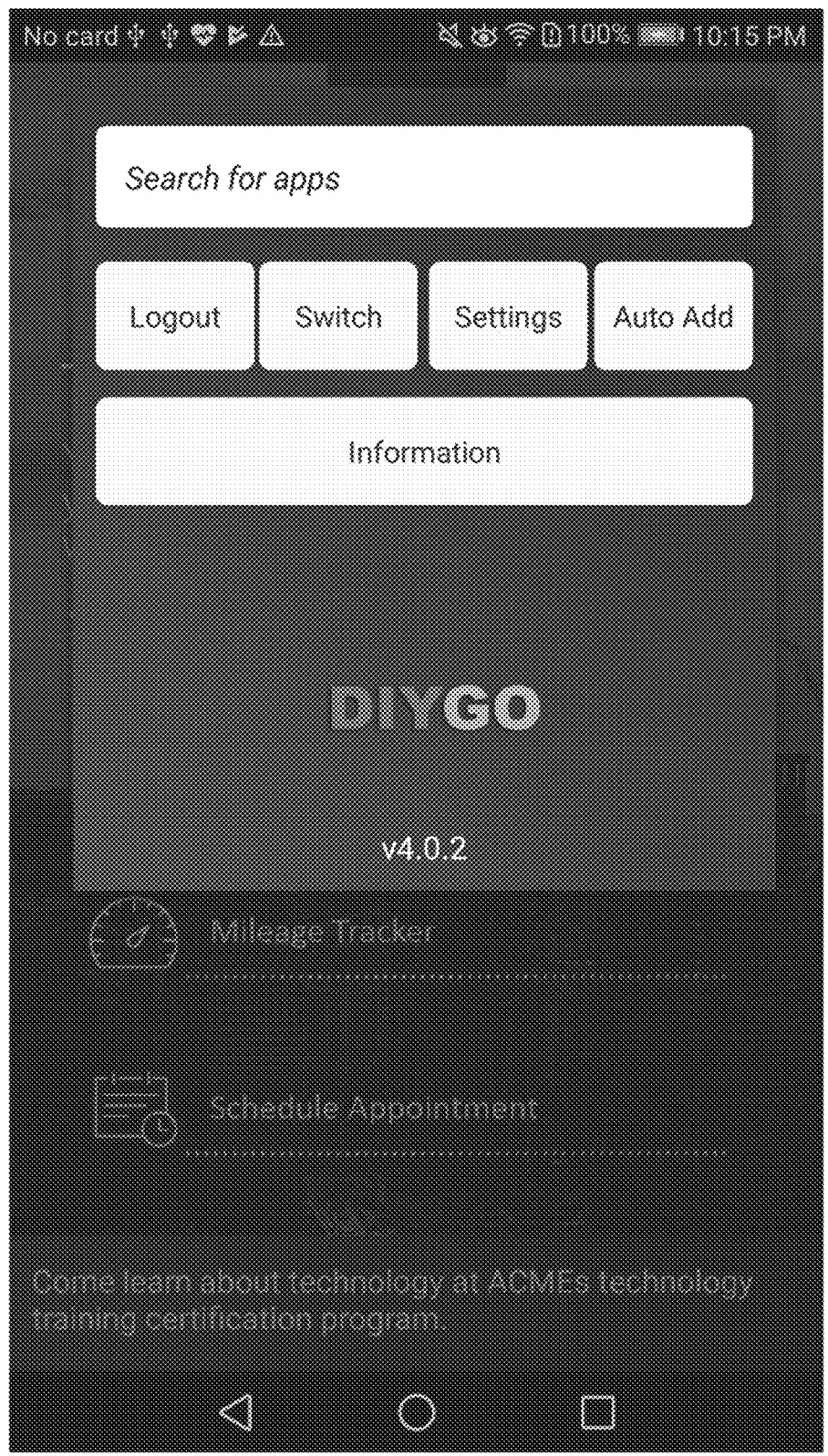
Figure 20K:
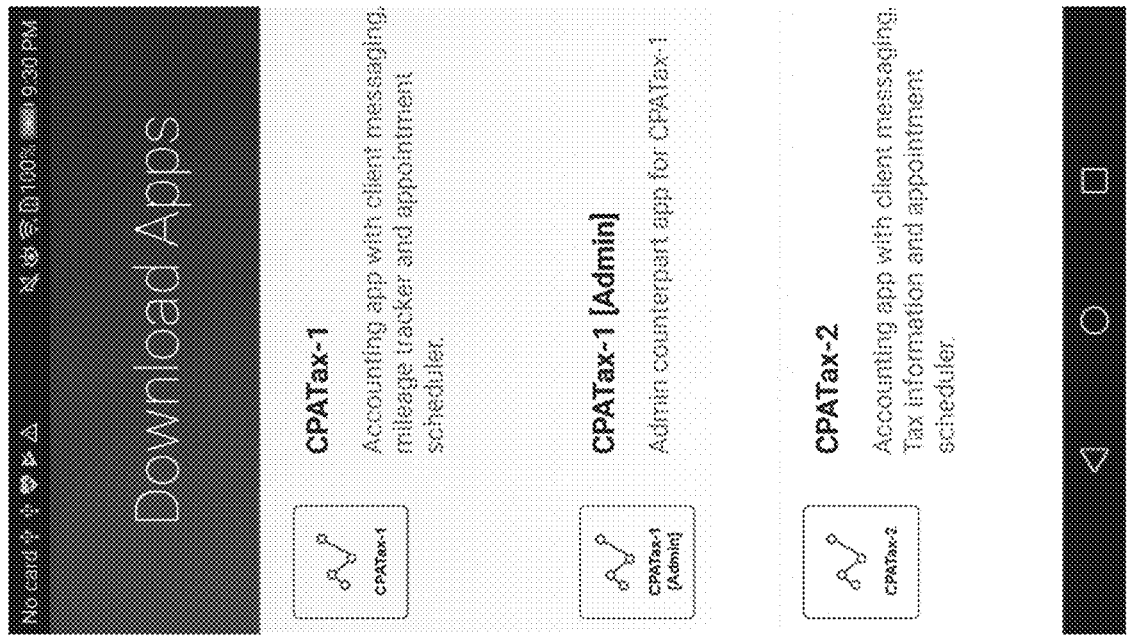
Figure 20J:
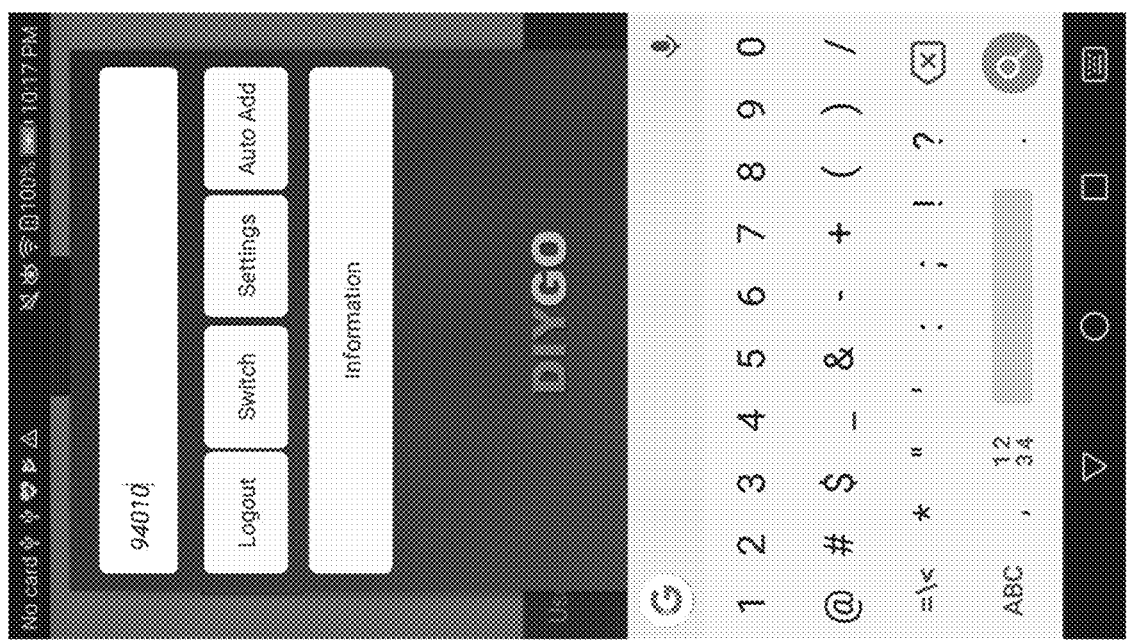
Figure 20L:
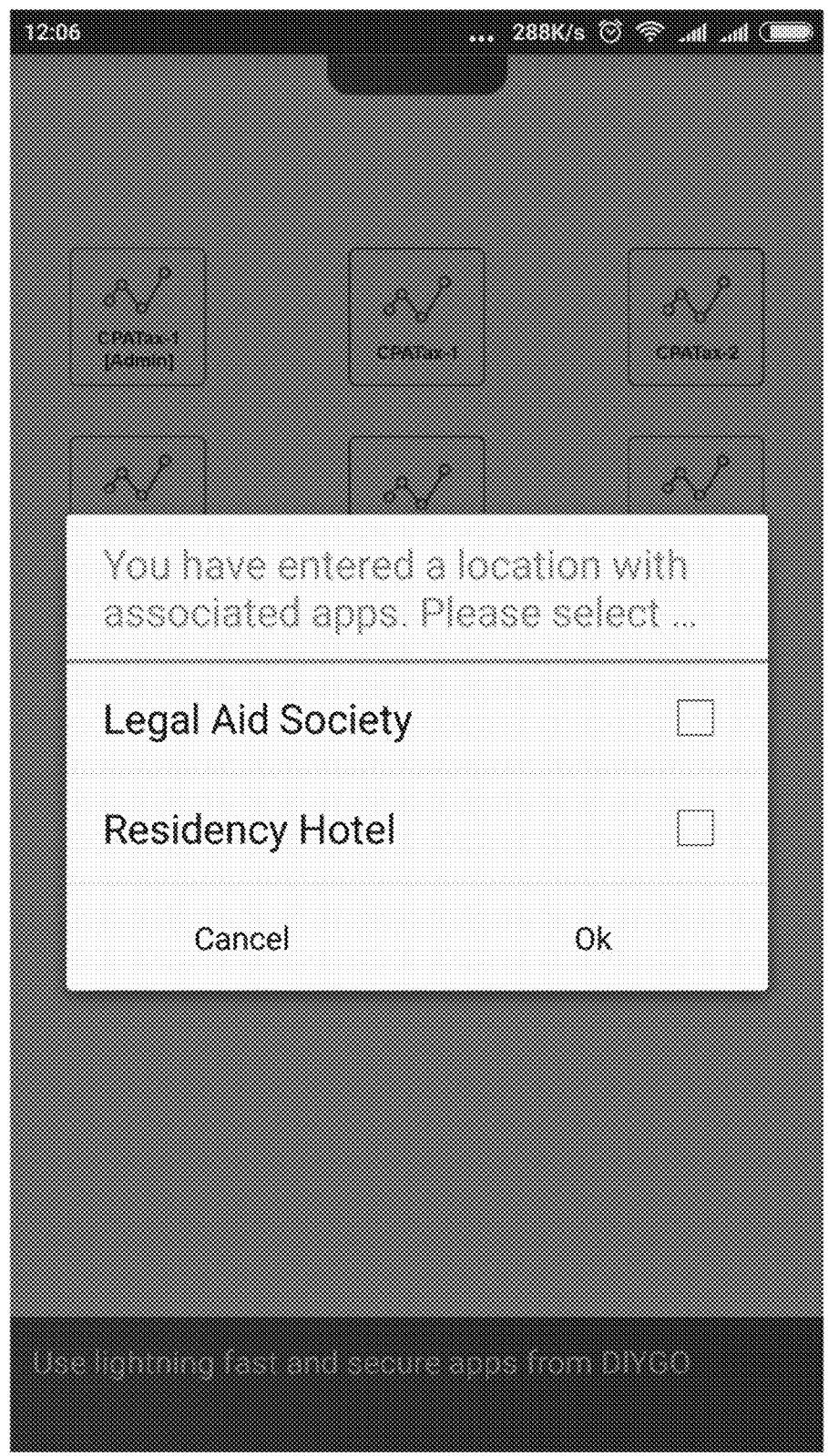
Figure 20M:
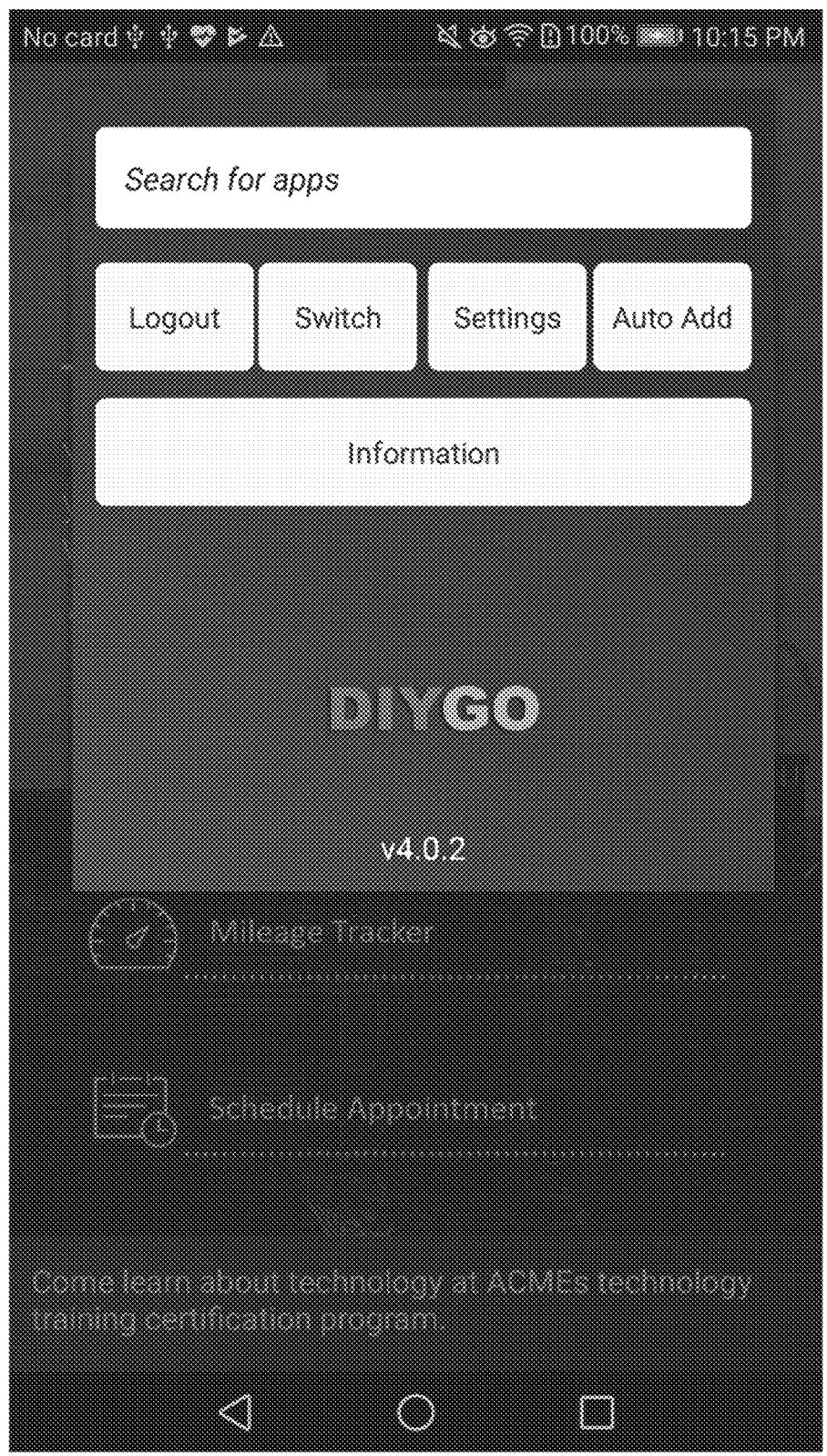
Figure 20O:
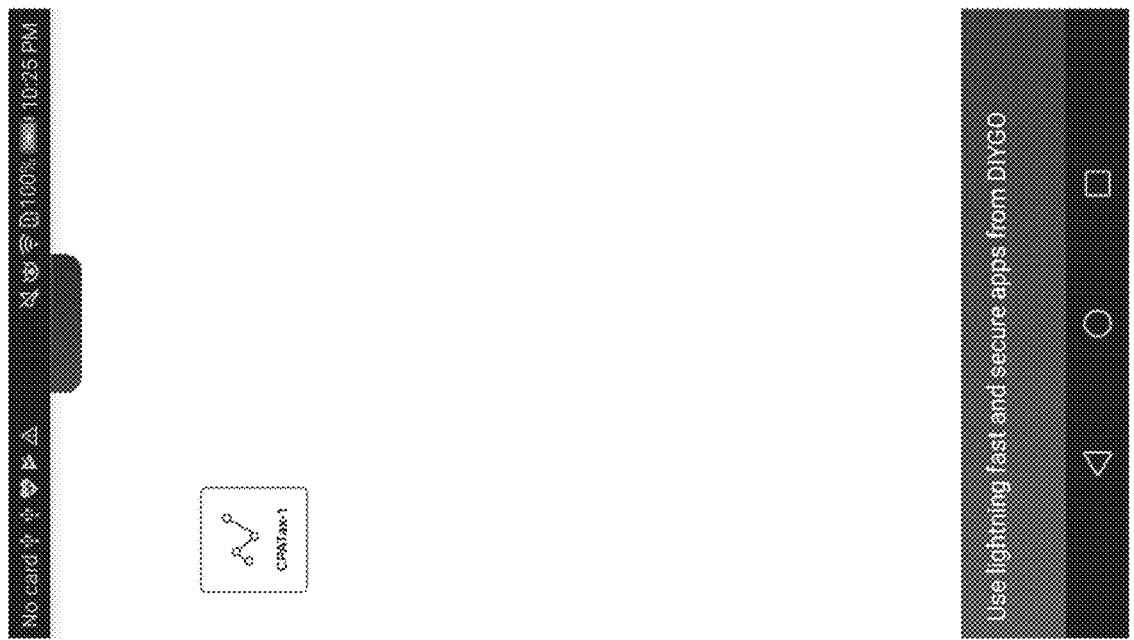

FIGS. 20A to 20O depict examples of a terminal application including a platform module 220, a set of computer-executable instructions 224 and terminal code 222. In some embodiments, the terminal code is initially empty. In some embodiments, the terminal application can include a built-in search tool that can be used to search for applications (e.g., terminal applications and corresponding service provider applications). In this particular example, the terminal application together with a built-in search tool is dubbed DIYGO, and is running on a computing device, such as a mobile phone or tablet. In some embodiments, the computing device is the terminal machine 120. In other embodiments, the computing device is in communication with one or more of the terminal machine 120, the update server machine 102, and the service provider machine 110. Some of FIGS. 20A to 20O are also discussed above with reference to the method 1900.

FIG. 20A is a GUI that shows an example login screen for the terminal application with built-in search tool. The illustrated GUI includes a "Country Code" field, a "Email or Mobile Number" field (i.e., a user name field), and a "Password" field. It is noted that not all of the illustrated fields are required, and other means of logging in can be used, such as biometrics, tokens, and one time passwords. In some embodiments, no login is used, and thus, the login screen of FIG. 20A is optional.

FIG. 20B is a GUI that shows a home screen that allows a user to search for applications, and open previously installed applications (if any). User selection (e.g., tap gesture 2002) of a predefined region (e.g., affordance 2000) causes the GUI shown in FIG. 20C to be displayed, which may be a pull-down screen/menu. The GUI in FIG. 20C allows various functions, including logging out of DIYGO and settings for DIYGO. In addition, the "Information" area can be used to obtain information about using the search tool, and the "Search for apps" area can be used to search for applications using keywords, location, postal codes, geocoordinates, GPS data and other information. For example, as shown in FIG. 20D's GUI, as the user types "cpa," a number of applications that match the search criteria ("CPATax-1," "CPATax-1[Admin]," etc.) are dynamically shown. The user can continue to type or select the application he or she wants to install. If the user types out the search completely, then the GUI in FIG. 20E is shown, which includes a listing of applications that fit the search criteria. Once the user selects one of the applications from the listing in FIG. 20E, another GUI is provided (FIG. 20F) that allows the user to download the selected application. In some embodiments, the GUIs in FIGS. 20E and 20F are not provided, and instead the search tool immediately downloads and installs the application selected based on the search criteria.

FIG. 20G is a GUI that shows the home screen of the terminal application with built-in search tool after a terminal application is downloaded by the user (e.g., "CPATax-1" was successfully downloaded). When the user presses the application icon shown in the GUI of FIG. 20G, the application runs within the terminal application with built-in search tool. That is, a single platform module 220 and a set of computer-executable instructions 224 can be used with one set of terminal code or a multiplicity of sets of terminal code. In the situation of a multiplicity of sets of terminal code, a multiplicity of terminal applications can be efficiently (e.g., high speed and low response time, low network bandwidth usage, low energy and power usage, reduced battery consumption, etc.) downloaded and used by the user of the terminal machine, as illustrated in the GUI of FIG. 20P. In some embodiments, the home screen includes an advertisement ribbon (e.g., near the bottom of the home screen, as shown), which may or may not remain displayed when the application is running. The top pull-down area (affordance 2000) also may continue to be overlaid on top of the running application (as shown). If the user presses the top pull-down area while the application is running, then the GUI of FIG. 20I is displayed. From there, the user may press the "Switch" button to return to the home screen GUI (FIG. 20G). The "Switch" function allows the user to switch out a current application and quickly run another application (or the user may search for a new application to download and install).

FIG. 20J is a GUI that shows how location-based search criteria can also be used to search for applications (e.g., instead of or in combination with keywords). In some embodiments, the location-based search criteria include category tags or subject areas (e.g., search "Bay Area," "Puget Sound," "San Francisco," "Pierce County," "COACHELLA," "San Jose Earthquakes," etc.). Alternatively, as shown in the illustrated example, the location-based search criteria include postal codes. In such embodiments, the search tool returns all (or a subset of) applications matching the input postal code.

In some embodiments, satisfaction of a trigger condition causes one or more applications to be displayed, as shown in the GUI of FIG. 20L. As described above with reference to the method 1900 (e.g., step 1918), the trigger condition may be a location-based trigger condition. For example, if the user (with the device) walks near a particular clothing shop (or the user walks into a particular hotel), a popup or other notification may automatically appear (as shown in the GUI of FIG. 20L) that allows the user to select one or more applications for download. In FIG. 20L's GUI, the user did not search for these applications but instead they were presented to the user based on one or more location-based triggers. In some embodiments, the pop-up window is not displayed and instead the one or more applications are automatically downloaded and installed in the tool. A particular location, e.g., a building or a region, may have zero, one or more applications associated with it. Depending on the granularity of the geocoordinate and location information and/or other criteria and parameters, when a user is near or enters a location or geofence, one or more applications associated with that area may be presented to the user of the terminal machine.

Alternatively, instead of a location trigger, other triggers can be used. For example, a third-party may "push" an application install to one or more specific users of the tool. For example, and as described above with reference to the method 1900 (e.g., step 1924), when checking into a hotel, hotel staff may request a user's phone number or other identifying information. Based on this information, the hotel staff may send a request to the tool to download and install a specific application, e.g., the specific hotel's application, on the user's terminal machine. In this case, a similar popup or notification is presented that allows the user to download and install the one or more "pushed" applications on his or her terminal. Alternatively, the "pushed" applications may be automatically downloaded and installed, and the user may or may not be notified of the downloading and installing. Alternatively, an indicator may be provided, as explained below.

After one or more applications are downloaded and installed, the user may or may not be notified that the new application(s) has (have) been downloaded and installed. In some embodiments, a special indicator is used to notify the user about the new application(s). The special indicator may be an asterisk (or some other symbol) that appears on the application's icon displayed on the main dashboard screen GUI (e.g., positioned on a corner on the icon). In another example, the special indicator includes the application's icon appearing in different coloring or highlighting on the main dashboard screen GUI.

In some embodiments, an "Auto Add" button (shown in the GUI of FIG. 20M) may take the user to a listing of all application that may be downloaded and installed based on one or more of the trigger conditions being satisfied. Essentially, instead of (or in addition to) having popups or other notifications of applications that can be downloaded and installed based on the triggers, these applications can be placed into one or more lists and the user can, at any time that is convenient, review and approve (or decline) the applications to be downloaded and installed.

Figure 20N:
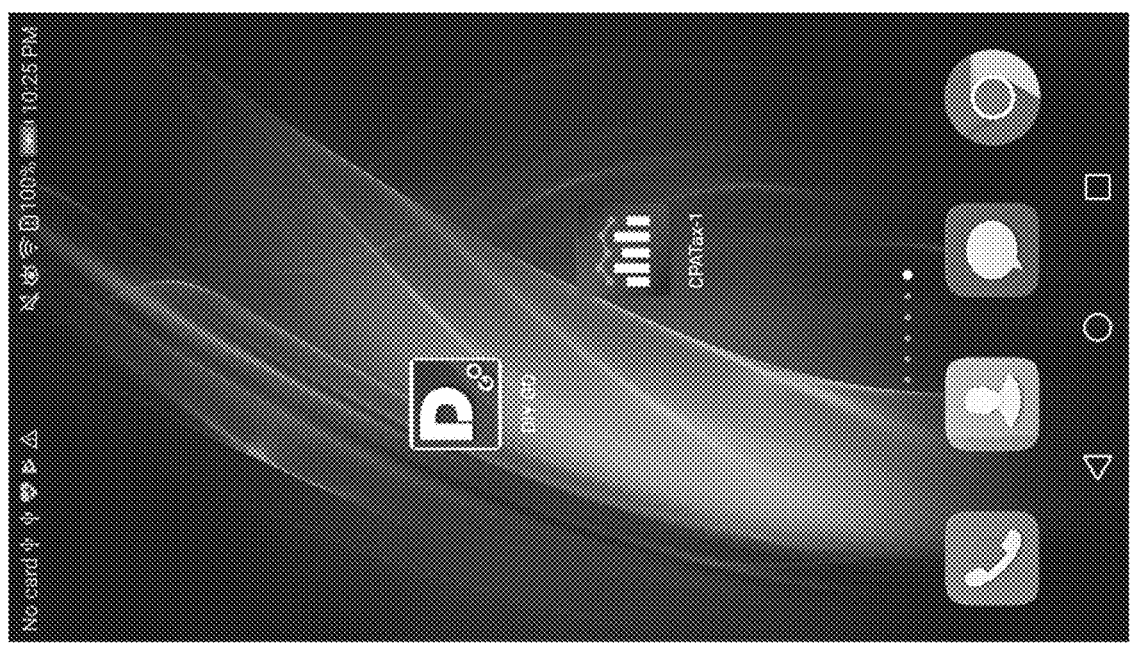
Figure 20P:
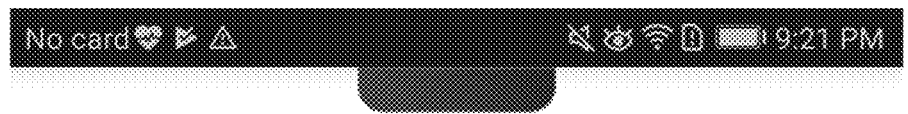
Figure 20P:
Figure 20P:
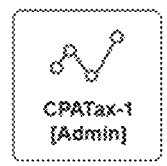
Figure 20P:
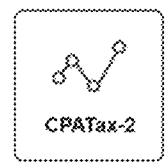
Figure 20P:
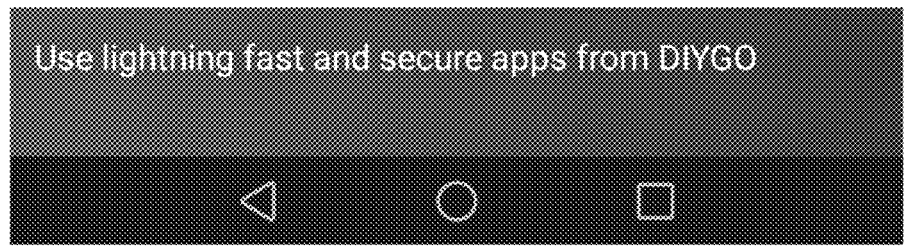

FIGS. 20N and 20O are GUIs that show differences between having a terminal application (e.g., the application icon for "CPATax-1") available through a terminal application with built-in search tool where a one or more terminal applications can be downloaded and run efficiently using a single platform module and a set of computer-executable instructions (FIG. 20O) and the terminal application available as a standalone application that can be accessed directly from the terminal machine (FIG. 20N). As standalone, the example application icon appears as a standard application on the user's device (e.g., standalone application appears as one of the applications on the device's home screen GUI(s)). In this case, the application icon is based on the actual terminal application because other applications cannot be searched and installed in this standalone application. Only the GUI and functionality of the original application, e.g., CPATax-1 terminal application, is available through this standalone application. In some embodiments, new terminal dialogue modules may be received by the standalone application, but these dialogue modules may be limited to the original application. That is, dialogue modules related to or associated with new or different terminal applications (e.g., other than the CPATax-1 application) may not be received by the standalone application, while they may be with a terminal application with built-in search tool. Alternatively, the standalone application may not allow new dialogue modules beyond the first set of dialogue modules. If the standalone example application is launched (e.g., tap gesture on the example application icon), then the device immediately shows the example application running. Essentially, the capabilities of the DIYGO platform are bundled together with the example application's design (made using the DIY application, also shown in FIG. 20N's GUI), Although only certain exemplary embodiments of this invention have been described in detail, those skilled in the art will readily appreciate that many modifications are possible in the exemplary embodiments without materially departing from the novel aspects of the described embodiments. For example, aspects of embodiments disclosed above can be combined in other combinations to form additional embodiments. Accordingly, all such modifications are intended to be included within the scope of this invention. As person of ordinary skill in the art will also appreciate that the specific examples disclosed herein about the design tool, intelligent agent, screen shots of the design tool and agent, screen shots of the terminal application with built-in search tool, notifications, etc., are provided for ease of understanding and context. Various other embodiments are possible and the specific examples are in no way meant to limit the scope of the underlying concepts and principles.

What is claimed is:

1. A method of conducting a dialogue sequence between at least two user devices, the method comprising:
   receiving, at a user device, authorization signal to enable the user device to conduct at least a portion of a dialogue sequence facilitated by at least one application included on the user device, wherein the at least one application includes first code comprising information that must be translated before it can be executed on a computer processor of the user device;
   determining that the user device satisfies one or more criteria associated with the dialogue sequence; and
   receiving second code at the user device that allows the at least one application to conduct at least an updated portion of the dialogue sequence, wherein the second code comprises information that must be translated before it can be executed on the computer processor of the user device,
   wherein the at least one application on the user device continues to operate when the second code is received.

2. The method of claim 1, further comprising:
   sending by the user device information associated with a data entry for the dialogue sequence; and
   storing at least a portion of the information associated with the data entry for the dialogue sequence.

3. The method of claim 2, wherein at least a portion of the information associated with the data entry for the dialogue sequence is used to perform analysis or analytics.

4. The method of claim 3, wherein the analysis or analytics is used to develop or further develop information related to at least one of the user devices and the user of the user device.

5. The method of claim 4, wherein the one or more criteria includes at least location based criteria.

6. The method of claim 5, further comprising:
   obtaining, via the at least one application, location information, wherein the location information is associated with at least one of the user device and a distinct user device.

7. The method of claim 2, wherein at least a portion of the first code is translated when the at least one application is installed on the user device.

8. The method of claim 7, wherein:
   the user device is one of a cell phone, mobile phone, smart watch, smart appliance, laptop, or tablet.

9. The method of claim 2, further comprising:
   presenting, via the user device, a prompt to accept a data entry for at least the updated portion of the dialogue sequence.

10. The method of claim 2, wherein the second code is received via the at least one application.

11. The method of claim 1, wherein the second code is provided responsive to a determination that one or more trigger conditions are satisfied by at least one of the user device and a distinct user device of the at least two user devices.

12. The method of claim 1, wherein the second code is selected based, at least in part, on identification of at least one of a first user of the user device and a second user of a distinct user device.

13. The method of claim 1, further comprising:
   before receiving the second code at the user device, operating the at least one application on the user device.

14. A non-transitory computer-readable storage medium including computer-executable instructions that, when executed by a user device, cause the user device to:
   receive, at the user device, authorization signal to enable the user device to conduct at least a portion of a dialogue sequence facilitated by at least one application included on the user device, wherein the at least one application includes first code comprising information that must be translated before it can be executed on a computer processor of the user device;
   determine that the user device satisfies one or more criteria associated with the dialogue sequence; and
   receive second code at the user device that allows the at least one application to conduct at least an updated portion of the dialogue sequence, wherein the second code comprises information that must be translated before it can be executed on the computer processor of the user device,
   wherein the at least one application on the user device continues to operate when the second code is received.

15. The non-transitory computer-readable storage medium of claim 14, wherein the computer-executable instructions, when executed by the device, further cause the user device to:

send by the user device information associated with a data entry for the dialogue sequence; and store at least a portion of the information associated with the data entry for the dialogue sequence.

16. The non-transitory computer-readable storage medium of claim 15, wherein at least a portion of the information associated with the data entry for the dialogue sequence is used to perform analysis or analytics.

17. The non-transitory computer-readable storage medium of claim 16, wherein the analysis or analytics is used to develop or further develop information related to at least one of the user devices and the user of the user device.

18. The non-transitory computer-readable storage medium of claim 15, wherein at least a portion of the first code is translated when the at least one application is installed on the user device.

19. A system for conducting a dialogue sequence between at least two user devices, the system comprising:

memory including computer-executable instructions that are executable on a processor; and one or more processors coupled with the memory and configured to execute the computer-executable instructions to cause the system to:

receive, at a user device, authorization signal to enable the user device to conduct at least a portion of a dialogue sequence facilitated by at least one application included on the user device, wherein the at least one application includes first code comprising information that must be translated before it can be executed on a computer processor of the user device;

determine that the user device satisfies one or more criteria associated with the dialogue sequence; and receive second code at the user device that allows the at least one application to conduct at least an updated portion of the dialogue sequence, wherein the second code comprises information that must be translated before it can be executed on the computer processor of the user device, wherein the at least one application on the user device continues to operate when the second code is received.

20. The system of claim 19, wherein the computer-executable instructions, when executed by the one or more processors, further cause the system to:

send by the user device information associated with a data entry for the dialogue sequence; and store at least a portion of the information associated with the data entry for the dialogue sequence.

* * * * *